United States Patent [19]

Boyer, III et al.

[11] 4,071,896
[45] Jan. 31, 1978

[54] NUMERICAL CONTROL SYSTEM FOR FINISHING MACHINES

[75] Inventors: David Harrison Boyer, III, Baltimore; Richard Dale Mitchell, Fallston, both of Md.

[73] Assignee: Koppers Company, Inc., Pittsburgh, Pa.

[21] Appl. No.: 751,895

[22] Filed: Dec. 17, 1976

[51] Int. Cl.² .................................................. B31B 3/14
[52] U.S. Cl. .................................. 364/471; 364/107; 364/118; 364/120; 364/119; 364/121; 364/300
[58] Field of Search .............. 93/58 R, 49 AC, 36 R; 235/151.1, 151.11

[56] References Cited

U.S. PATENT DOCUMENTS

| | | | |
|---|---|---|---|
| 3,651,723 | 3/1972 | Gallagher, Jr. et al | 93/58.2 R |
| 3,874,205 | 4/1975 | Roch et al. | 72/8 |
| 3,905,793 | 9/1975 | Croughwell | 235/151.1 |
| 3,926,097 | 12/1975 | Santa Maria et al. | 93/58 R |
| 3,983,370 | 9/1976 | Caspi et al. | 235/151.1 |

*Primary Examiner*—Eugene G. Botz
*Attorney, Agent, or Firm*—Thomas L. Sivak; Oscar B. Brumback

[57] ABSTRACT

A method and apparatus for automatically positioning the various appurtenances of a Printer-Slotter-Folder-Gluer to form box blanks of various dimensional characteristics. The position of each appurtenance of the system is preselected by a binary numbering input representing each absolute position. The binary input is selected by thumbwheel switches employing binary coded decimal input. The input data is stored and can be retrieved and utilized to position the appurtenances for a blank of specific dimensional characteristics in response to a production order code.

19 Claims, 61 Drawing Figures

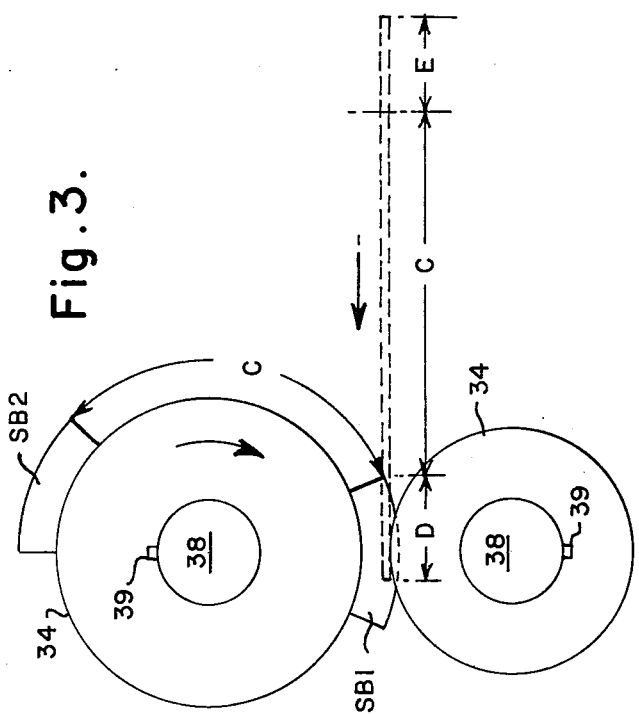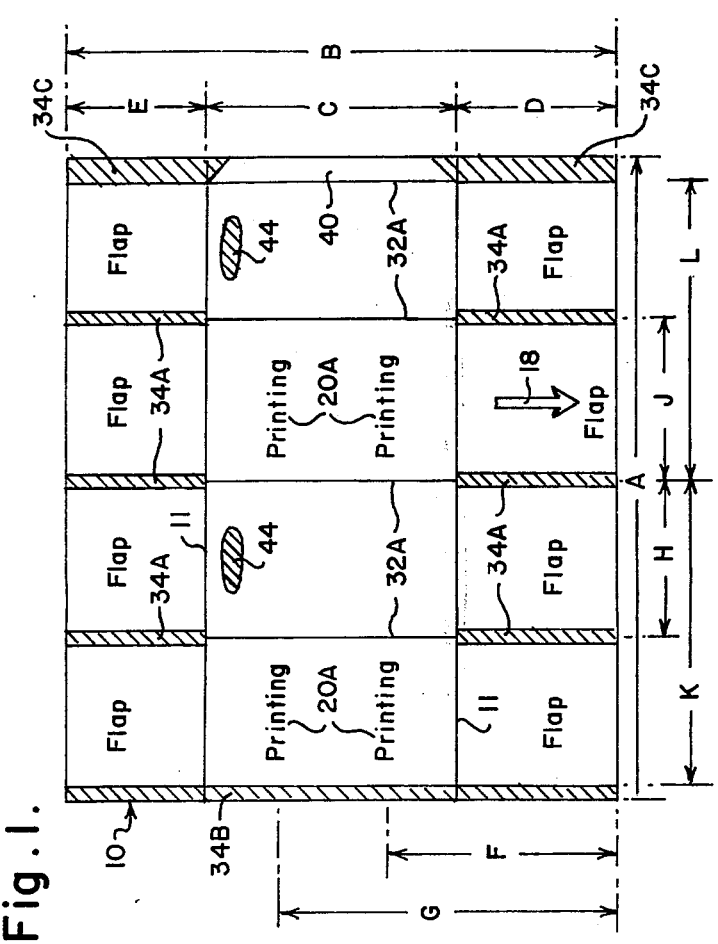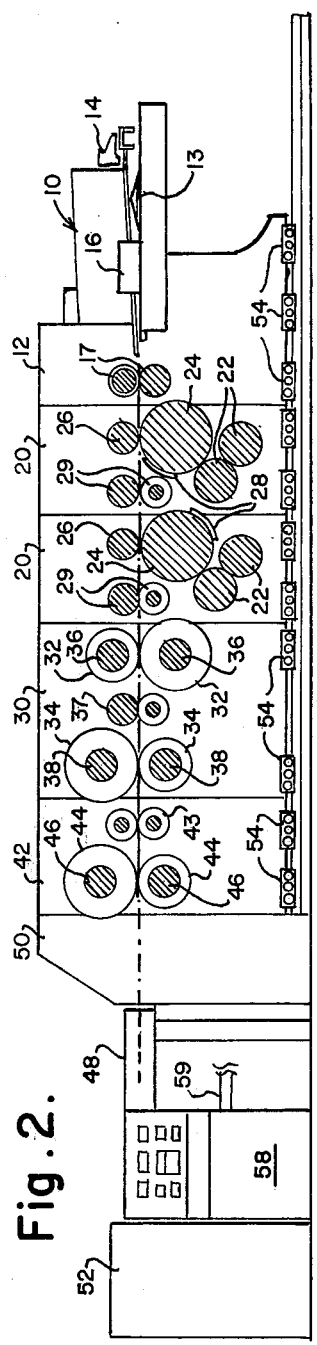

| SIGNAL | SELECTOR | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| THUMB 1A | A | 1 T8 | 1 Th8 | 2 T8 | 2 Th8 | 3 T8 | 3 Th8 | 4 T8 | GND | 5 T8 | 5 Th8 | 6 T8 | 6 Th8 | 7 T8 | 7 Th8 | 8 T8 | 8 Th8 |
| THUMB 1B | B | 9 T8 | 9 Th8 | 10 T8 | 10 Th8 | 11 T8 | 11 Th8 | 12 T8 | GND | 13 T8 | 13 Th8 | 14 T8 | 14 Th8 | 15 T8 | | | |
| HOME 1 | B | | | | | | | | | | | | | | BHS 10 | BHS 22 | GND |
| THUMB 2A | A | 1 T4 | 1 Th4 | 2 T4 | 2 Th4 | 3 T4 | 3 Th4 | 4 T4 | GND | 5 T4 | 5 Th4 | 6 T4 | 6 Th4 | 7 T4 | 7 Th4 | 8 T4 | 8 Th4 |
| THUMB 2B | B | 9 T4 | 9 Th4 | 10 T4 | 10 Th4 | 11 T4 | 11 Th4 | 12 T4 | GND | 13 T4 | 13 Th4 | 14 T4 | 14 Th4 | 15 T4 | | | |
| HOME 2 | B | | | | | | | | | | | | | | BHS 9 | BHS 21 | GND |
| THUMB 3A | A | 1 T2 | 1 Th2 | 2 T2 | 2 Th2 | 3 T2 | 3 Th2 | 4 T2 | GND | 5 T2 | 5 Th2 | 6 T2 | 6 Th2 | 7 T2 | 7 Th2 | 8 T2 | 8 Th2 |
| THUMB 3B | B | 9 T2 | 9 Th2 | 10 T2 | 10 Th2 | 11 T2 | 11 Th2 | 12 T2 | GND | 13 T2 | 13 Th2 | 14 T2 | 14 Th2 | 15 T2 | | | |
| HOME 3 | B | | | | | | | | | | | | | | BHS 8 | BHS 20 | BHS 30 |
| THUMB 4A | A | 1 T1 | 1 Th1 | 2 T1 | 2 Th1 | 3 T1 | 3 Th1 | 4 T1 | GND | 5 T1 | 5 Th1 | 6 T1 | 6 Th1 | 7 T1 | 7 Th1 | 8 T1 | 8 Th1 |
| THUMB 4B | B | 9 T1 | 9 Th1 | 10 T1 | 10 Th1 | 11 T1 | 11 Th1 | 12 T1 | GND | 13 T1 | 13 Th1 | 14 T1 | 14 Th1 | 15 T1 | | | |
| HOME 4 | B | | | | | | | | | | | | | | BHS 7 | BHS 19 | BHS 29 |
| THUMB 5A | A | 1 U8 | 1 H8 | 2 U8 | 2 H8 | 3 U8 | 3 H8 | 4 U8 | 4 H8 | 5 U8 | 5 H8 | 6 U8 | 6 H8 | 7 U8 | 7 H8 | 8 U8 | 8 H8 |
| THUMB 5B | B | 9 U8 | 9 H8 | 10 U8 | 10 H8 | 11 U8 | 11 H8 | 12 U8 | 12 H8 | 13 U8 | 13 H8 | 14 U8 | 14 H8 | 15 U8 | | | |
| HOME 5 | B | | | | | | | | | | | | | | BHS 4 | BHS 16 | BHS 29 |
| THUMB 6A | A | 1 U4 | 1 H4 | 2 U4 | 2 H4 | 3 U4 | 3 H4 | 4 U4 | 4 H4 | 5 U4 | 5 H4 | 6 U4 | 6 H4 | 7 U4 | 7 H4 | 8 U4 | 8 H4 |
| THUMB 6B | B | 9 U4 | 9 H4 | 10 U4 | 10 H4 | 11 U4 | 11 H4 | 12 U4 | 12 H4 | 13 U4 | 13 H4 | 14 U4 | 14 H4 | 15 U4 | | | |
| HOME 6 | B | | | | | | | | | | | | | | BHS 3 | BHS 15 | BHS 27 |
| THUMB 7A | A | 1 U2 | 1 H2 | 2 U2 | 2 H2 | 3 U2 | 3 H2 | 4 U2 | 4 H2 | 5 U2 | 5 H2 | 6 U2 | 6 H2 | 7 U2 | 7 H2 | 8 U2 | 8 H2 |
| THUMB 7B | B | 9 U2 | 9 H2 | 10 U2 | 10 H2 | 11 U2 | 11 H2 | 12 U2 | 12 H2 | 13 U2 | 13 H2 | 14 U2 | 14 H2 | 15 U2 | | | |
| HOME 7 | B | | | | | | | | | | | | | | BHS 2 | BHS 14 | BHS 26 |
| THUMB 8A | A | 1 U1 | 1 H1 | 2 U1 | 2 H1 | 3 U1 | 3 H1 | 4 U1 | 4 H1 | 5 U1 | 5 H1 | 6 U1 | 6 H1 | 7 U1 | 7 H1 | 8 U1 | 8 H1 |
| THUMB 8B | B | 9 U1 | 9 H1 | 10 U1 | 10 H1 | 11 U1 | 11 H1 | 12 U1 | 12 H1 | 13 U1 | 13 H1 | 14 U1 | 14 H1 | 15 U1 | | | |
| HOME 8 | B | | | | | | | | | | | | | | BHS 1 | BHS 13 | BHS 25 |

- ALL SIGNALS ARE FROM THUMBWHEEL SWITCHES, EXCEPT THE HOME SWITCH SIGNALS, BHS.
- 1ST NUMBER IN BLOCK = THUMBWHEEL NUMBER.... THEN EITHER UNIT, TENS, HUNDREDS, OR THOUSANDS INDICATION. LAST NUMBER IS MAGNITUDE.

EXAMPLE: THUMBWHEEL SWITCH 9 HAS A VALUE OF 7 IN THE TEN POSITION AND WOULD GENERATE THESE SIGNALS:

9T4, 9T2, 9T1 → 4+2+1 = 7 MAGNITUDE OF TENS POSITION.

NUMERICAL CONTROL SYSTEM FOR FINISHING MACHINES

BACKGROUND OF THE INVENTION

The present invention relates to the production of paperboard containers and, more particularly, to a method and apparatus for automatically positioning the appurtenances of container production equipment to facilitate the production of containers from paperboard stock.

In the production of corrugated paperboard containers, a continuous, wide web of corrugated paperboard is produced by "combining" equipment. The web of corrugated paperboard is then converted into a container of a desired size and shape and with a desired printed exterior through a series of operations, requiring printing, creasing, slotting, gluing, folding and stacking.

Container production equipment of one known type slits and scores the continuous web or corrugated paperboard produced by the combining equipment and then severs the slit and scored web to form scored blanks of an appropriate dimension for the production of a desired container size. The scored blanks are then fed into a finishing machine which produces finished containers from the blanks.

One such corrugated paperboard container finishing machine in current commercial use feeds the scored blanks of corrugated paperboard successively from a hopper through multiple machine sections in which various operations are performed on the blank. The hopper is provided with movable side and back stop guides to insure proper feeding of various sized blanks through adjustment of the guides. The scored container blank is fed from the hopper to a printing section where printed material is applied to the container blank in one or more colors and at one or more locations. For example, the container blank may be fed between a print cylinder and an impression cylinder and, in a typical flexographic printer, a flexible rubber printing plate on the print cylinder may apply the printed material to the container blank. It will be appreciated that the printing plate must be in proper registration with the container blank as the blank moves through the printing section to insure printing at the desired locations on the finished container. Accordingly, the registration of the printing section must be adjustable in accordance with the dimensions of the container blank and the desired locations of the printed material on the blank.

The container blank is also fed through a section of the machine typically referred to as a slotter/creaser to form slots and creases in the container blank and thereby form flaps and panels which are ultimately folded and joined to form the container. The positions of the slots and creases determine, together with the dimensions of the blank and the positions of the scores, the overall size and shape of the container. Accordingly, the cutting and crushing devices which perform the slotting and creasing operations must be adjustable to suit the various requirements for container sizes and shapes.

After the printing, slotting and creasing operations have been performed on the scored blank, the blank is fed to a folding and joining section where the flaps and panels are folded and adhesively or otherwise conventionally joined to form the semi-finished container. The semi-finished containers are then stacked and bundled for shipment to customers. It will be appreciated that the folding and adhesive applying assembly must be adjustable to accommodate various container dimensions. Similarly, the guides of the stacking assembly must be adjustable in accordance with container dimensions. Moreover, it will be appreciated that the spacing between cooperating pairs of appurtenances, e.g., printing and impression cylinders as well as feed rolls, must be adjustable in accordance with the thickness or "caliper" of the container blank.

It can be seen from the foregoing that the positions of a large number of appurtenances of a container production machine must be established before the production of a particular container can be commenced. The manual positioning of these various appurtenances, e.g., the positioning of the printing plate or plates to establish proper registration, is extremely time consuming. In a typical finishing machine, for example, the various operating sections are joined together so that they operate in proper registration on a container blank, and the sections must therefore be parted to provide access to the appurtenances. The operator must usually translate dimensions from a customer order into required positional dimensions of the various appurtenances. The operator must then establish a number of the various positions by actual measurements from some reference position such as machine dead center using, in many instances, special tools required for the set-up procedure. The sections must then be brought back together before a first blank may be run through the machine to test its alignment. It will be appreciated that this positioning process can be very time consuming and, if not accurately completed on the first attempt, can keep a machine out of production for an exorbitant length of time.

It is accordingly an object of the present invention to provide a novel method and system for rapidly and accurately positioning the appurtenances of multi-section container production equipment with minimal operator intervention and without the need for separating the sections of the equipment.

It is another object of the present invention to provide a novel method and apparatus for automatically poasitioning the appurtenances of container production equipment in response to input data as to container dimensions.

It is yet another object of the present invention to provide a novel method and apparatus for automatically positioning the appurtenances of container production equipment in response to input data as to container dimensions wherein the data for a plurality of different container sizes is stored and can be retrieved and utilized to position the appurtenances in response to a simple production order customer or other code.

It is a further object of the present invention to provide a novel method and system for automatically positioning the appurtenances of container production equipment from initialized known positions.

It is yet a further object of the present invention to provide a novel method and system for automatically initializing the positions of appurtenances of container production equipment in response to predetermined conditions of the equipment.

It is yet a further object of the present invention to provide a novel method and system for automatically positioning appurtenances of container production equipment wherein operator controlled positioning of an individual appurtenance is available through the automatic control system to provide corrections to the automatic positioning.

It is still a further object of the present invention to provide a novel method and apparatus for positioning appurtenances of container production equipment in response to container dimension data selected from one of a plurality of sources.

These and other objects and advantages of the present invention are accomplished in accordance with the present invention as will become apparent to one skilled in the art to which the invention pertains from the following detailed description when read in conjunction with the appended drawings.

BRIEF DESCRIPTION OF THE DRAWINGS

FIG. 1 is a plan view of a container blank illustrating the operations performed by a container finishing machine;

FIG. 2 is a schematic diagram illustrating one embodiment of a container finishing machine with appurtenances positionable in accordance with the present invention;

FIG. 3 is a schematic representation of a slotter section of the machine of FIG. 2 in elevation;

FIG. 12 is a schematic circuit diagram illustrating the motor select logic circuit of FIG. 9 in greater detail;

FIG. 30 is detailed description of the data control of the THUMB and HOME signals.

DETAILED DESCRIPTION

Figure 4:
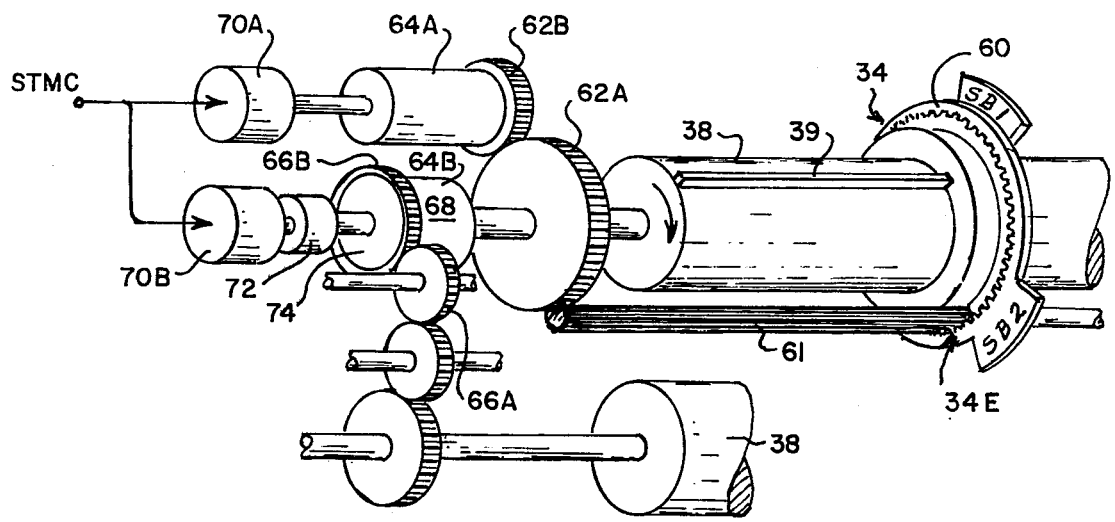
FIGS. 4 and 5A are schematic representations pictorially illustrating slotted blade and head adjustment means for the slotter/creaser section of FIG. 2.

FIG. 1 illustrates a typical scored container blank 10 of corrugated paperboard from which corrugated paperboard containers are constructed by one known container finishing machine. The illustrated blank 10 is a sheet of corrugated paperboard having width and length dimensions designated by the respective letters A and B and a thickness or caliper M. The finishing machine removes the material indicated by the shading in FIG. 1, applies printing at desired locations on the blank and creases the blank at several locations to provide a finished blank which is folded and joined to produce a container. The finished blank typically has four centrally disposed panels (i.e., two side panels and two end panels as marked in FIG. 1), and each panel has an upper and lower flap connected thereto. The panels and flaps are produced by the finishing machine as is described hereinafter in detail.

For example, the blank 10 illustrated in FIG. 1 is fed through a finishing machine such as that illustrated in FIG. 2 to produce a container. A number of blanks having the outside dimensions A and B and having score lines 11 are placed in a feed section 12 of the machine and blanks are individually fed into the finishing machine by a feed member 13. The feed member 13 is preferably a perforated plate to which a vacuum is applied in a timed sequence to deliver the bottom blank to pull rolls 17. Such a device is well known in the art and is known as reciprocating timed vacuum feed.

The feed section 12 contains the main drive motors for the finishing machine. The feed section 12 of the machine is provided with a backstop 14 and side guides 16 (only one shown) positioned in accordance with the dimensions of the paperboard blank. Specifically, the side guides 16 are spaced in accordance with the sheet width dimension A and the backstop 14 is positioned in accordance with the sheet length dimension B.

The sheets or blanks of corrugated paperboard are fed from the feed section 12 with the aid of pull rolls 17 through the finishing machine in a direction indicated by the arrow 18 in FIGS. 1 and 2. One or more printing sections 20 apply printed matter to the sheets at desired locations thereon. In the machine illustrated in FIG. 2, for example, two printing sections are provided to apply appropriate designs or other indicia to the container blank at appropriate locations as is generally indicated at 20A in FIG. 1. To apply such printed matter to the blank, the printing section 20 is typically provided with ink applying rolls 22, a plate roll or cylinder 24 and an impression roll or cylinder 26. Each plate cylinder 24 carries a printing plate 28 which, in the usual finishing machine using flexographic techniques, is a flexible plate removably attached to the plate cylinder.

The container blank is fed with the aid of feed rolls 29 from the printing section or sections 20 into a slotter/creaser section 30. The slotter/creaser section 30 is provided with a plurality of cooperating creasing heads 32 and a plurality of cooperation slotter heads 34 mounted on journalled, generally parallel shafts 36 and 38, respectively. The container blank is fed between the cooperating creasing heads 32 to crush or crease the container blank along parallel crease lines 32A as is generally indicated in FIG. 1. The creased container blank is then fed by feed rolls 37 between the cooperating slotting heads 34 and slots are cut in the container blank as is indicated at 34A in FIG. 1. In addition, cooperating trimming heads are provided on the shafts 38 of the slotter section to trim the container blank 10 to a desired overall width by removal of the material 34B in FIG. 1. Further cooperating cutting heads on the shafts 38 remove the material indicated at 34C in FIG. 1 to provide a glue flap or other suitable joining member 40 at one end of the container blank.

The machine illustrated in FIG. 2 also includes an optional die cutter section 42 for removing material from the container blank at desired locations. For example, the particular order being filled may require that the container have hand holes at each end thereof as is generally indicated at 44 in FIG. 1. This may be accomplished by feeding the container blanks through feed rolls 43 and to cooperating dies 44 mounted on rotatably journalled shafts 46 in the die cutter section 42.

With continued reference to FIGS. 1 and 2, a finished container blank emerges from the die cutter section 42 with the shaded areas 34A, 34B and 34C removed from the blank and the lines 32A creased. In addition, the areas 44 may be removed if a die cutter section is provided. In this form, the container blank has four panels each having an upper and lower flap connected thereto as was previously mentioned. The panel depth or height is indicated by the dimension C and determines the height of the finished container. The dimensions D and E indicate the desired positioning of the printing on the container blank, i.e., the register of the printing sections. The widths of the respective end and side panels are indicated by the dimensions H and J and the dimensions K and L indicate the trim widths of the blank. The caliper of thickness of the container blank may be indicated by the dimension M (not shown).

After all of the printing, crushing and cutting of the container blank has been accomplished to produce a finished container blank, the blank is fed through a stationary section 50 of the finishing machine into a conventional folder/gluer section 48 of the container finishing machine wherein the container blank is folded and the glue flap 40 is joined to the side panel. The container, in this semi-finished form, is then fed to a stacker section 52. The stationary section is fixed to the floor or other surface on which the machine rests. The stacker section 52 receives the semi-finished container and stacks the containers in bundles of predetermined numbers for handling and shipping.

It will be appreciated that a number of devices or machine appurtenances which accomplish the printing, cutting, creasing, folding, gluing and stacking functions must be positioned accurately in accordance with the container dimensions to provide a finished container of a desired size. It can be seen, for example, that the side guides 16 and backstop 14 of the feed section 12 are set in accordance with the respective width and length dimensions A and B of the container blank. The register or phasing for the print sections 20 is set in accordance with the respective dimensions F and G. As will be discussed hereinafter, the axial positioning of the slotter and creaser heads is determined in accordance with the dimensions H, J, K and L and the radial setting of the slotter heads 34 is determined in accordance with the dimensions D, C and E. The positioning of the guides and other appurtenances of the folder/gluer 48 and the stacker 52 are, of course, determined in accordance with the overall dimensions of the finished container blank and semifinished container as well as the positions of the creases, glue flaps and the like. Moreover, the spacing between cooperating pairs of feed rolls and printing cylinders is adjusted in accordance with the caliper dimension M of the container blank.

In finishing machines of the type illustrated in FIG. 2, many of the appurtenances may be positionable from the exterior of the machine. However, it is necessary to separate the various machine sections both to position some of the appurtenances and to provide access for maintenance. Accordingly, the sections 12, 20, 30 and 42 are mounted on the sections along tracks 56 (only one shown) on each side of the machine. When the machine is in use, the sections are secured together and to the stationary section 50. The drive gears for each section mesh and are driven in synchronism by the main drive motor of the feed section 12. In this manner, each section of the machine is in registration or in phase with each other section. Adjustment of this registration or phasing is therefore required in order to meet specifications for different container sizes and shapes.

In accordance with the present invention, the adjustments required for producing a container of a desired size and shape are performed automatically by an automatic positioning control unit 58. The control unit 58 may be placed in the vicinity of the container finishing machine and may control the positioning of the appurtenances of one or more machines by supplying appropriate control signals to positioning motors (e.g., stepper motors) on the machine via signalling lines or connections 59 as will be subsequently described in greater detail. The section need not be separated for positioning of the appurtenances but are still mounted on tracks for maintenance purposes.

Some of the devices for positioning the appurtenances of the container finishing machine of FIG. 2 in response to the control signals from the control unit 58 are illustrated in greater detail in FIGS. 3-6. Where further detail is required to facilitate an understanding of the invention, each machine section is described briefly hereinafter in connection with the drawings illustrating the mechanical positioning mechanisms and their associated drive motors.

FEED SECTION

As was previously mentioned in connection with FIG. 2, the feed section 12 feeds the container blanks individually through the machine in a fixed sequence in synchronism with the rotation of the main drive motor and associated gears in the feed section. The timing of this sequential feeding determines the register of the container finishing machine since all mechanisms are driven by the main drive motor and gears.

The backstop 14 and side guides 16 of the feed section 12 (FIG. 2) are positioned by lead screws driven by stepping motors (e.g., as shown in connection with the slotter/creaser section of FIG. 5) mounted conveniently on the side support member of the feed section. Each stepping motor also drives a home switch through a conventional gearing arrangement (not shown). The home switches are, for example, conventional switches and may be incoporated into a suitable indicator such as a revolution counter such as is shown in U.S. Pat. No. 2,996,241. Such units are commercially available under the designation Durant Model 4sP73LSAC, 10:1 ratio switches.

As is described hereinafter in detail in connection with FIG. 6, the upper pull roll of the feed section 12 is vertically positionable relative to the lower pull roll. A home switch is provided for pull roll home position as will be seen hereinafter.

Remote switches for operator positioning of the side guides and backstop are provided on the front of the feed section so that the operator can position these appurtenances while viewing the positioning operations. Similar provisions are made on each machine section for operator positioning of the pull rolls and the appurtenances of the other machine sections.

PRINT SECTION

The one or more print sections of the container finishing machine each have a plate cylinder 24, an impression cylinder 26 and a pair of feed or pull rolls 29 as was discussed in connection with FIG. 2. The caliper adjustment for the pull rolls and for the spacing between the impression and plate cylinders is discussed hereinafter in connection with FIG. 6.

The register of the print section must also be adjusted in accordance with container dimensions as was previously mentioned, in order to ensure printing at the desired locations on the container panels. The register adjustment is made through an harmonic drive system of the same type as is described in connection with adjustment of the slotter register (FIG. 4). Accordingly, this adjustment will not be discussed here. Moreover, a slight lateral adjustment of the plate cylinder may be provided through an arrangement such as that shown in U.S. Pat. No. 3,565,006.

SLOTTER/CREASER SECTION

Referring now to FIG. 3, the slotter section of the finishing machine includes cooperating slotter heads 34 mounted on rotatably journalled shafts 38 as was previously mentioned. In FIG. 3, the heads 34 mounted on the upper shaft 38 include slotter blades or knives SB1 and SB2 as well as other cutting or slitting blades which produce cuts or slots at desired locations when the blank passes between the blades and an anvil carried by the lower head. The heads 34 includes a slot to receive a registration key 39 on the shafts 38. The heads are therefore circumferentially fixed relative to the shafts 38 but are movable laterally as described hereinafter.

In the illustrated machine, the shafts 38 turn in synchronism and the blades of the upper heads 34 come into contact with the container blank at positions determined by the register of the slotter section and the distance between the cutting heads (i.e., the dimension C). Thus, as is illustrated, the first slotter blade designated SB1 produces a slot in the container blank determined by the initial point of contact between the blade SB1 and the container blank. The length or depth of the slot formed by the slotter blade SB1 (the dimension D) is thus determined by the registration of the slotter section 30 relative to the remaining sections of the machine.

As the container blank continues to pass through the slotter section, the slotter blade SB2 is rotated into cutting position. The initial point of contact between the slotter blade SB2 and the container blank relative to the end of the slot produced by the blade SB1 is determined by the distance between the blades SB1 and SB2. This distance therefore determines the dimension C, i.e., the panel depth of the container.

It can therefore be seen from the above that the slot depth D is determined by the registration of the slotter section relative to the machine registration. The dimension C is determined by the distance between the slotter heads with the dimension E determined by the panel length B and the dimensions C and D. Accordingly, the slotter blade SB1 can be secured in a fixed angular position relative to the shaft 38 and its slot depth adjusted by adjusting the registration of the slotter section. The slotter blade SB2 may be connected to the shaft 38 in such a manner that it is movable relative to the slotter blade SB1 around the periphery of the shaft 38 (FIG. 4). Thus, the dimension C may be varied by varying the angular position of the slotter blade SB2 relative to the shaft 38. This movement may be accomplished in the manner explained hereinafter in connection with FIG. 4.

One system for adjusting movement of the blade SB2 relative to the blade SB1 and the registration of the slotter section relative to machine registration for the purposes of adjusting panel depth C and slot depth D is illustrated in FIG. 4. Referring now to FIG. 4, the heads 34 carrying the slotter blades SB1 and SB2 are mounted on the shaft 38 with the slotter blade SB1 secured in fixed relation to the head 34 and the shaft 38 in a suitable manner. The slotter blade SB2 is secured to the head 34 in a manner which permits circumferential movement of the slotter blade SB2 to thereby permit adjustment of the slotter blade SB2 relative to the slotter blade SB1. In the preferred embodiment, for example, the slotter blade SB2 is fixed to a ring like member 60 which is maintained in concentric relation to and is selectively rotatable coaxially with respect to the shaft 38 through a gear arrangement 62A, 62B and an harmonic drive unit 64A driven by a stepper motor 70A at one end of the shaft 38. Movement of the slotter blade SB2 relative to the slotter blade SB1 determines the dimension C (the panel depth) as was previously described.

The harmonic drive and gear arrangement for positioning the slotter blade SB2 includes an elongated splined shaft 61 which extends across the container finishing machine in generally parallel relation to the shaft 38. The splined shaft 61 engages gear teeth both on the inner circumference of the ring 60 and on the outer circumference of the gear 62A. The gear 62A is journalled for rotation on the journal end of the shaft 38 and is engaged by circular spline gear 62B of the harmonic drive unit 64A which is suitably mounted on the side support member of the machine and driven by the stepper motor 70A.

The slot depth dimension D is determined by the register of the slotter section relative to machine register. To provide for adjustment of the register of the slotter section, a suitable conventional harmonic drive unit 64B may be utilized. Specifically, a main drive gear 66A driven by the main power unit in the stationary section 50 of the machine may drive a circular spline input gear 66B of the harmonic drive unit, as well as gears 66C and 66D that drive the lower shaft 38 in synchronism with the upper shaft 38. The drive for the shaft 38 may be taken from a flexspline output 68 of the harmonic drive unit 64B and a conventional stepper motor 70B may be connected through a conventional double acting brake 72 to a wave generator input 74 of the harmonic drive unit. Stepper motor control signals STMC may be supplied from the automatic position control unit of FIG. 1 to the stepper motors 70A and 70B. It should be noted that the harmonic drive units discussed herein are all conventional units typically referred to as harmonic drive transmissions or differentials. Such units are commercially available and have been used in prior systems for print registration and the like as shown in U.S. Pat. No. 3,565,006.

In operation, the main drive unit of the machine drives the shafts 38 through the harmonic drive unit 64B at an appropriate velocity and in synchronism with the driven shafts of other sections of the finishing machine. The phasing or register of the blades of the slotter head 34 will remain unchanged relative to the register of the finishing machine as long as the stepper motor 70B is held in one position. Similarly, the position of the blade SB2 relative to the blade SB1 remains unchanged as long as the stepper motor 70A is not driven to a new position.

When it is desired to change the register of the slotter section, control signals STMC are applied to the stepper motor 70B from the control unit 58 (FIG. 2) and the wave generator 74 is rotated to a new position. Rotation of the wave generator 74 causes the flex spline 68 and thus the shaft 38 to rotate relative to the circular spline 66 thereby causing a change in the phase or register of the shaft 38 relative to the main drive gear 66A. It will thus be appreciated that the register of the slotter section may be varied relative to the register of the finishing machine by any desired amount through the application of control signals to the stepper motor 70B. It will also be appreciated that this same technique may be employed to adjust the register to other sections of the finishing machine (e.g., the printing section 20) in order to provide the appropriate positioning of other appurtenances relative to a container blank as it is fed through the machine.

Positioning of the slotter blade SB2 relative to the slotter blade SB1 is also controlled by the stepper motor control signals STMC supplied from the control unit 58 of FIG. 2. As the shaft 38 rotates, the spline 61 follows an orbital path about the shaft 38 and "walks" along the outer gear teeth of the gear 62A. The spline 61 therefore does not rotate about its center (and relative to the inner gear teeth of the ring 60) when the main drive train drives the shaft 38. However, when the stepper motor 70A is driven, the journalled gear 62A is rotated relative to the shaft 38 causing the spline 61 to rotate about its center. When this occurs, the ring 60 is rotated coaxially about the shaft 38 and the slotter blade SB2 moves relative to the fixed blade SB1. A more detailed description of such a blade adjustment system can be had with reference to U.S. Pat. No. 3,952,637 for "Apparatus for Changing the Rotary Position of a Slotter Member and for Changing the Relative Position Between Fixed and Movable Knives on the Slotter Member," issued Apr. 27, 1976.

It will be appreciated that the cutting and creasing heads of the slotter/creaser section 30 of FIG. 2 must also positionable laterally or axially along their shafts in order to cut and crease the container blank at the appropriate lateral positions (i.e., in accordance with the dimensions H, J, K and L). One manner of positioning the slotter and creaser heads laterally in response to control signals from the automatic positioning control unit 58 of FIG. 2 is illustrated in FIG. 5A to facilitate an understanding of the invention.

Figure 5A:
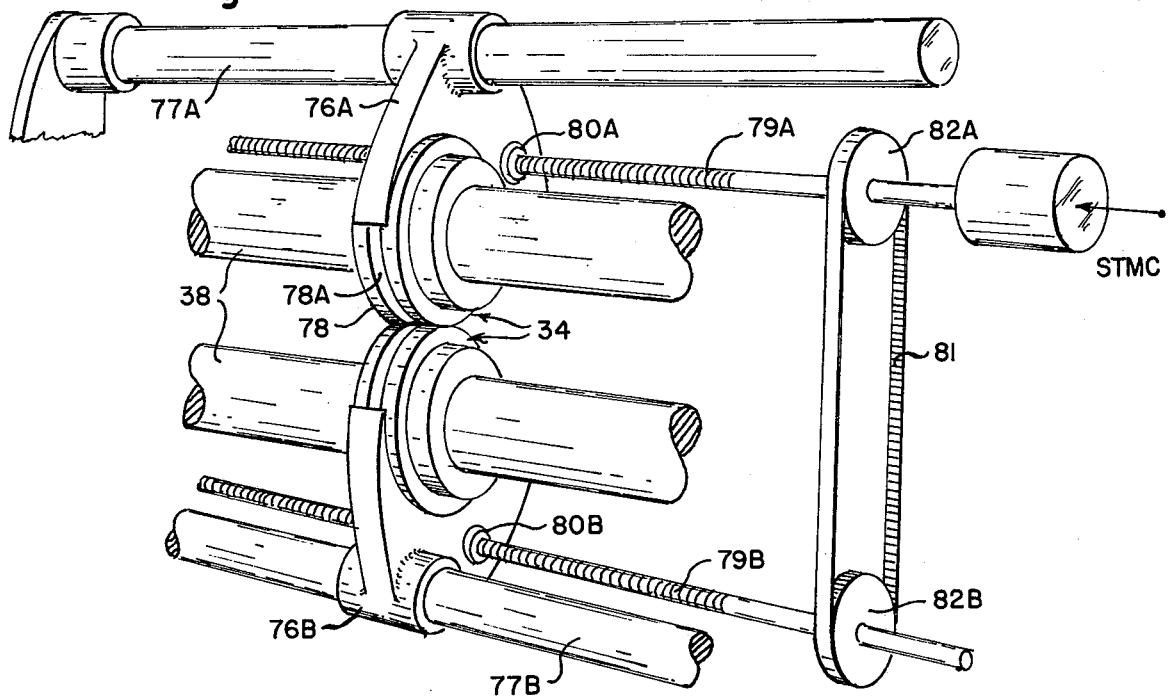

Referring now to FIG. 5A, the cooperating heads 34 carrying the cutting and anvil members are shown mounted on the shafts 38 in generally parallel relation. Upper and lower yokes 76A and 76B are mounted for axial movement along respective yoke support or carrier members 77A and 77B disposed generally parallel to the shafts 38. The heads 34 are each provided with a guide plate 78 secured to the head in axially spaced relation so as to provide a slot 78A between the head 34 and the guide plate 78. Each of the yokes 76A, 76B surrounds a portion of its associated head 34 in an axially offset position to allow the slotter blades to pass unobstructed as they rotate. The yokes loosely engage both sides of their associated guide plates in a slot generally conforming to the shape of the guide plate so as to prevent lateral movement of the guide plate and the head independently of the guide plate.

Lead screws 79A and 79B associated with the respective yokes 76A and 76B are mounted generally parallel with the shafts 38 and are journalled for rotation at one side of the machine and at least one other position located so as not to interfere with the travel of the yoke from its maximum to its minimum lateral positions. The lead screws 79A, 79B pass through ball nuts 80A, 80B mounted in the respective yokes 76A 76B and thus rotation of the lead screws results in lateral movement of the yokes and lateral movement of the heads 34. Since each set of heads 34 cooperate as was previously described, the lead screws are slaved together by a timing belt 81 cooperating with timing pulleys 82A, 82B connected to the lead screws 79A, 79B. A stepper motor 83 controlled by the signals STMC from the control unit 58 of FIG. 2 is drivingly connected to the lead screws either directly or through a gearbox in order to selectively rotate the lead screws and thereby selectively position the heads 34 laterally along the shafts 38.

There are typically four sets of heads in the slotter section that require lateral positioning. Accordingly, four stepper motors are provided to position the heads, each motor acting through a timing belt and lead screw arrangement as illustrated to provide selective lateral positioning of the four sets of heads. In addition, the four sets of yokes control the positioning of the creaser heads in the creaser section of the machine since these heads will always be in lateral alignment with a set of slotter heads.

Figure 5B:
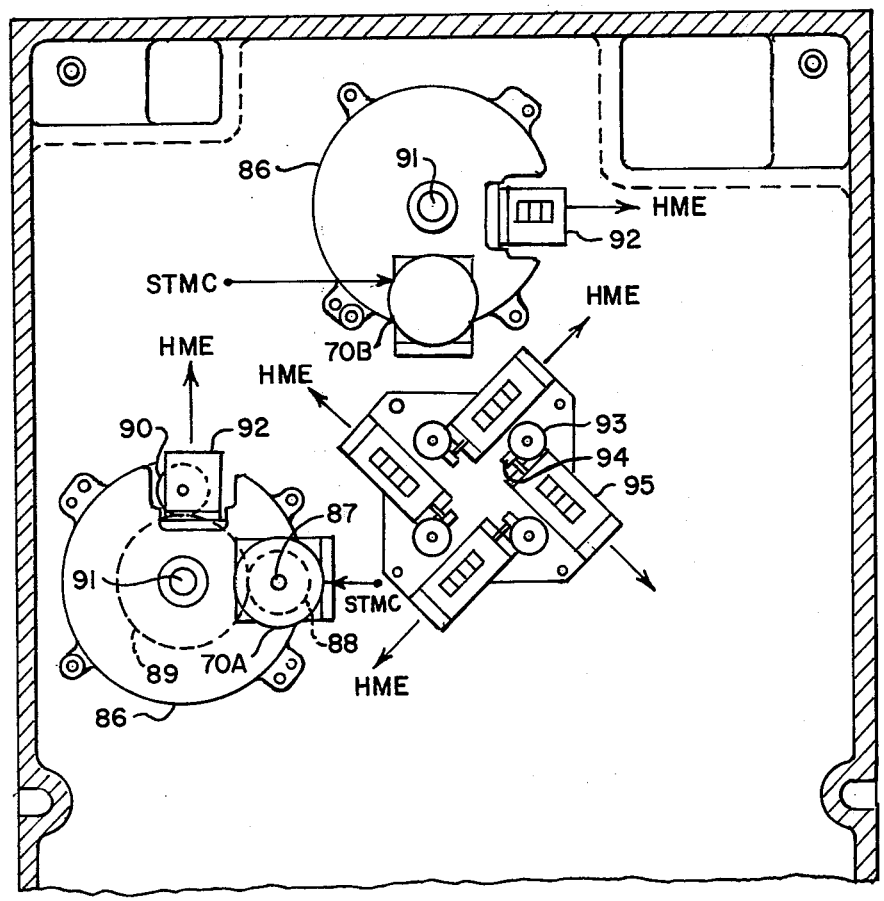
FIG. 5B is a view in elevation of a portion of one side of the slotter/creaser section of FIG. 2 illustrating the mounting of the stepper.

FIG. 5B illustrates one manner in which the stepper motors, the revolution counters (position indicators) and the home switches may be mounted in the slotter/creaser section as well as other sections of the container finishing machine. Referring to FIG. 5B, the stepper motors (e.g., the stepper motors 70A and 70B) may be mounted on a gearbox housing 86 secured to the side support frame of the machine, with their shafts or axes of rotation 87 parallel to the shafts 38 of the machine (not shown). The motor shaft 87 extends through the housing 86 and a gear 88 is connected thereto. The gear 88 meshes with a drive gear 89 keyed to the shaft 91 of the associated harmonic drive unit previously discussed.

The drive gear 89 also meshes with a gear 90 mounted on the shaft of a suitable conventional mechanical revolution counter 92. This counter and home switch, as well as those hereinafter discussed in connection with FIG. 5B, may be the Durant 10:1 ratio switches previously mentioned.

Each set of the lead screws controlling the lateral positioning of the slotter/creaser heads may be suitably connected to a helical gear 93 which in turn meshes with a second helical gear 94. The hear 94 is mounted on the shaft of a conventional revolution counter and home switch assembly 95 so that a visual indication of lateral position is provided and a home position signal may be transmitted to the control unit 58 when that position is assumed by the heads.

In addition, limit switches (not shown) may be mounted between the yokes of the slotter/creaser section or at other locations at which the appurtenances may contact each other or other structure components of the machine. The limit switches provide limit signals to the control unit to prevent damage should the control unit attempt to drive an appurtenance beyond some predetermined limit.

FOLDER/GLUER SECTION

The folder/gluer section of the container finishing machine is not illustrated in detail but is entirely conventional in structure. This section essentially comprises two elongated rails which act as guides for the finished container blank as it comes off the finishing machine. The outside edges of the rails are set up so that they are in alignment with the creases of the container blank and a belt positioned along the outside edges of the folding rails gradually folds the edges of the container blank over. Glue is applied to the flap before this folding operation is started and the flap is glued to the other side of the container blank when the folding is completed. The blank passes beneath the rails and is folded upwardly by the belts alongside the rails.

The rails and the gluing mechanism are positioned by a.c. motors that are driven by control signals from the control unit 58 as is described hereinafter in more detail. In this connection, it should be noted that the rails are driven by lead screws attached to the a.c. motors and switches on the rails sense the position thereof relative to desired positions, e.g., the position of creasing heads. The rails are thus positioned without using the home position or stored present position techniques described hereinafter in greater detail.

CALIPER ADJUSTMENT

As was also mentioned previously, the spacing between the pull rolls and other cooperating rolls and cylinders of the container finishing machine must be adjusted in accordance with the caliper or thickness M of the container blank to facilitate the transporting of the blank and to prevent undesirable crushing of the paperboard blank while permitting the proper manipulation of the blank as well as the appropriate printing pressures and the like. FIG. 6 illustrates one manner in which the spacing may be adjusted in accordance with the caliper of a paperboard blank in response to control signals from the automatic positioning control unit.

Figure 6:
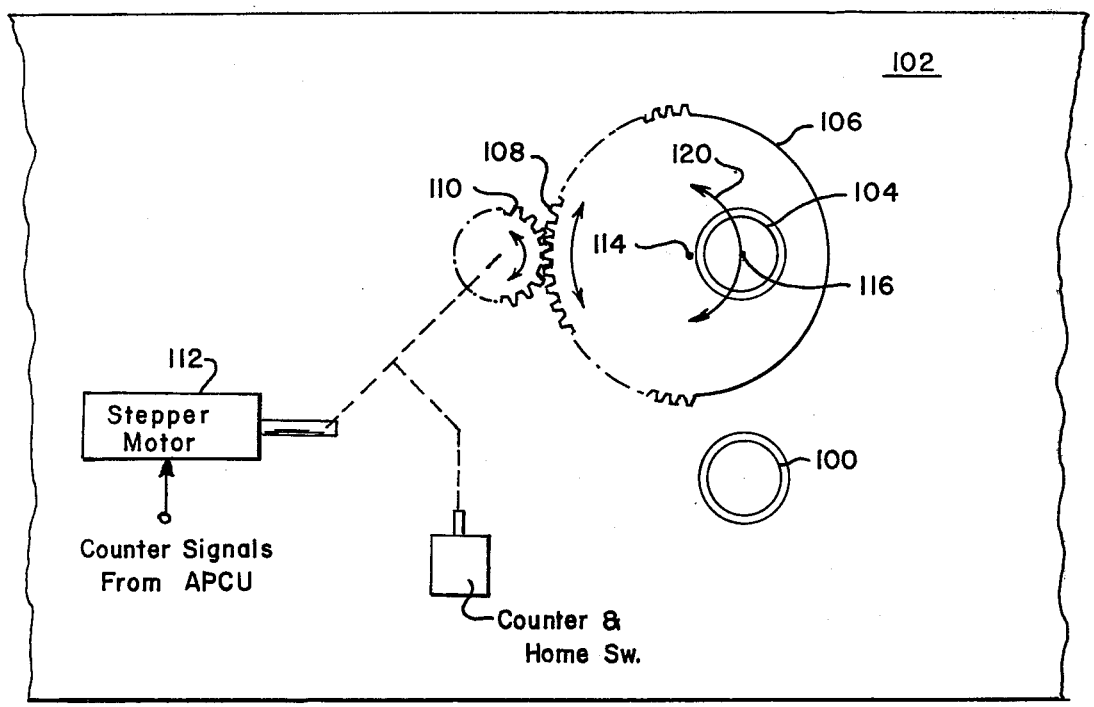
FIG. 6 is a schematic representation of a system for adjusting the caliper dimension of the machine of FIG. 2.

Referring now to FIG. 6, a first shaft 100 of a pull roll or other rotating member is journalled for rotation at each end in a side support frame 102 of the finishing machine. A shaft 104 of a cooperating roll or cylinder is journalled for rotation in a circular member 106, which member 106 is also journalled for rotation in the side support frame 102 of the machine.

The circular member 106 is provided with gear teeth 108 which mesh with the teeth of a rotatably journalled pinion gear 110. The pinion gear 110 is driven by a stepper motor 112 which receives control signals from the automatic positioning control unit 58 of FIG. 2 and rotation of the pinion gear 110 results in rotation of the member 106 about its central axis 114. The shaft 104 is mounted with its central axis 116 laterally displaced from the central axis 114 of the member 106. Accordingly, rotation of the pinion gear 110 by the stepper motor 112 causes movement of the shaft 104 in such a manner that its central axis 116 moves along the arc 120. It can thus be seen that rotation of the member 106 by the pinion gear 110 in one direction increases the distance between the shafts 100 and 104 and in the other direction decreases the distance between shafts 100 and 104.

AUTOMATIC POSITIONING CONTROL UNIT

It can be seen from the foregoing that each of the appurtenances of the finishing machine can be positioned remotely in accordance with the desired dimension of the finished container. Specifically, each appurtenance may be moved to its desired location by supplying appropriate control signals to a stepper motor or other suitable drive means. One embodiment of the automatic positioning control unit of FIG. 2 for supplying the appropriate control signals to the container finishing machine and for performing other desired functions described hereinafter is illustrated in FIGS. 7-29.

Figure 7:
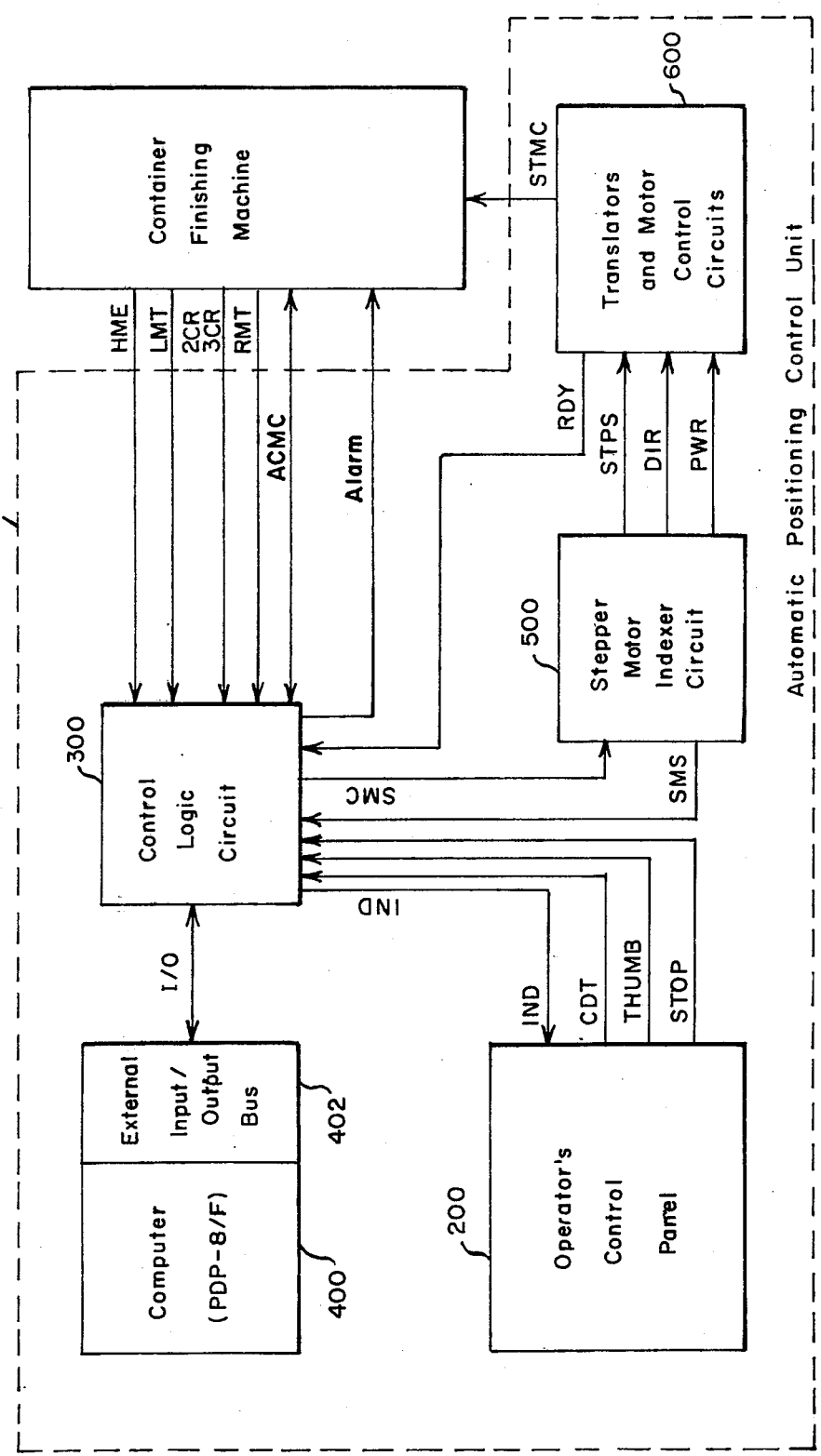
FIG. 7 is a functional block diagram illustrating the automatic positioning control unit of the machine of FIG. 2.

Referring now to FIG. 7, the automatic positioning control unit 58 includes an operator's control panel 200 housing various input and output devices as will hereinafter be described in greater detail. A plurality of control data output signals CDT, thumbwheel switch output signals THUMB, and an emergency stop signal STOP from the control panel 200 are supplied to a control logic circuit 300 described hereinafter in greater detail. The control logic circuit 300 receives signals from the operator's control panel 200, and both receives signals from and supplies signals to a suitable conventional computer 400 (e.g., a PDP-8/F Positive I/O Bus computer) by way of conventional external input/output bus 402 of a type compatible with a computer 400 (e.g., a model KA8/E compatible with the PDP-8/F computer, both available from Digital Equipment Corp.).

The control logic circuit 300 supplies indicator output signals IND to the operator's control panel 200 and supplies stepper motor control signals SMC to a stepper motor indexer circuit 500 described hereinafter in greater detail. The stepper motor indexer circuit 500 supplies status output signals SMS to the control logic circuit 300 and additionally supplies a power up signal PWR, a direction signal DIR and a steps signal STPS to conventional translators and motor control circuits 600. A ready signal RDY is supplied from the translators and motor control circuit 600 to the control logic circuit 300 and stepper controls signals STMC are supplied from the translators and motor control circuit 600 to the container finishing machine.

The control logic circuit 300 also supplies a.c. control signals, an alarm signal ALARM and an a.c. motor control signal ACMC, to the container finishing machine. The signals HME, LMT and RMT are supplied from respective home switches, limit switches, and remote switches on the container finishing machine to the control logic circuit 300. A system inhibit signal 2CR and a machine close safety signal 3CR are also supplied from the container finishing machine to the control logic circuit 300.

In general, the automatic positioning control unit operates to control the positioning of the finishing machine appurtenances in response to operator initiated control signals, and to provide the operator with indications that the requested operations have been satisfactorily performed. The operator's control panel 200 is, in accordance with the illustrated embodiment, the main input/output unit for these controlling and indicating functions as will be seen from the subsequent description of the operation of the control panel in conjunction with the other portions of the control unit 58.

OPERATOR'S CONTROL PANEL

Figure 8:
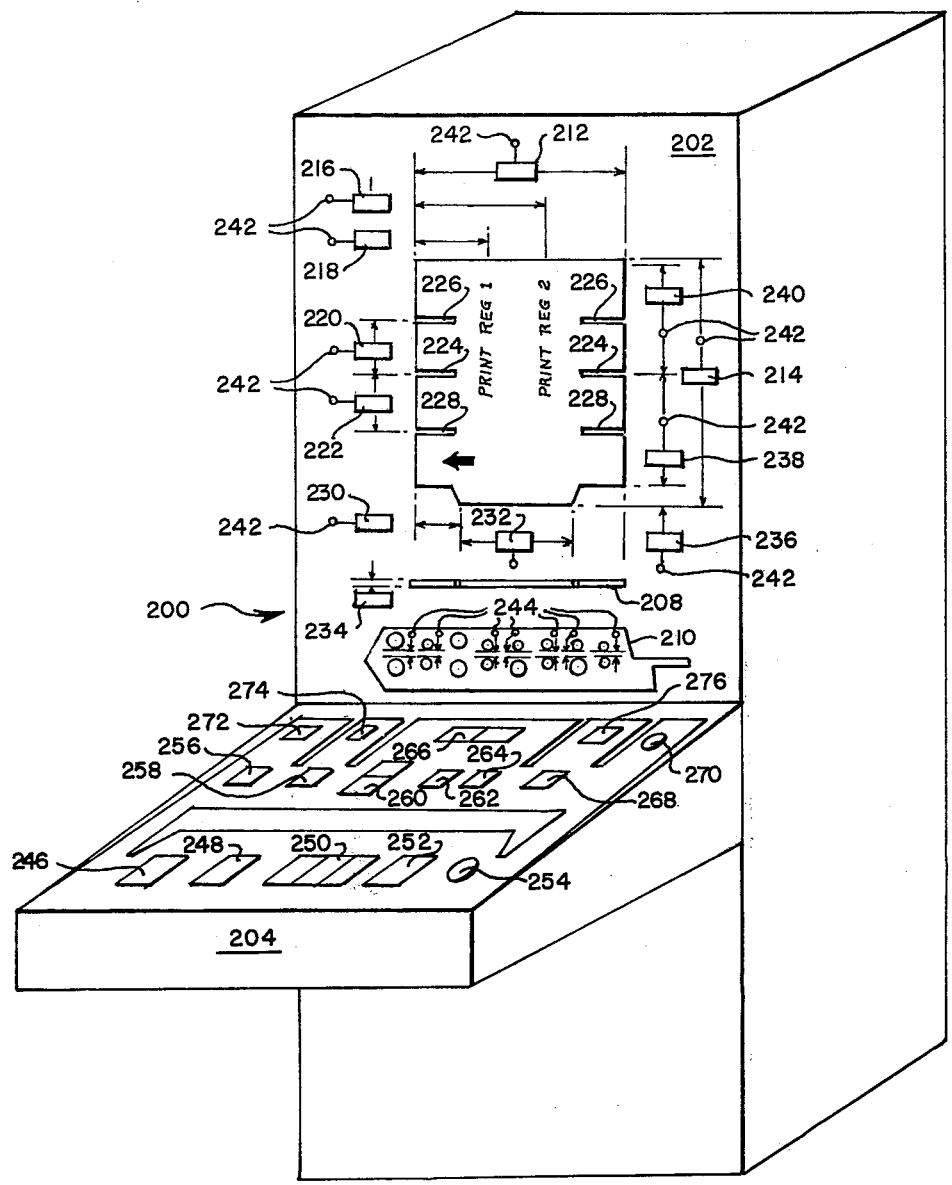
FIG. 8 is a pictorial representation of the operator's control panel of FIG. 7.

One embodiment of the operator's control panel 200 of FIG. 7 is illustrated in greater detail in FIG. 8 to facilitate an understanding of the invention.

Referring now to FIG. 8, the control panel 200 includes a plurality of switches and indicators for providing input data and control signals to the computer 400 and the control logic circuit 300 as illustrated in the FIG. 7. A plurality of thumbwheel switches and indicators such as light emitting diodes (LED's) are provided on an upright portion 202 of the control panel to supply dimensional data and to provide an indication that the appurtenances have been positioned as desired. An inclined portion 204 of the control panel 200 is provided with a plurality of switches and indicators to designate certain functions to be performed and to indicate various status information.

The upright portion 202 of the control panel 200 includes a diagramatic illustration 206 of a container blank and various cutting, creasing and printing operations which are performed on the blank to produce a finished container. A diagramatic illustration 208 of the container blank in elevation as well as a schematic representation 210 of the finishing machine are also provided on the upright section 202.

As was previously described, the backstop and side guides of the feed section of the finishing machine must be set to the respective length and width dimensions of the container blank. A thumbwheel switch assembly 212 is provided to designate the backstop dimension and a thumbwheel switch assembly 214 is provided to specify the side guide dimension. As with the other thumbwheel switch assemblies discussed hereinafter, the assemblies 212 and 214 each include a plurality of individually positionable segments of a sufficient number to specify the largest expected value of a particular dimension. Thus, for example, the backstop thumbwheel switch assembly 212 is provided with four thumbwheel switches each positionable between the decimal numbers 0 and 9. The backstop thumbwheel switch assembly 212 may thus specify any number between 0 inches and 99.99 inches. In addition, the thumbwheel switches of the assemblies 212 and 214 as well as those discussed hereinafter are conventional, commercially available switches having decimal indications and providing binary coded decimal output signals equivalent to the indications.

With continued reference to FIG. 8, thumbwheel switch assemblies 216 and 218 specify the desired dimensions of the respective second and first print registers (i.e., the registration of the printed matter) relative to the leading edge of the container blank. Thumbwheel switch assemblies 220 and 222 specify the dimensions between the centerline of the central slot 224 and the respective right-hand and left-hand slots 226 and 228. The slot depth dimension is specified by a thumbwheel switch assembly 230 and the panel depth dimension is specified by a thumbwheel switch assembly 232.

The board caliper or thickness dimension is specified by a thumbwheel switch assembly 234 and the flap width dimension is specified by a thumbwheel switch assembly 236. The flap crease dimension, i.e., the position of the flap crease relative to the centerline of the central slot 224, is specified by a thumbwheel switch assembly 238. The trim dimension, i.e., the location of the trim cut relative to the centerline of the central slot 224, is specified by a thumbwheel switch assembly 240.

Each of the thumbwheel switch assemblies with the exception of the caliper designating switch assembly 234 has an indicator light 242 associated therewith. The indicator lights 242 are energized with the particular appurtenance commanded to a desired position if specified dimensions exceed the machine limits or conflict with other box dimensions. The caliper dimension set of the thumbwheel switch assembly 234, however, is used to position several appurtenances. Accordingly, the appurtenances positioned in accordance with the caliper dimension, e.g., the pull rolls, print cylinders and the like, are each provided with a separate indicator 244 positioned within the diagram 210 of the machine in association with an appropriate appurtenance.

The inclined portion 204 of the operator's control panel 200 includes several control switches and indicators and is arranged essentially in two sections, one for automatic setup from memory and one for setup from the data supplies from the thumbwheel switch assemblies of the upright section 202. With continued reference to FIG. 8, the automatic setup portion of the control panel includes a "NUMBER NOT AVAILABLE" indicator 246, a "LEARN" control switch 248, a "PRODUCT ORDER NUMBER" thumbwheel switch assembly 250, "REPEAT" control switch 252 and an "OVERWRITE" control switch 254. The panel also includes a "POWER ON" indicator 256, an "AUTO HOME" switch 258, "AUTO" and "MANUAL" operation switches 260, a "JOG OPEN" switch 262, a "JOG CLOSED" switch 264, a "JOG AXIS SELECTION" thumbwheel switch assembly 266, a "POSITION START" control switch 268 and "EMERGENCY STOP" switch 270. A "CALIBRATION REQUIRED" indicator 272, an "IN HOME" indicator 274 and a "CYCLE COMPLETE" indicator 276 are also provided on the control panel.

The operation of the automatic positioning control unit 58 in conjunction with the container finishing machine may be generally understood with reference to FIGS. 7 and 8. A more detailed description of the manner in which the various functions performed by the automatic positioning control unit 58 are accomplished is provided hereinafter.

Referring now to FIGS. 7 and 8 and assuming that the unit is initially deenergized, the operator sets the main power switch in the on position. When the unit is first energized in this manner, the "CALIBRATION REQUIRED" indicator 272 lights indicating to the operator that the current positions of the various appurtenances are most likely not correctly stored in memory. The operator therefore depresses the "AUTO HOME" switch 258 causing the control motors to drive the various appurtenances to known "home" positions. The "IN HOME" indicator 274 provides an appropriate indication when all of the appurtenances have been appropriately positioned at the known home positions, thus signifying that calibration is complete.

When the calibration routine has been completed, the operator may set the operation of the unit in either automatic or manual mode through depression of the appropriate one of the "AUTO" and "MANUAL" operation switches 260. In the automatic mode of operation, the appurtenances may be positioned automatically in accordance with the dimensions set up on the thumbwheel switch assemblies of the upright section 202 or from data previously entered and stored in memory. In the manual mode of operation, the appurtenances may be positioned by the operator by jogging the positioning motors of the selected appurtenances.

In the automatic mode of operation, for example, the operator may select any appurtenance for manual positioning by identifying that appurtenance on the "JOG AXIS SELECTION" switches 266. That appurtenance may then be positioned by pressing either the "JOG OPEN" switch 262 or the "JOG CLOSED" switch 264. Each time the operator depresses one of the jog switches 262 and 264, the selected appurtenance is moved a predetermined small amount in the direction desired. Accordingly, the jog procedure is typically employed for minor adjustments of an automatic setup.

In the automatic mode of operation, the data for positioning the appurtenances may be obtained from either thumbwheel switch assemblies on the control panel 202 or from memory. Data from the thumbwheel switch assemblies is employed for positioning by first setting the switch assemblies to the desired dimensional quantities and then depressing the "POSITION START" switch 268. During the positioning cycle the "CYCLE COMPLETE" indicate flashes. When the positioning of all appurtenances is completed, the "CYCLE COMPLETE" indicator 276 remains lit to signify that the appurtenances are then in their commanded positions. A container blank may then be run through the finishing machine and the finished container may be carefully checked to ensure that it conforms to the desired dimensions of the customer order. If any dimensions are in error, the previously described jog routine may be utilized to correct any minor errors.

Once it has been determined that the dimensions set in the thumbwheel switch assemblies produce the desired container, the operator may insert a production order number on the thumbwheel switch assembly 250 and depress the LEARN control switch 248. Depression of the LEARN control switch 248 causes the dimensions set on the thumbwheel assemblies to be stored in memory together with the production order number set on the thumbwheel 250. If the production order number set on the switch assembly 250 is already in use, the "NUMBER NOT AVAILABLE" indicator 246 lights to indicate this condition. Otherwise, the dimensions are stored in memory in association with the production order number and can be recalled by depressing the "REPEAT" control switch 252 after setting the desired production order number on the switch assembly 250. When a particular production order number is recalled from memory in this manner, depression of the position start switch 268 causes the appurtenances to be positioned in accordance with the date recalled from memory rather than that inserted in the thumbwheel switch assemblies.

If the operator sets a particular production order number on the switch assembly 250 and finds that the "NUMBER NOT AVAILABLE" indicator lights when the "LEARN" button 248 is depressed, the production order number must either by changed or the new data stored in place of the data already in memory. To replace data relating to a particular production order number with new data, the "OVERWRITE" switch 254 is provided. Should data already be in memory under a particular production order number, the "OVERWRITE" switch 254 may be unlocked and depressed. Depression of the "OVERWRITE" control switch 254 replaces the dimensions stored in connection with the indicated production order number with the dimensions currently set into the thumbwheel switch assemblies.

The signal flow between the circuits which performs the various operations described is shown in FIG. 7. As can be seen in FIG. 7, control and dimensional data is supplied from the control panel 200 to the control logic circuit 300 as the CDT and THUMB signals. The control logic circuit 300 functions to interface the computer 400 and the control panel 200 so that the data signals CDT and THUMB are supplied to the computer as input signals when required. In addition, the STOP signal is supplied to the control logic circuit 300 in response to the depression of the EMERGENCY STOP switch 270 to inhibit operation of the motors which position the appurtenances.

The control logic circuit also interfaces the container finishing machine with both the computer 400 and the control panel 200. The signals IND which energize the indicators on the control panel 200 are supplied to the control panel from the computer 400 via the control logic circuit 300 in response to various signals (e.g., HME, LMT, 2CR, 3CR and RMT) received from the finishing machine. Similarly, the computer 400 supplies control signals to the container finishing machine through the control logic circuit 300 to control the operation of the A.C. motors and the stepping motors on the finishing machine. Thus, for example, A.C. positioning motors on the finishing machine are positioned in response to the computer 400 through the supply of the ACMC signals to the finishing machine by way of the control logic circuit 300. The STMC signals are supplied to the stepper motors on the finishing machine in response to signals supplied from the computer 400 through the stepper motor indexer circuit 500 and the translators and motor control circuits 600.

CONTROL LOGIC CIRCUIT

Figure 9:
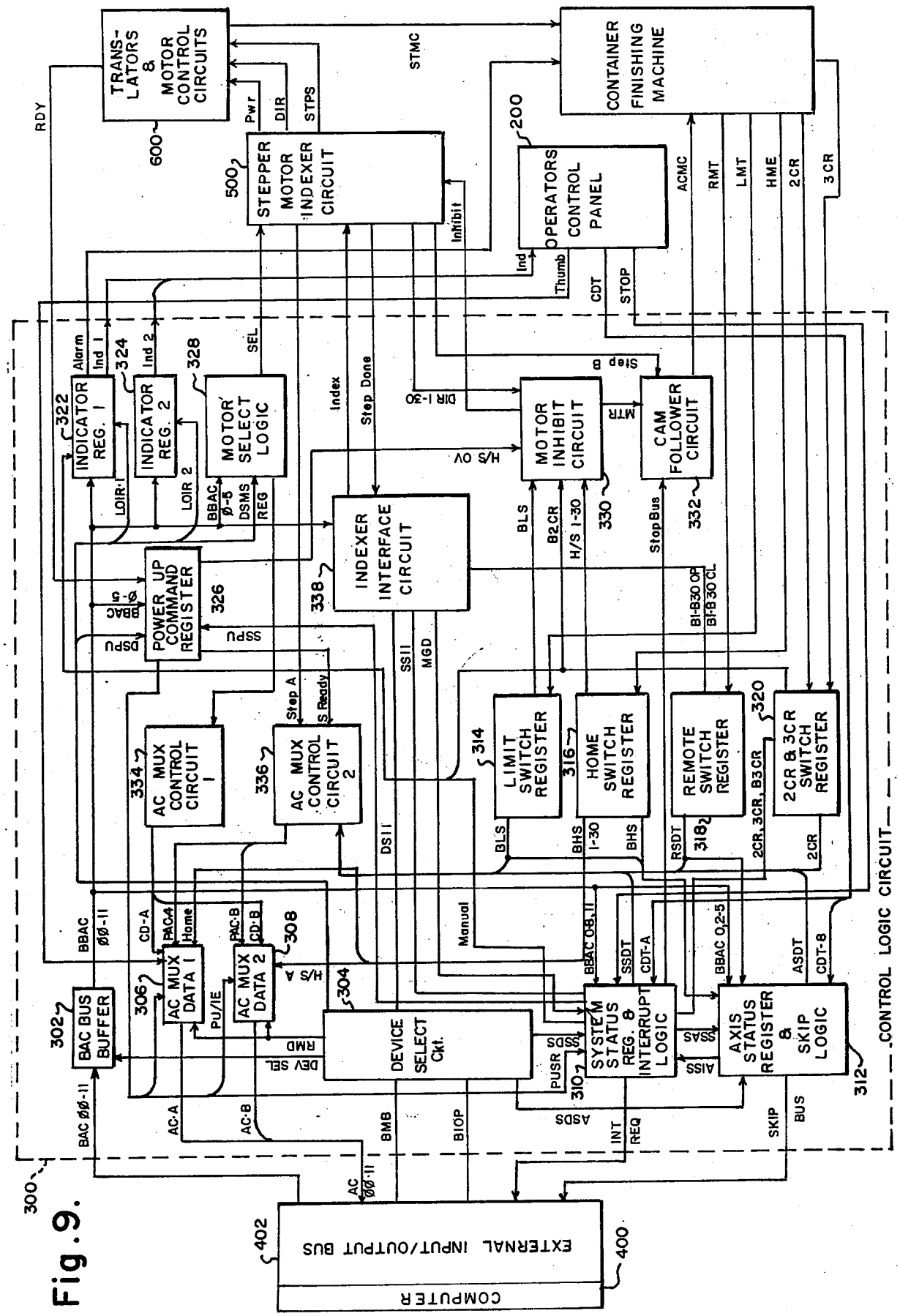
FIG. 9 is a detailed functional block diagram illustrating the control logic circuit of FIG. 7 in greater detail.

One embodiment of the control logic circuit 300 of FIG. 7 is illustrated in greater detail in FIG. 9. To facilitate an understanding of the operation of the control logic circuit in conjunction with the computer and the remainder of the system, flow diagrams of FIGS. 10A–10BB are also provided.

As was mentioned previously, the control logic circuit 300 functions as an interface in directing the flow of data between the computer 400 and the container finishing machine, the operator's control panel 200, the translators and motor control circuits 600, and the stepper motor indexer circuit 500. Although the control logic circuit 300 controls data flow to and from the computer 400, the control logic circuit 300 receives instructions from the computer 400, as will be described hereinafter in greater detail, and therefore the computer 400 ultimately controls all data flow.

With continued reference to FIG. 9, the control logic circuit 300 receives control data from the computer through the external input/output bus 402 in the form of 15 BMB bits and 3 BIOP bits. These bits are received by the device select circuit 304 which generates various signals to instruct the remaining elements of the control logic circuit 300 when to transmit data to the computer or when to accept data from the computer or other sources. In general, data in the various registers, etc., of the control logic circuit 300 will only be supplied to other elements upon initiation of a signal from the device select circuit 304. Twelve data bits, BAC00-11 (BAC bits), are received from the computer and temporarily stored in the BAC bus buffer 302. When the device select circuit 304 issues the device select signal DEV SEL, the buffered BAC bits, BBAC bits, are sent to various elements of the control logic circuit 300 as will be described hereinafter in greater detail.

All data and status information sent to the computer from the control logic circuit 300 is stored in AC MUX DATA #1 register 306 and AC MUX DATA #2 register 308. Grounding of the interrupt request signal INT REQ from the system status register and interrupt logic 310 informs the computer that the control logic circuit has information ready to be transformed. When it is ready to receive data, the computer will issue, through the device select circuit, the read MUX data signal RMD to AC MUX DATA #1 register 306 and AC MUX DATA #2 register 310 and the 12 data bits AC00-11 will be transferred to the computer where the data is OR'ed with the contents of the computer accumulator and results loaded into the accumulator. The SKIP BUS signal from the axis status register and skip logic 312 instructs the computer to skip the next sequential step in the program.

Data signals on the positions of the various appurtenances in the container finishing machine are received by the control logic circuit 300 in the form of limit switch signals LMT, home switch signals HME, remote switch signals RMT and 2CR and 3CR switch signals. The switch signals LMT, HME, RMT, 2CR and 3CR are stored in the respective limit switch register 314, home switch register 316, remote switch register 318, and the 2CR and 3CR switch register 320, and then supplied to various other elements in the control logic circuit 300.

The signals IND which energize the indicators on the operator's control panel 200 include the IND1 signals supplied by indicator register #1 (322) and IND2 supplied by indicator register #2 (324). Data from the computer in the form of the BBAC bits is supplied to the registers 322, 324 as the IND1 and IND2 signals upon initiation of the load indicator register #1 signal LOID1 and load indicator register #2 signal LOID2 by the device select circuit 304. Indicator register #1 also supplies an alarm signal ALARM to the container finishing machine. Indicator register #1 also receives a manual signal MANUAL from the system status register 310 and a 2CR signal from the 2CR register 320.

The control data output signals CDT from the operator's control panel 200 are supplied in part as the CDT-A signals to the system status register 310 and additionally as the CDT-B signals to the axis status register 312. The STOP signal is also supplied to the system status register from the operator's control panel 200. The thumbwheel data signals THUMB are supplied by the control panel 200 to AC MUX DATA #1 register 306.

The system status register 310 also receives BBAC bits, an ASSS signal from the axis status register 312, a MGD signal from the indexer interface circuit 338, a PUSR signal from the power up command register 326, 2CR and 3CR signals and a control signal SSDA from the device select circuit 304, and supplies a system status signal SSDT (e.g., LEARN, REPEAT, etc.) to the AC MUX control circuit #2 336. The information contained in the SSDT and ASDT signals will reach the computer over the AC00-11 data lines as will be described hereinafter.

The power up command register 326 receives the power ready signal RDY from the translation and motor control circuits 600, status signals SSPO from the system status register 310, data signals from the BBAC buffer 302 and a control signal DSPU from the device select circuit 304. Information in the power up command register 326 is supplied to AC MUX DATA #1 selector circuits 306 as the 2IE signal, to AC MUX DATA #2 selector circuits 308 as the PU/IE signal, to the system status register 310 as the PUSR signal, and to the motor inhibit circuit 330 as a home switch override signal H/S OV, but only upon initiation of the DSPU signal by the device select circuit 304.

The motor inhibit circuit 330 receives limit switch signals BLS from the limit switch register 314, a 2CR inhibit signal B2CR, home switch signals H/S1-30 from the home switch register 316, a home switch override H/S OV from the power up command register 326 and signals on the direction of movement of each stepping motor DIR 1-30 from the stepper motor indexer circuit 500 and generates inhibit signals INHIBIT to stop the movement of the stepper motor when the appurtenance has reached the designated home position, i.e., tripped the home limit switch.

A cam follower circuit 332 receives a STOP BUS signal from the system status register 310, a control signal STEP-B from the stepper motor indexer circuit 500 and a signal MTR from the motor inhibit circuit 330 and supplies a.c. motor control signals ACMC to the container finishing machine. The a.c. motor control signals ACMC control the energization of the a.c. motors that drive the appurtenances on the folder/gluer section 48 of the finishing machine. In this connection, it should be noted that the a.c. motors are slaved to the corresponding yokes of the slotter/creaser as described previously and the a.c. motor control signals ACMC are thus directionally related to the slotter/creaser stepping motor signals (motors 15, 16 and 17 as set forth hereinafter) STEP-B and controlled in duration by the ultimate positions assumed by the slotter/creaser heads.

A motor select logic circuit 328 receives signals BBAC00 to BBAC 0/5 from the BAC bus buffer 302 and upon initiation of the DSMS signal from the device select circuit 304 supplies a motor select signal SEL to the stepper motor indexer circuit 500 to designate which of the motors is to be stepped in accordance with the signals (i.e., direction and number of steps) supplied from the computer. The motor select logic 328 also supplies a signal REG related to the motor selected to the AC MUX control circuit #1 334.

An indexer interface circuit 338 receives BBAC bits, remote switch signals B1-B300P and B1-B30CL from the remote switch register 318, SSII signal from the system status register 310, and a control signal DSII from the device select circuit 304, and supplies the INDEX signal to the stepper motor indexer circuit 500. The INDEX signal contains the remaining information needed (in conjunction with the motor select signal SEL from the motor select logic 328) so that the stepper motor indexer circuit 500, a standard control circuit for stepping motors, can supply the direction DIR, number of steps STPS and power PWR signals to each stepping motor in the translator and motor control circuits 600. The indexer interface circuit 338 also receives a signal STEP DONE indicating when each stepping motor has finished moving and supplies a signal MGD to the system status register 310 which in turn generates a position done signal POS DONE.

The AC MUX control circuit #1 334, AC MUX control circuit #2 336, AC MUX DATA #1 select circuit 306 and AC MUX DATA #2 select circuit 308 together receive all data which is to be sent to the computer, store the data and send the data to the computer 12 bits at a time over the AC00-11 signal lines as the computer requests data. As mentioned before, the AC MUX control circuit #1 334 receives the REG signal from the motor select logic 326, and supplies a CD-A signal to AC MUX DATA #1 select circuit 306 and a CD-B signal to AC MUX DATA #2 select circuit 308. The AC MUX control circuit 336 receives an S READY signal from the power up command register 326, a STEP-A signal (indicating certain motors have finished moving) from the stepper motor indexer circuit 500, a limit switch signal BLS from the limit switch register 314, a remote switch signal RSDT from the remote switch register 318, a 2CR signal from the 2CR switch register 370, an axis status signal ASDT from the axis status register 312 and a system status signal SSDT from the system status register 310 and supplies all these signals to the AC MUX DATA #1 circuit 306 as the PAC-A signal and to the AC MUX DATA #2 circuit 308 as the PAC-B signal. In addition, the AC MUX DATA #1 circuit 306 also receives the thumbwheel switch signal THUMB from the operation control panel 200, a 2IE signal from the power up command register 326, and a home switch signal HOME from the home switch register 316. The AC MUX DATA #2 circuit 308 also receives a PU/IE signal from the power up command register 326, and a home switch signal H/S A from the home switch register 316. As mentioned previously, all this data is stored in the AC MUX DATA circuits until the device select circuit initiates the read mux data RMD signal and then the data is sent to the computer 400 over the data lines AC00-11.

To aid in an understanding of the invention from the foregoing and subsequent description and drawings, it should be noted that the system as described is capable of positioning up to thirty stepper motor controlled appurtenances. However, the disclosed embodiment of the finishing machine has only twenty-seven stepper motor controlled appurtenances (assuming that a die cut section is provided). The motor associated with the various appurtenances are identified as follows:

| Motor # | STEPPING MOTORS Function |
|---|---|
| MTR1 | Feed Loader DS Side Guide |
| MTR2 | Feed Loader OS Side Guide |
| MTR3 | Feed Loader Backstop |
| MTR4 | Feed Section DS Side Guide |
| MTR5 | Feed Section OS Side Guide |
| MTR6 | Feed Section Backstop |
| MTR7 | Feed Section Pull Roll Caliper |
| MTR8 | 1st Print Section Register |

-continued

| Motor # | STEPPING MOTORS Function |
|---|---|
| MTR9 | 1st Print Section Impression Caliper |
| MTR10 | 1st Print Section Pull Roll Caliper |
| MTR11 | 2nd Print Section Register |
| MTR12 | 2nd Print Section Impression Caliper |
| MTR13 | 2nd Print Section Pull Roll Caliper |
| MTR14 | Creaser-Slotter Section Trim Knife |
| MTR15 | Creaser-Slotter Section R.H. Slot Knife |
| MTR16 | Creaser-Slotter Section L.H. Slot Knife |
| MTR17 | Creaser-Slotter Section Flap Crease |
| MTR18 | Creaser-Slotter Section Slot Depth |
| MTR19 | Creaser-Slotter Section Panel Depth |
| MTR20 | Creaser-Slotter Section Pull Roll Caliper |
| MTR21 | Creaser-Slotter Section Slotter Caliper |
| MTR22 | Unspecified |
| MTR23 | Unspecified |
| MTR24 | Unspecified |
| MTR25 | Stacker DS Side Guide |
| MTR26 | Stacker OS Side Guide |
| MTR27 | Stacker Backstop |
| MTR28 | Stacker Kicker |
| MTR29 | Die-Cut Section Register |
| MTR30 | Die-Cut Section Pull Roll Caliper |

| Motor # | A.C. MOTORS Function |
|---|---|
| MTR75 | Folder O.S. Rail |
| MTR76 | Folder D.S. Rail |
| MTR78 | Folder Glue Pot |

To further aid in an understanding of the invention, the following list provides identification of thumbwheels as they are set forth in the description and drawings:

| I.D. | THUMBWHEEL IDENTIFICATION Appurtenance |
|---|---|
| RSS1 | Side Guide (000.0 - 999.9) |
| RSS2 | Trim (00.00 - 99.99) |
| RSS3 | Flap Crease (00.00 - 99.99) |
| RSS4 | Flap (0.00 - 9.99) |
| RSS5 | Backstop (00.00 - 99.99) |
| RSS6 | Panel Depth (00.00 - 99.99) |
| RSS7 | Print Register 1 (00.00 - 99.99) |
| RSS8 | Print Register 2 (00.00 - 99.99) |
| RSS9 | RH Slot (00.00 - 99.99) |
| RSS10 | LH Slot (00.00 - 99.99) |
| RSS11 | Slot Depth (00.00 - 99.99) |
| RSS12 | Caliper (.000 - .999) |
| RSS13 | Production Order No. (0000 - 9999) |
| RSS14 | Die-Cut Register (00.00 - 99.99) |
| RSS15 | Jog Axis Selection (00 - 99) |

Figure 10A:
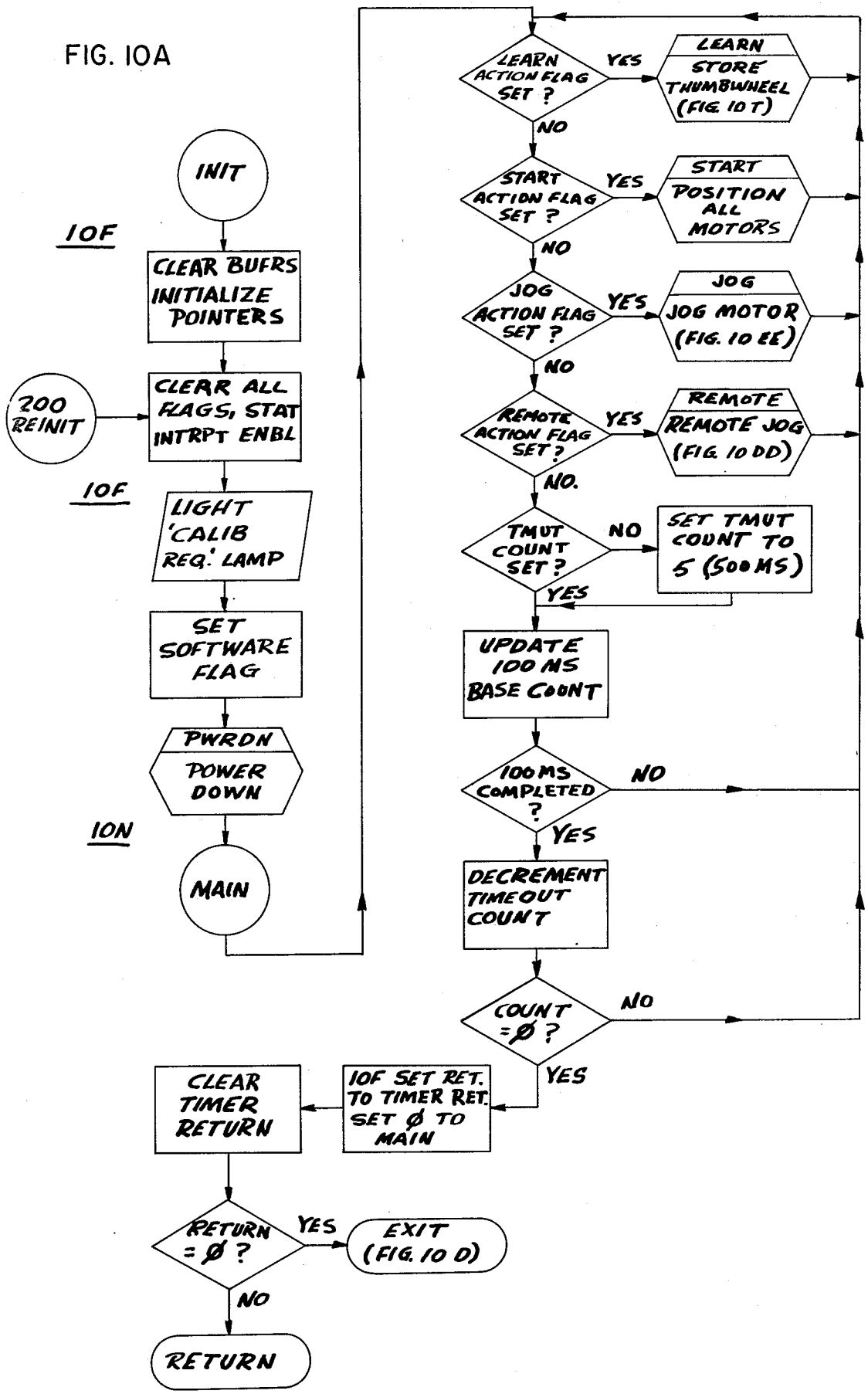
FIGS. 10A-10BB are flow diagrams illustrating the operation performed by the system of FIGS. 7-9.
Figure 10:
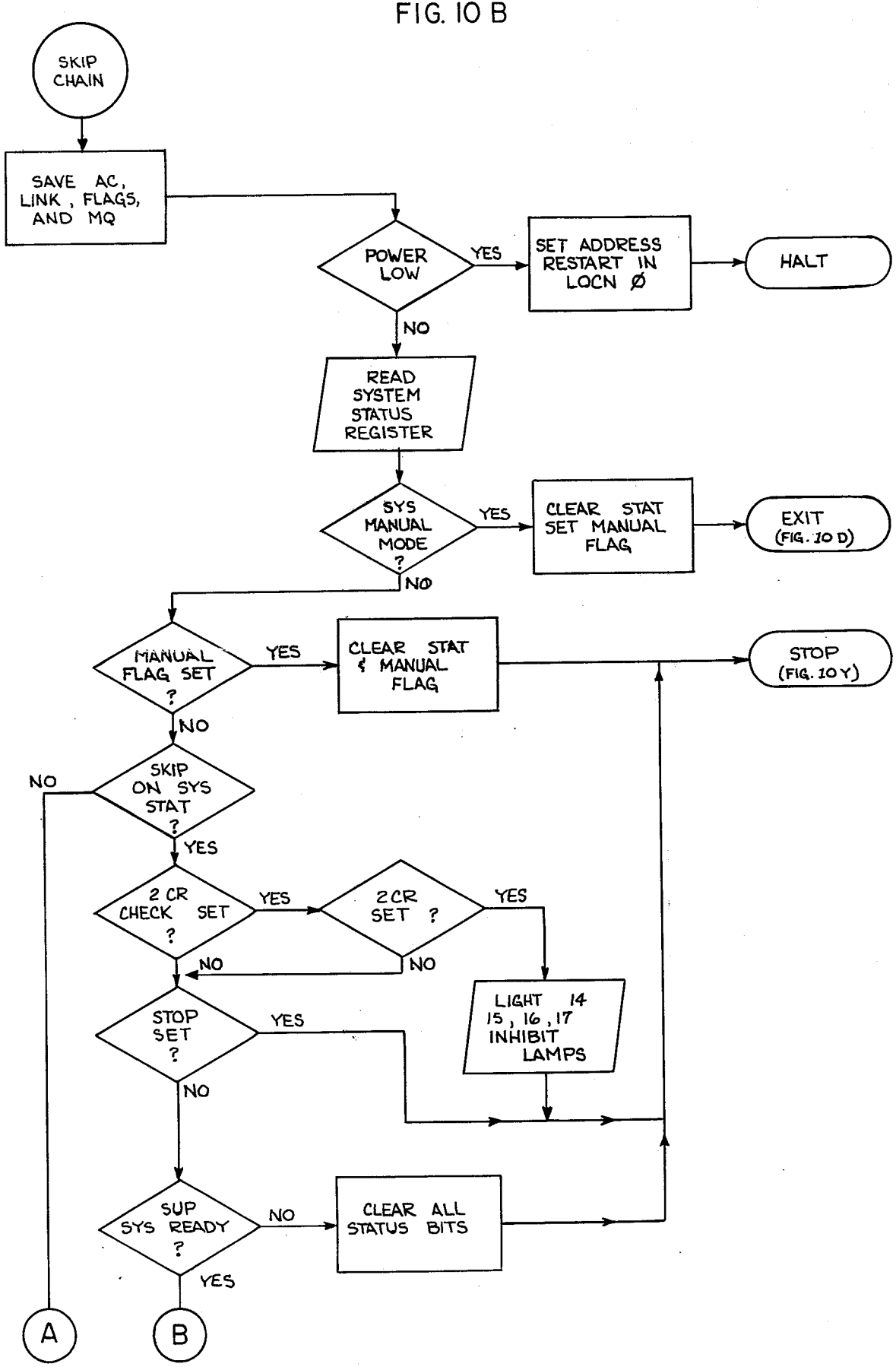
Figure 10C:
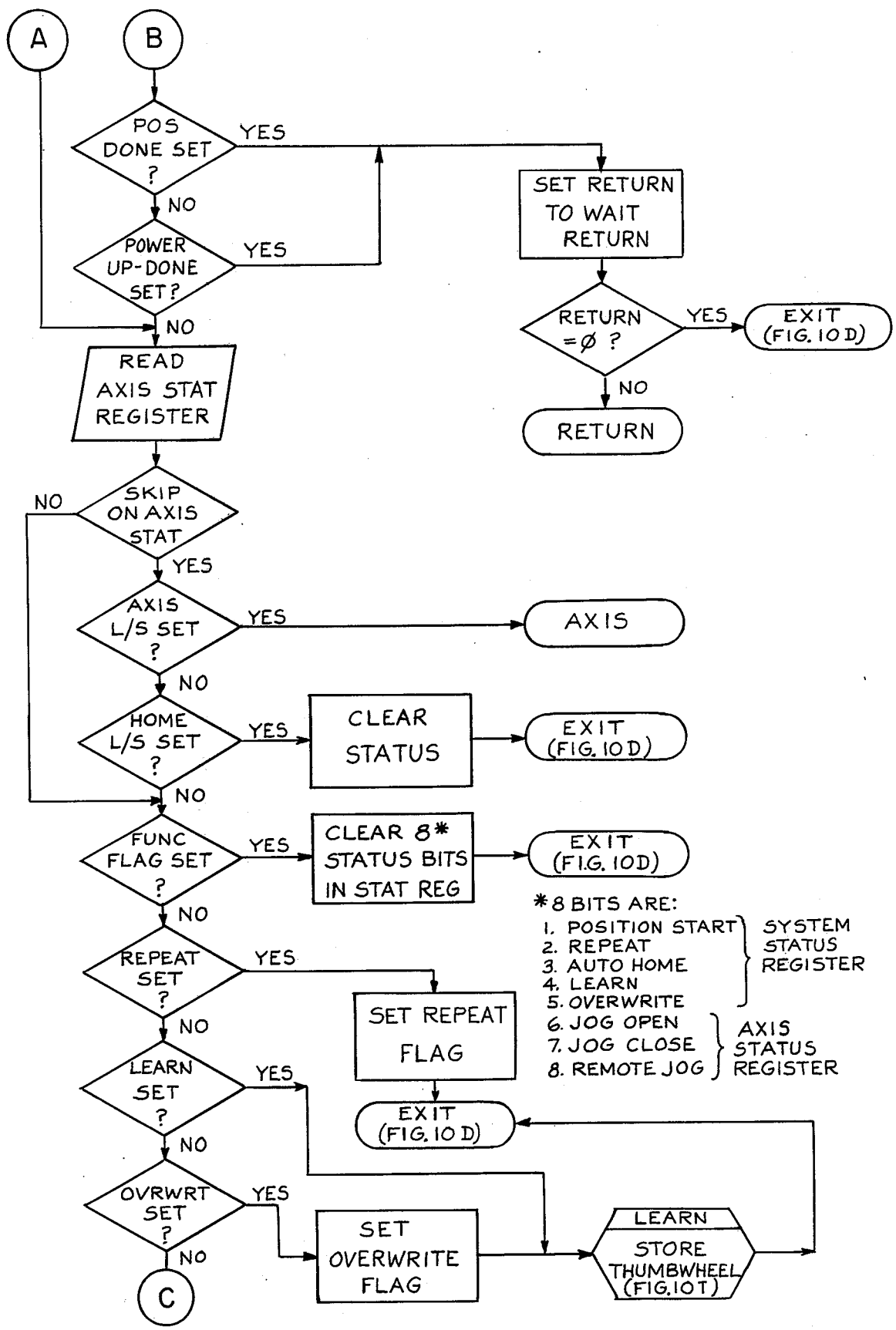
Figure 10D:
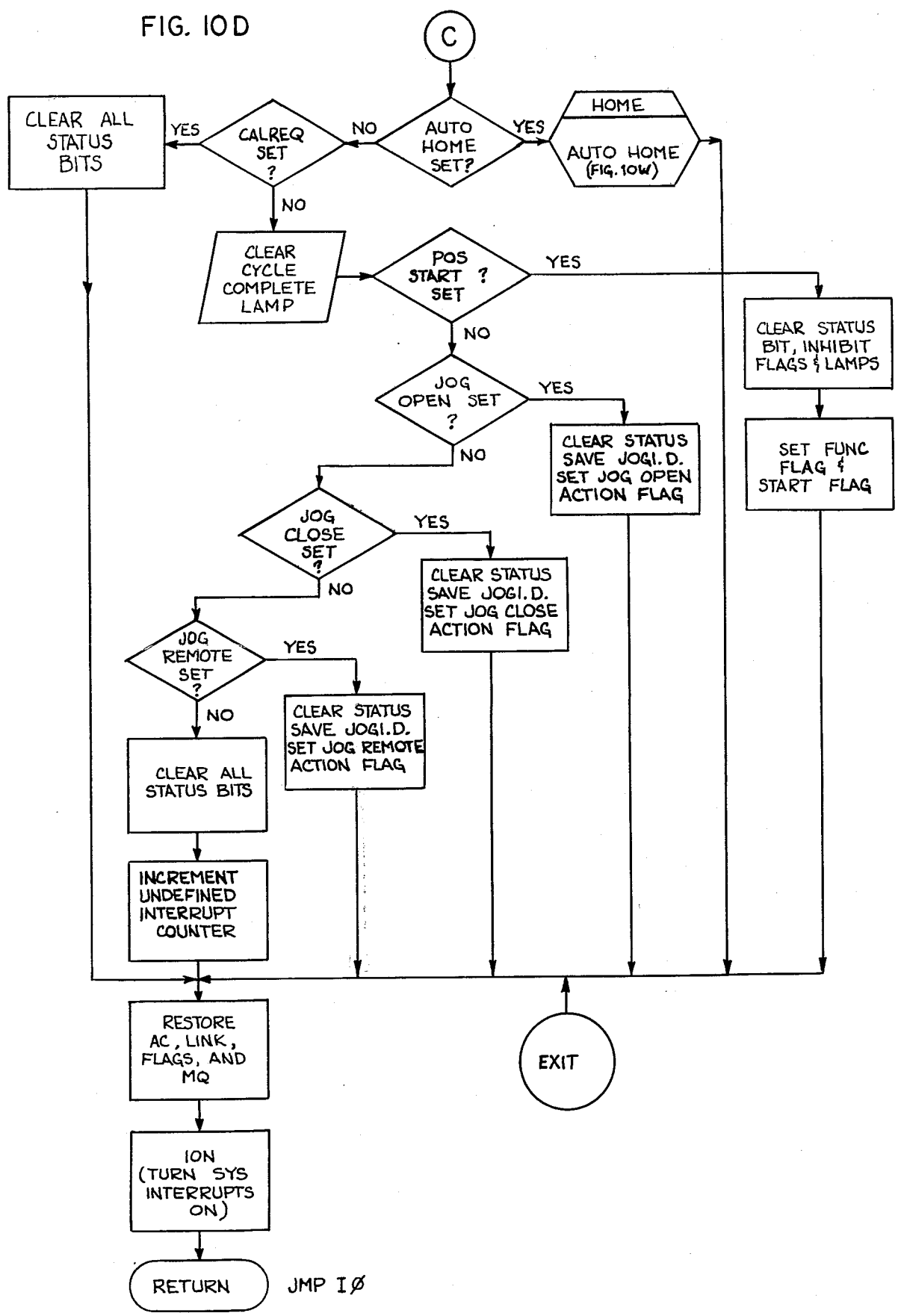
Figure 10E:
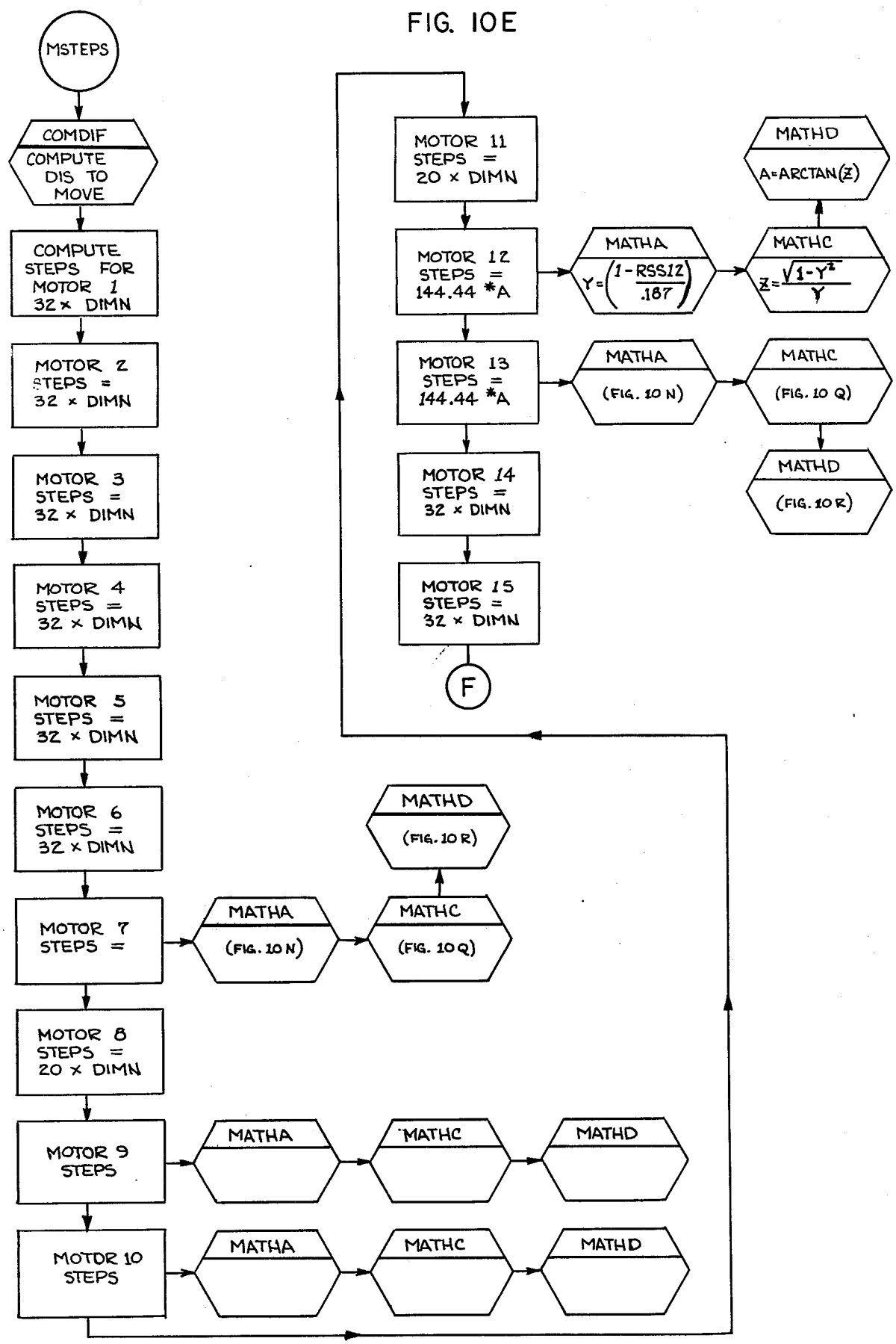
Figure 10F:
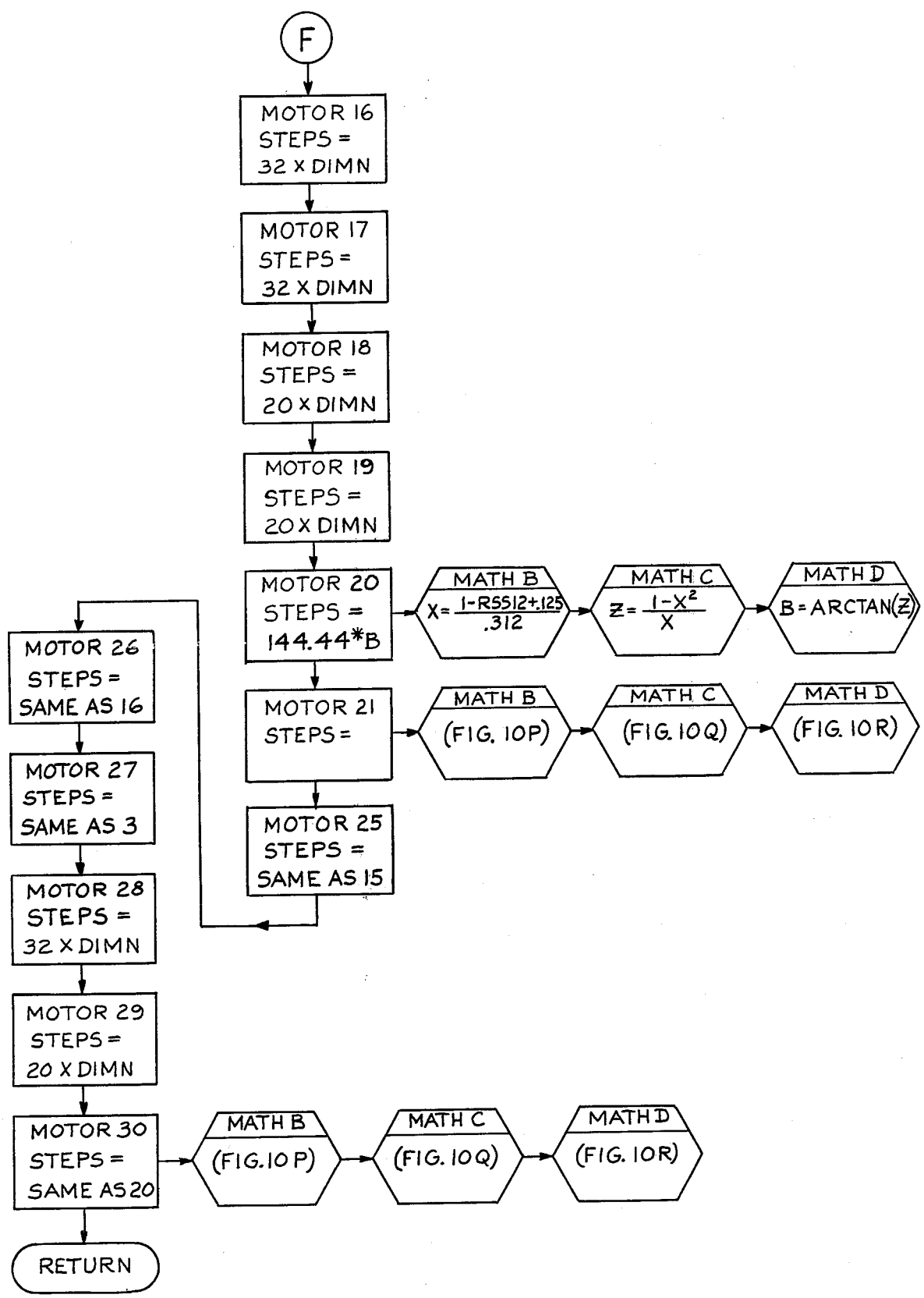
Figure 10G:
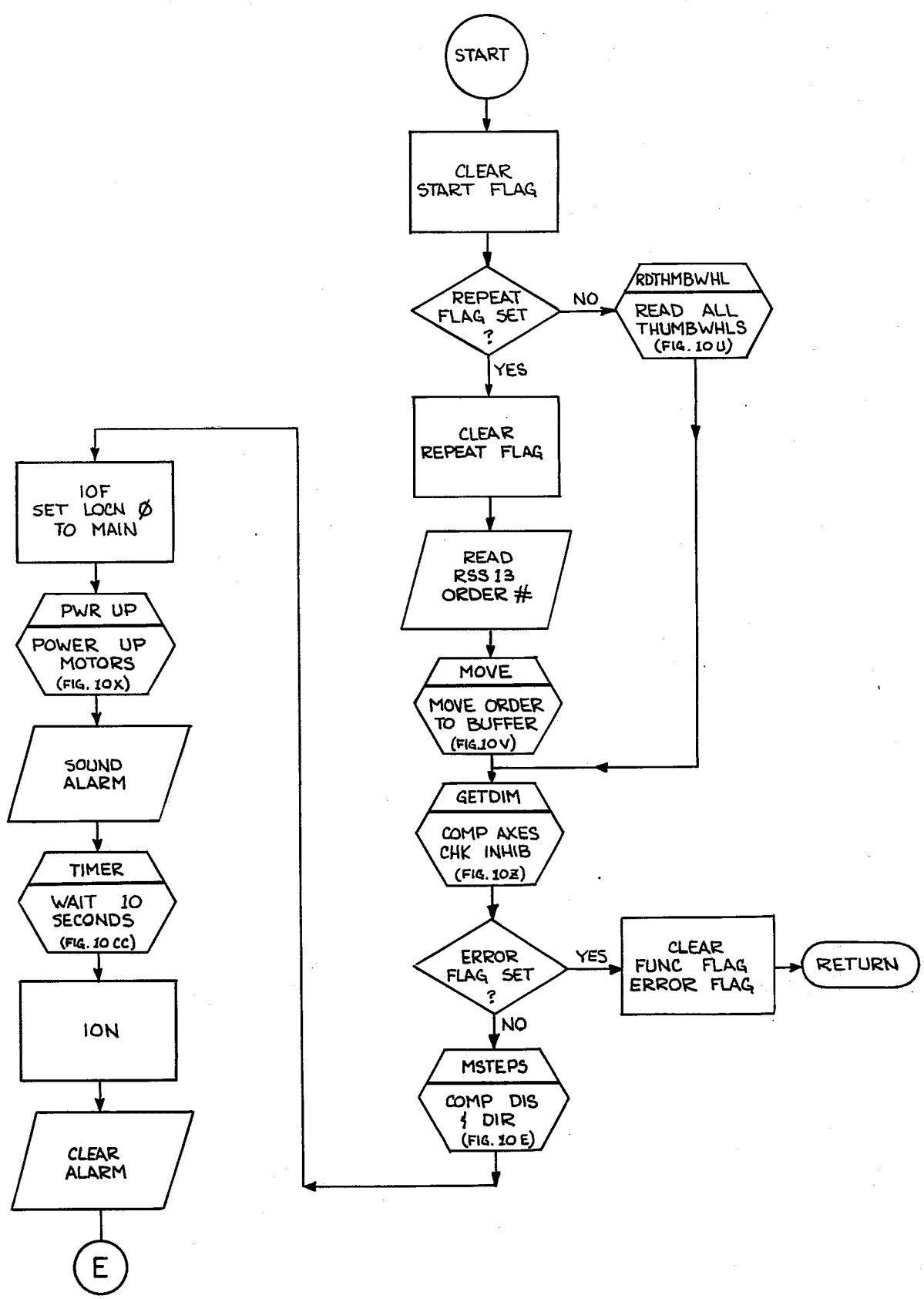
Figure 10H:
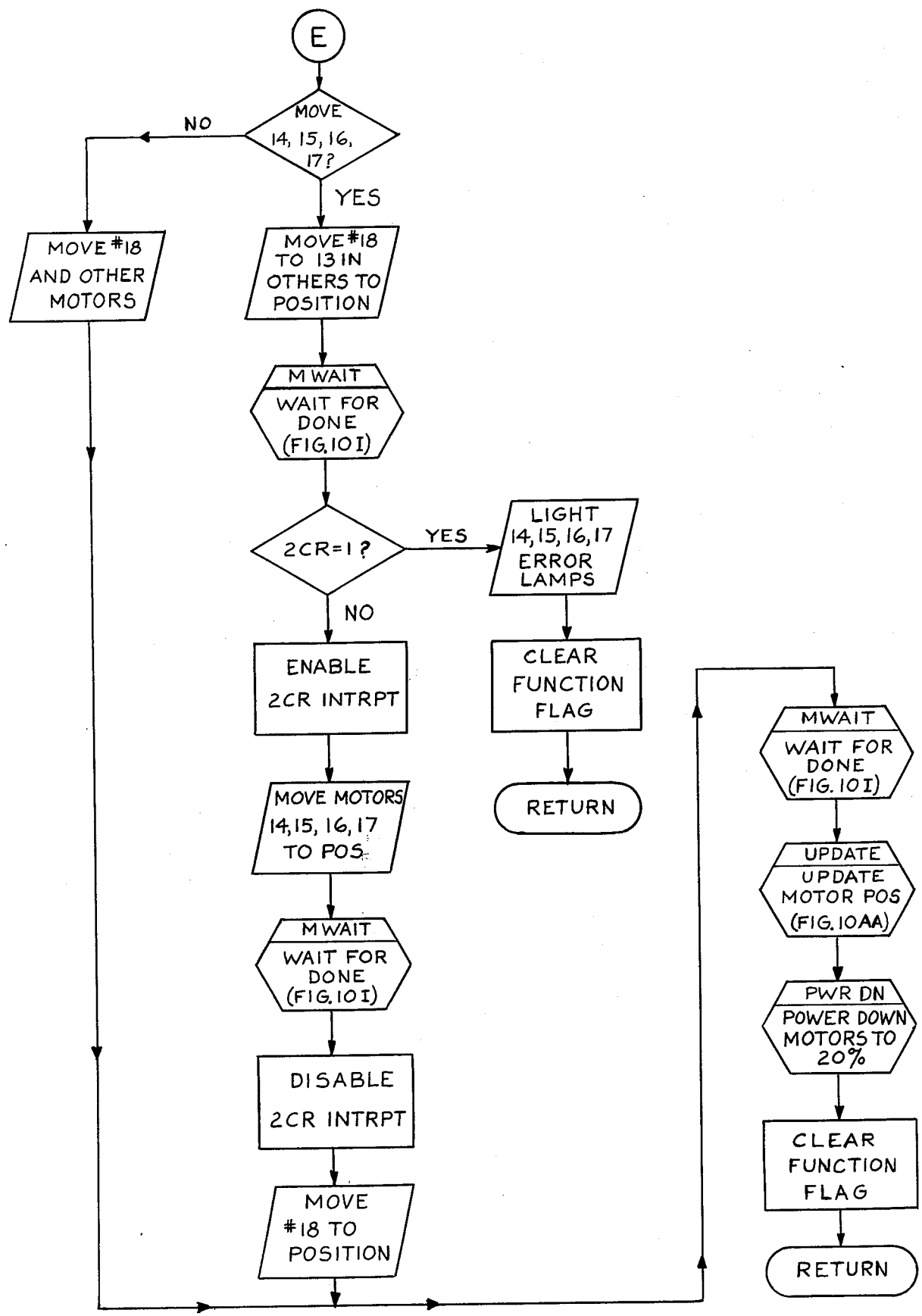
Figure 10I:
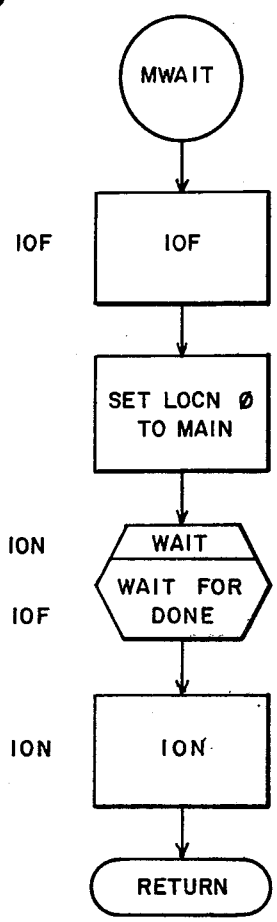
Figure 10J:
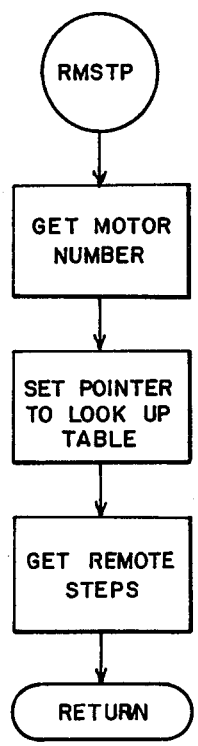
Figure 10K:
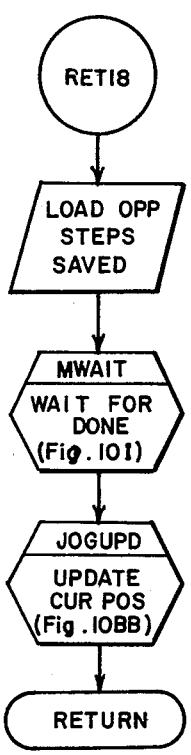
Figure 10L:
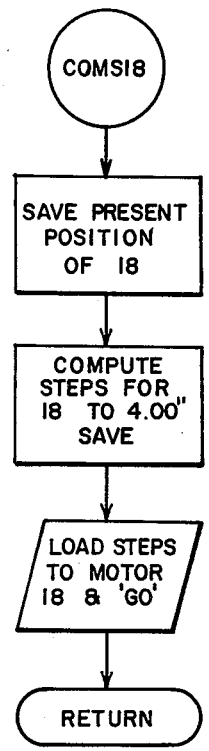
Figure 10M:
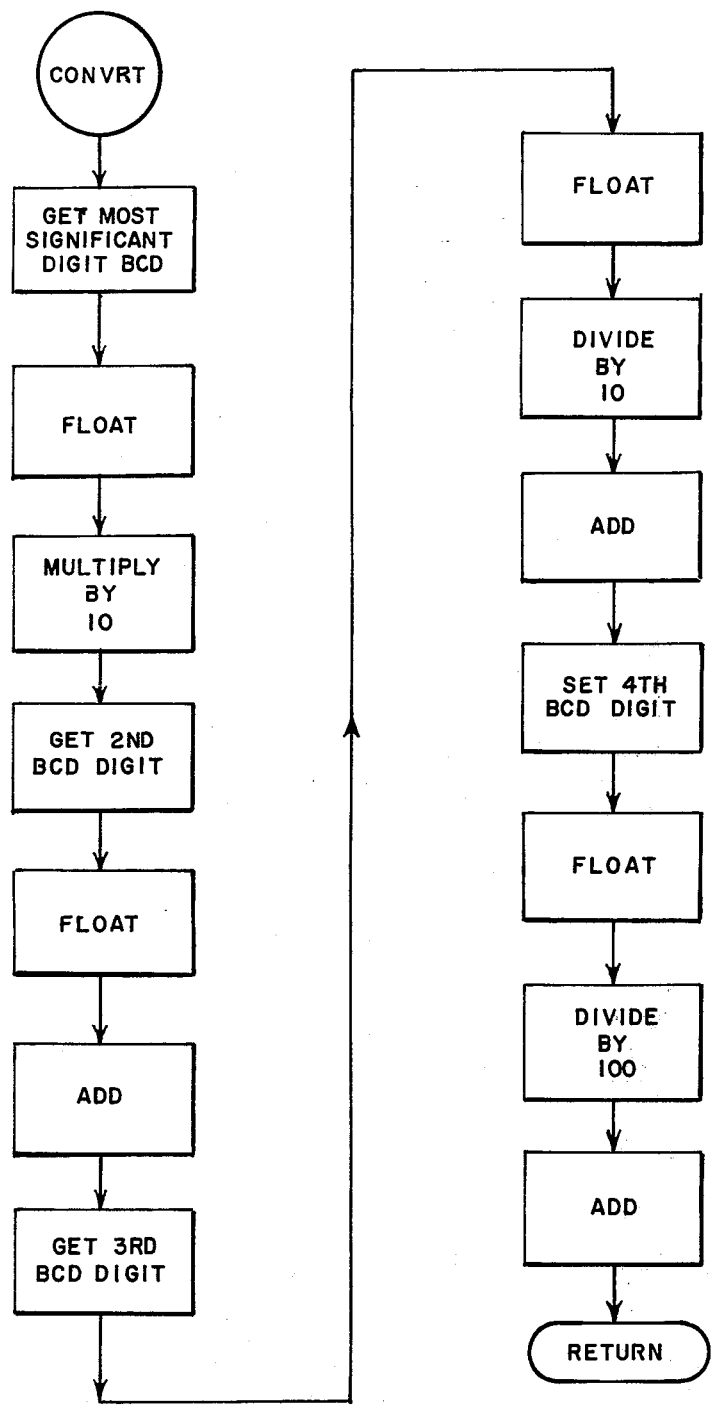
Figure 10N:
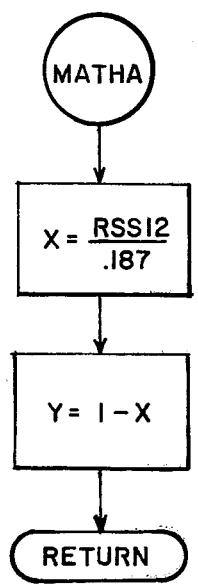
Figure 10P:
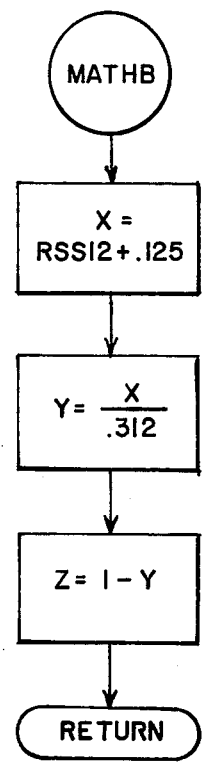
Figure 10Q:
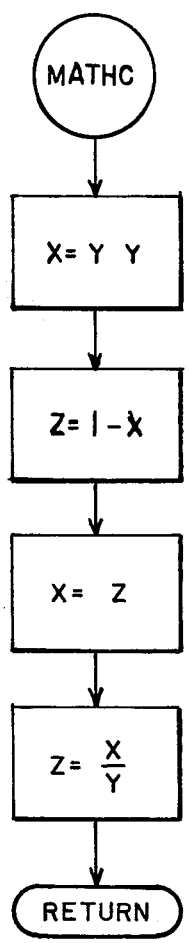
Figure 10R:
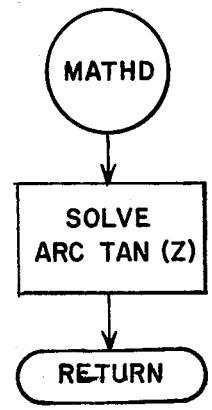
Figure 10S:
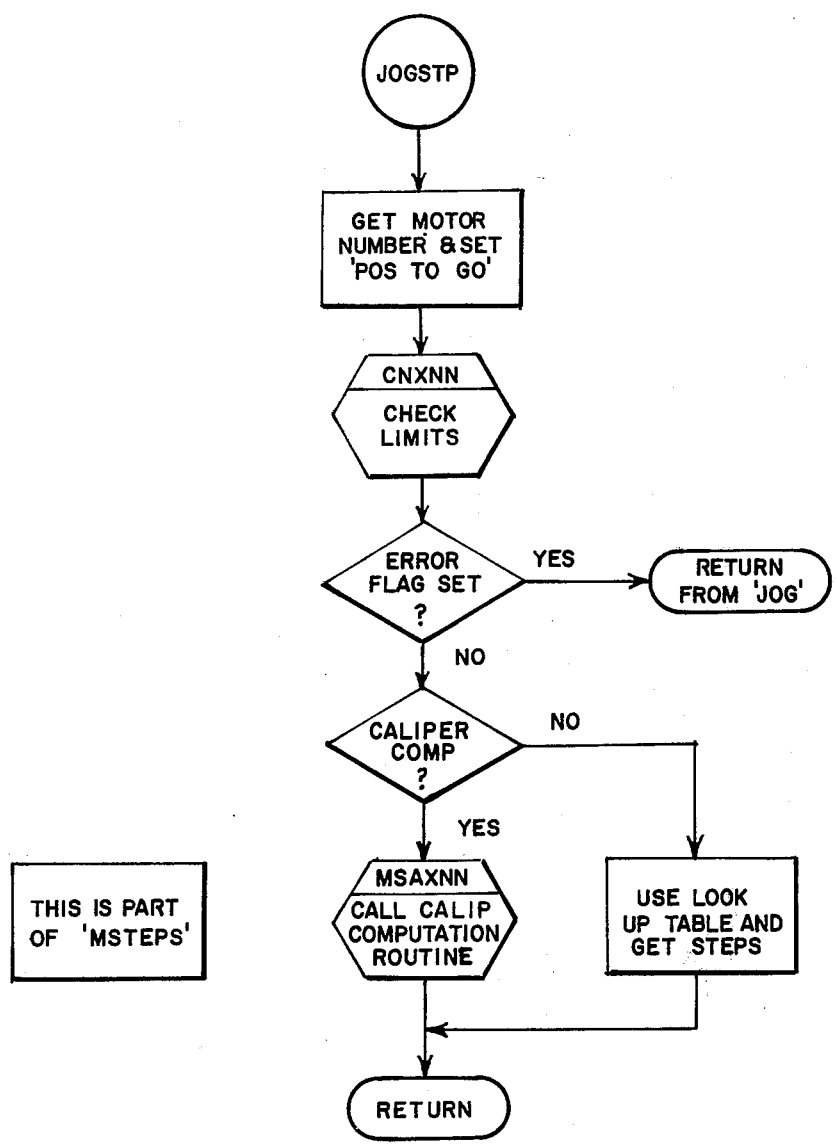
Figure 10T:
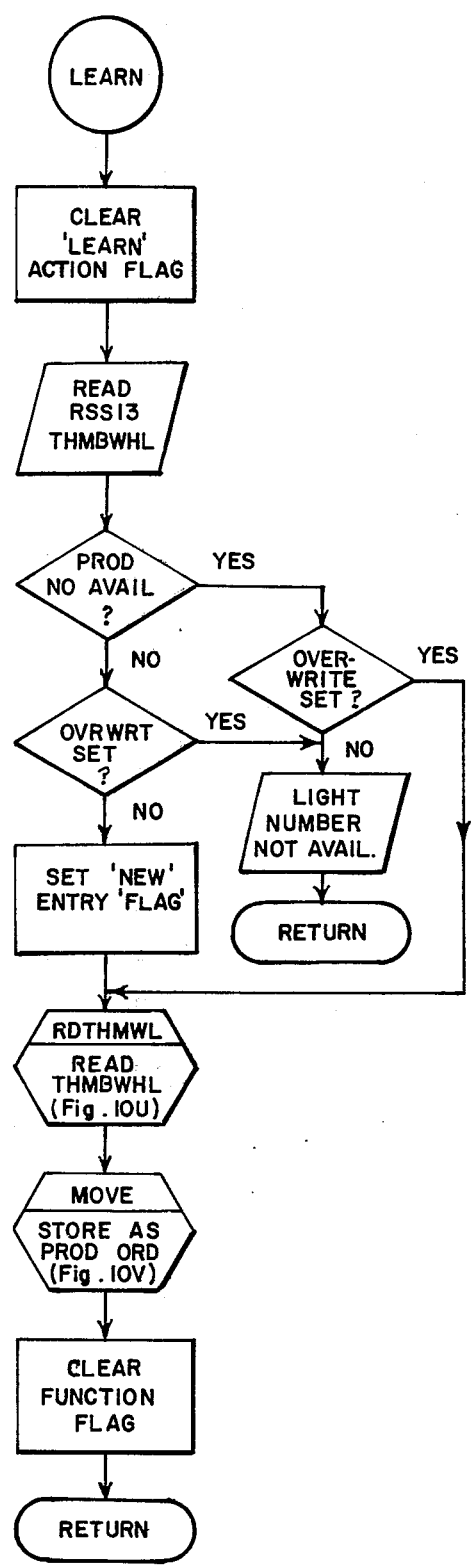
Figure 10U:
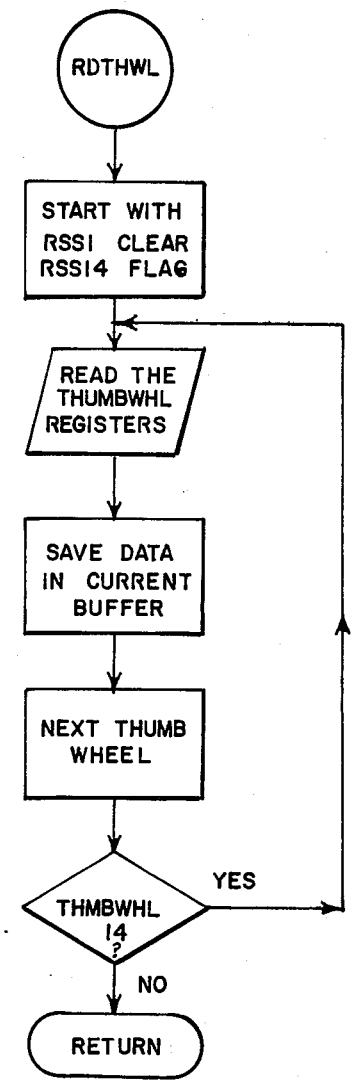
Figure 10V:
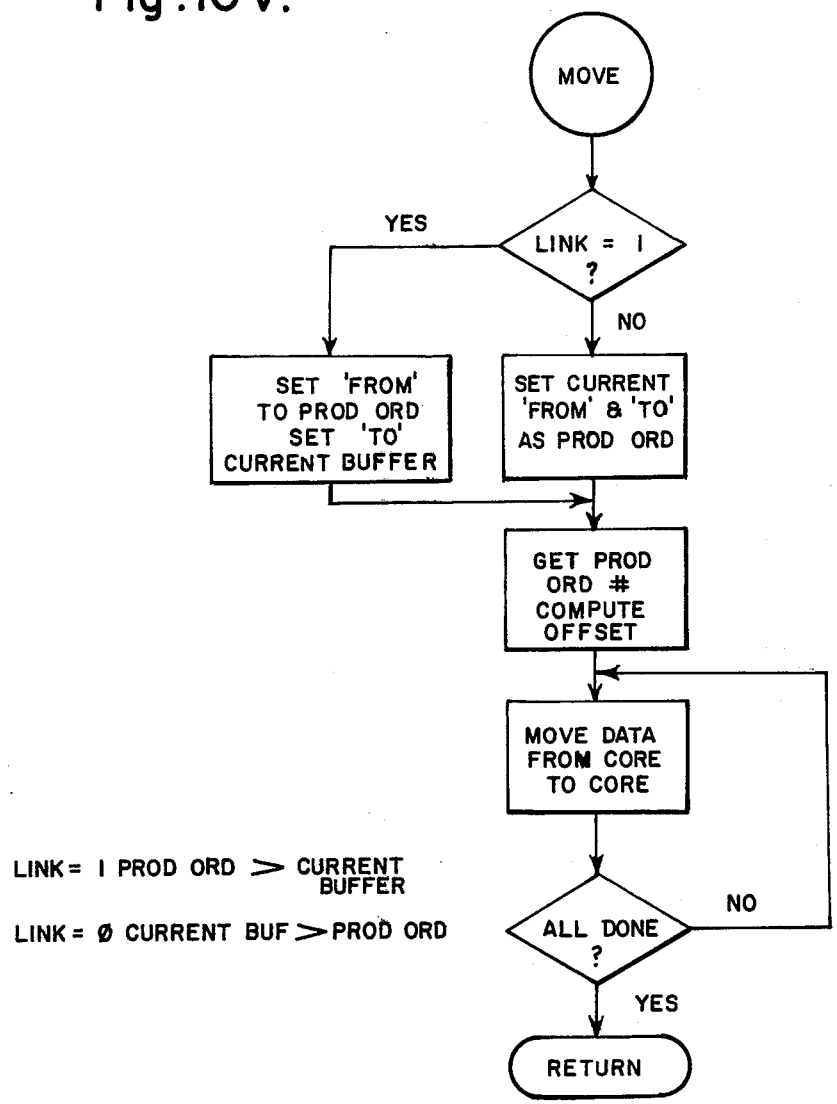
Figure 10W:
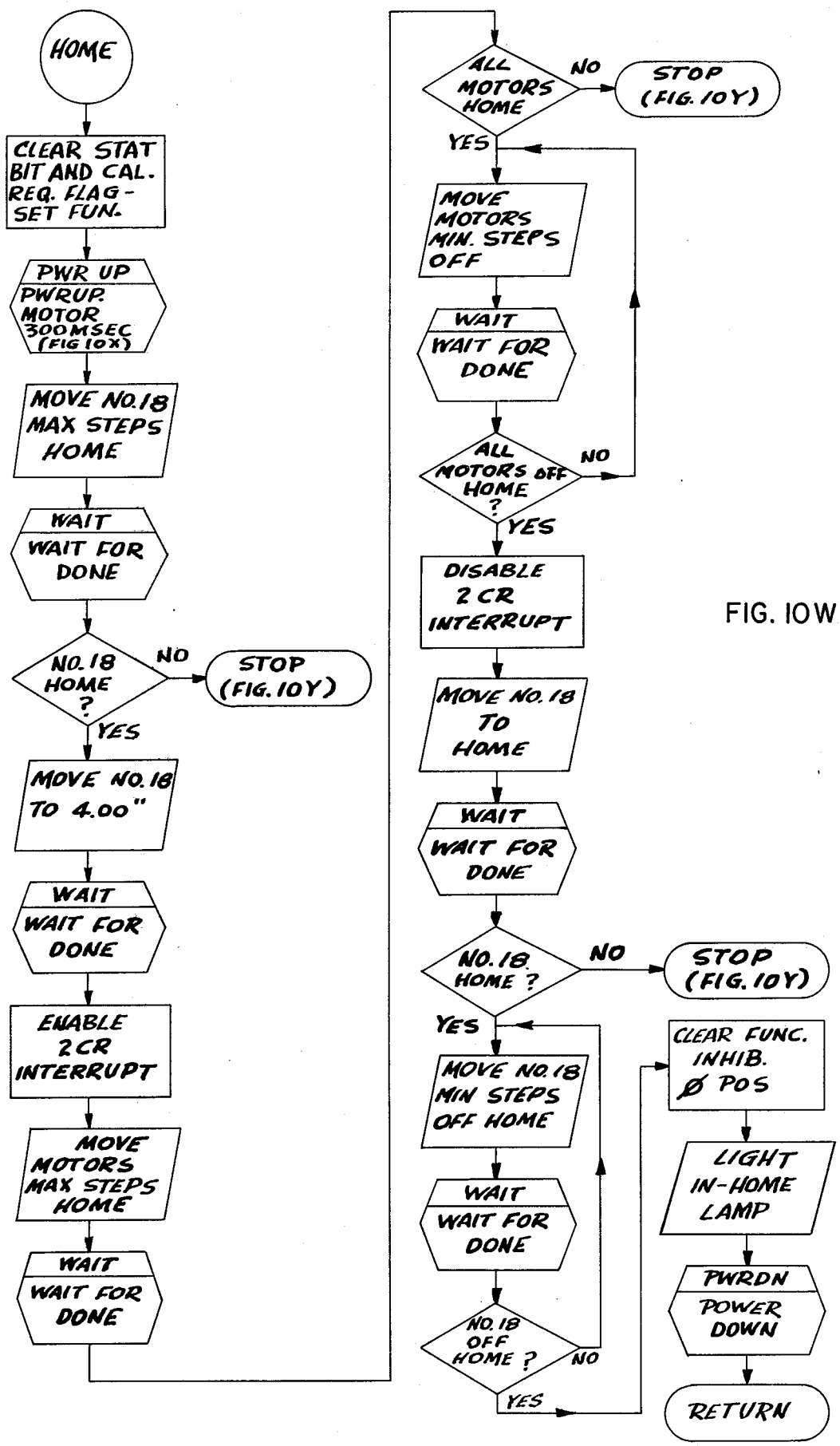
Figure 10X:
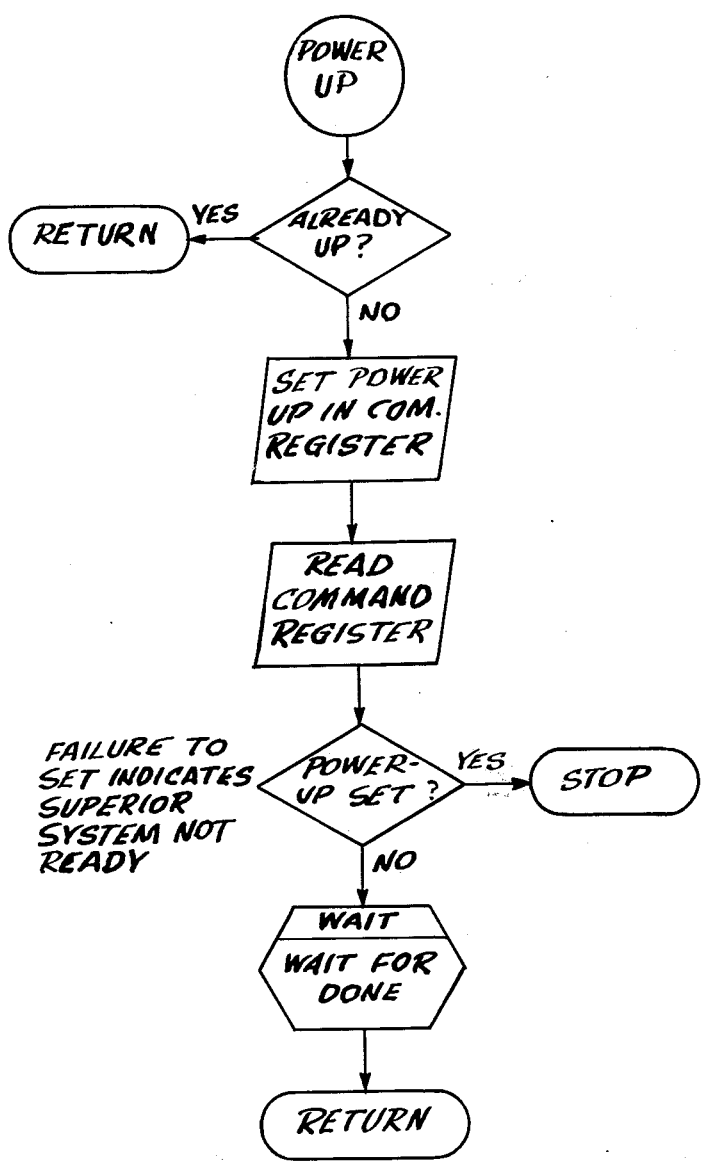
Figure 10Y:
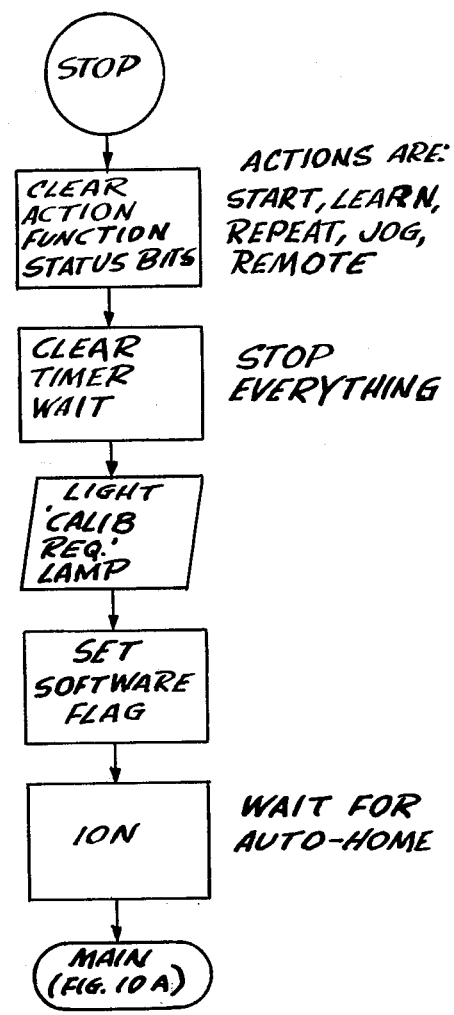
Figure 10C:
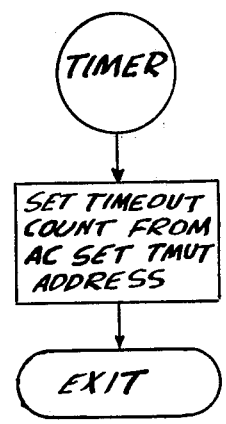
Figure 10Z:
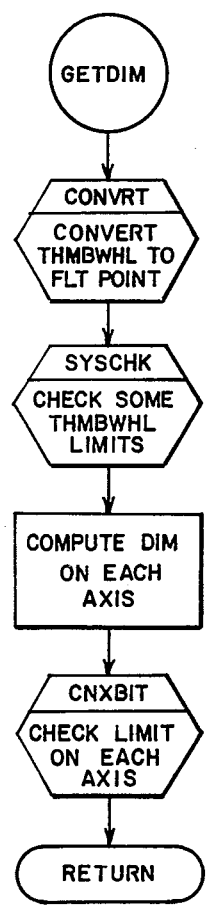
Figure 10A:
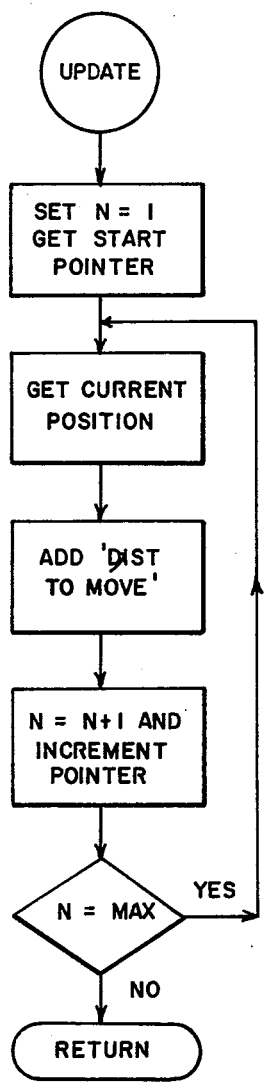
Figure 10B:
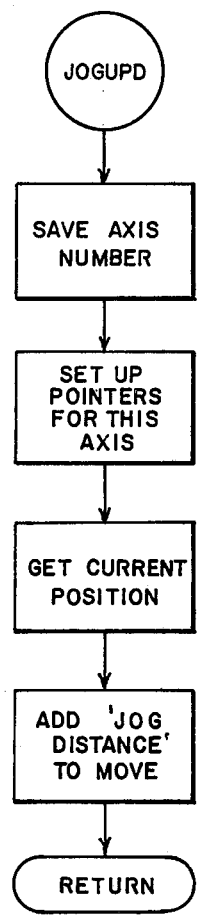
Figure 10D:
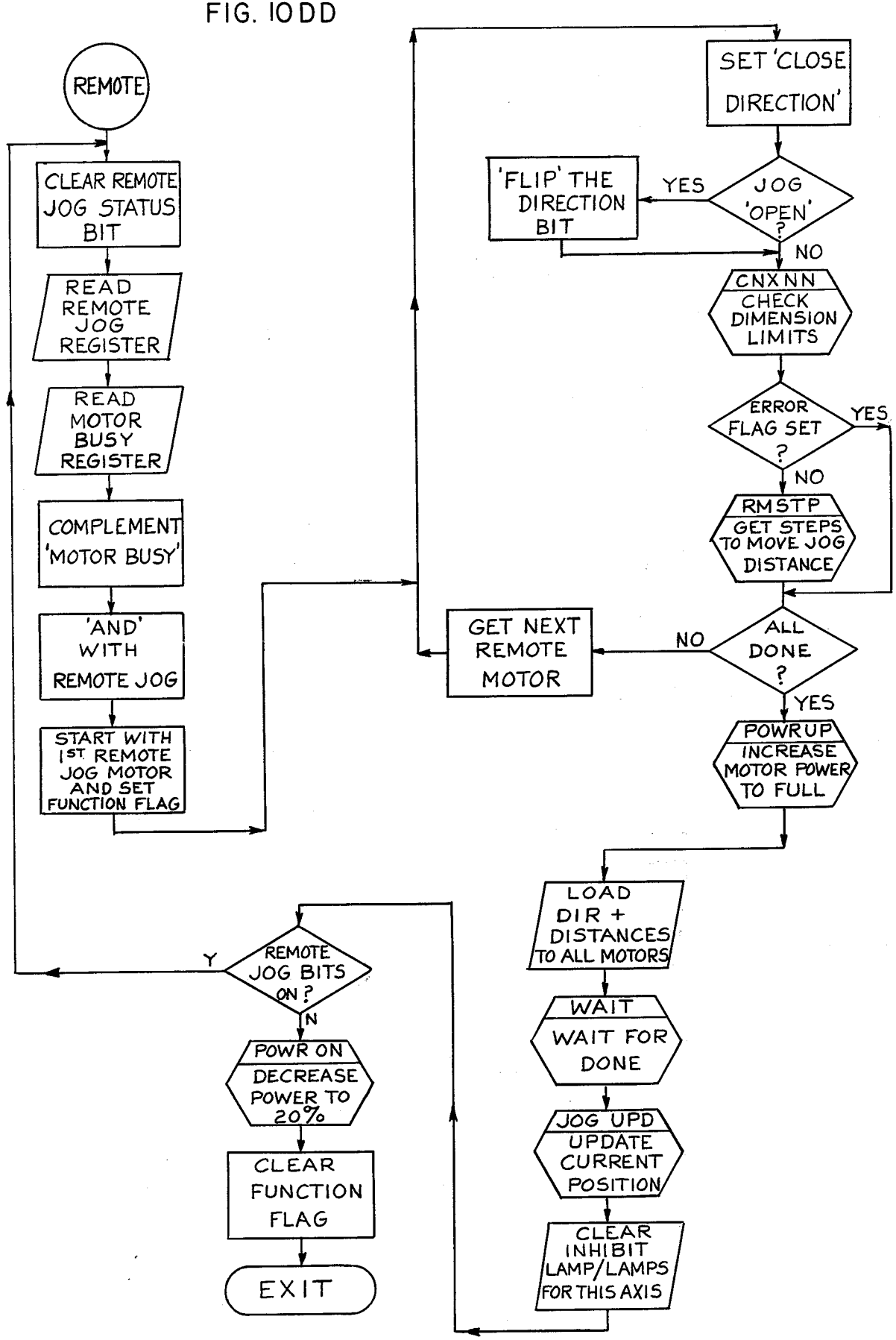
Figure 10:
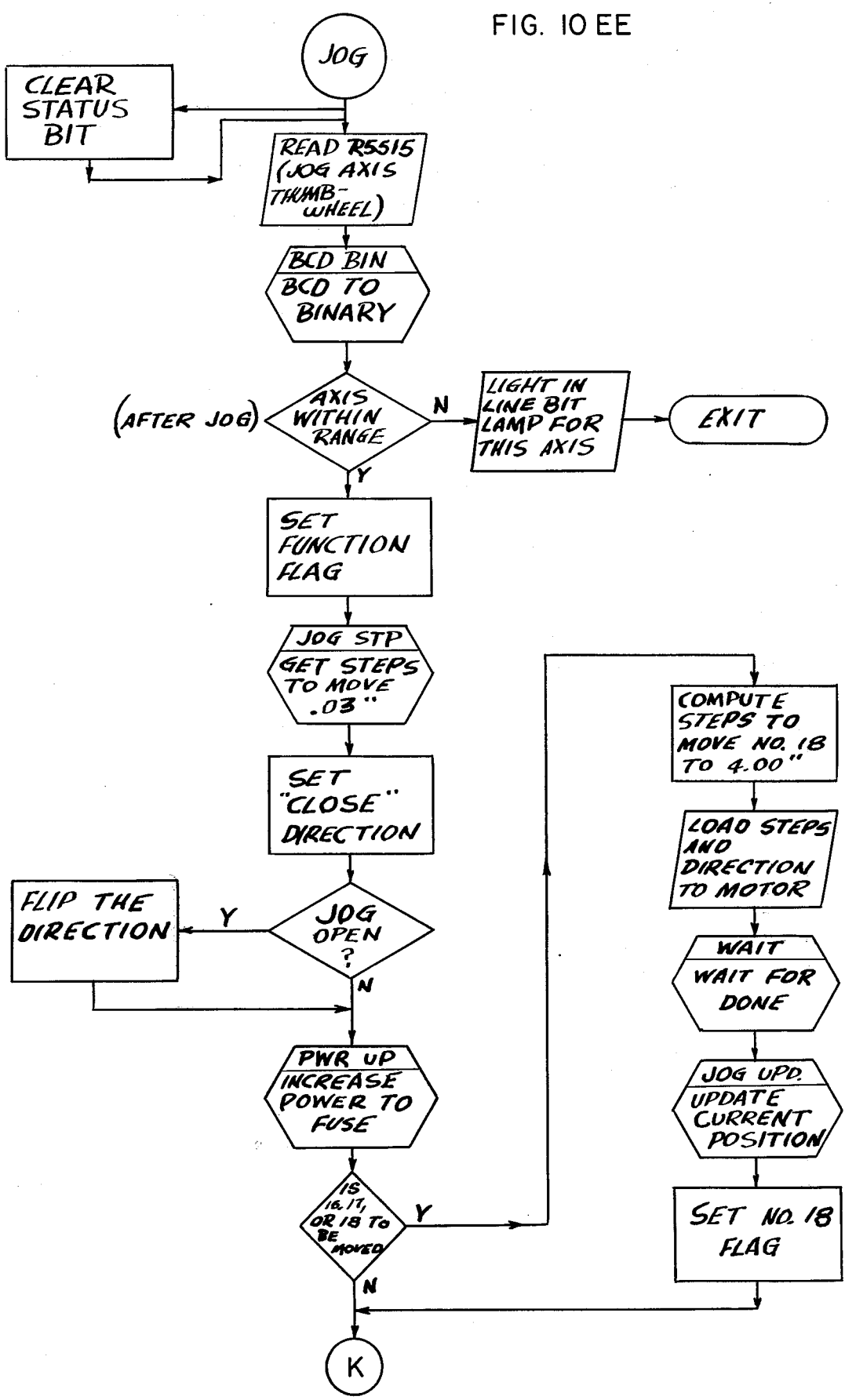
Figure 10F:
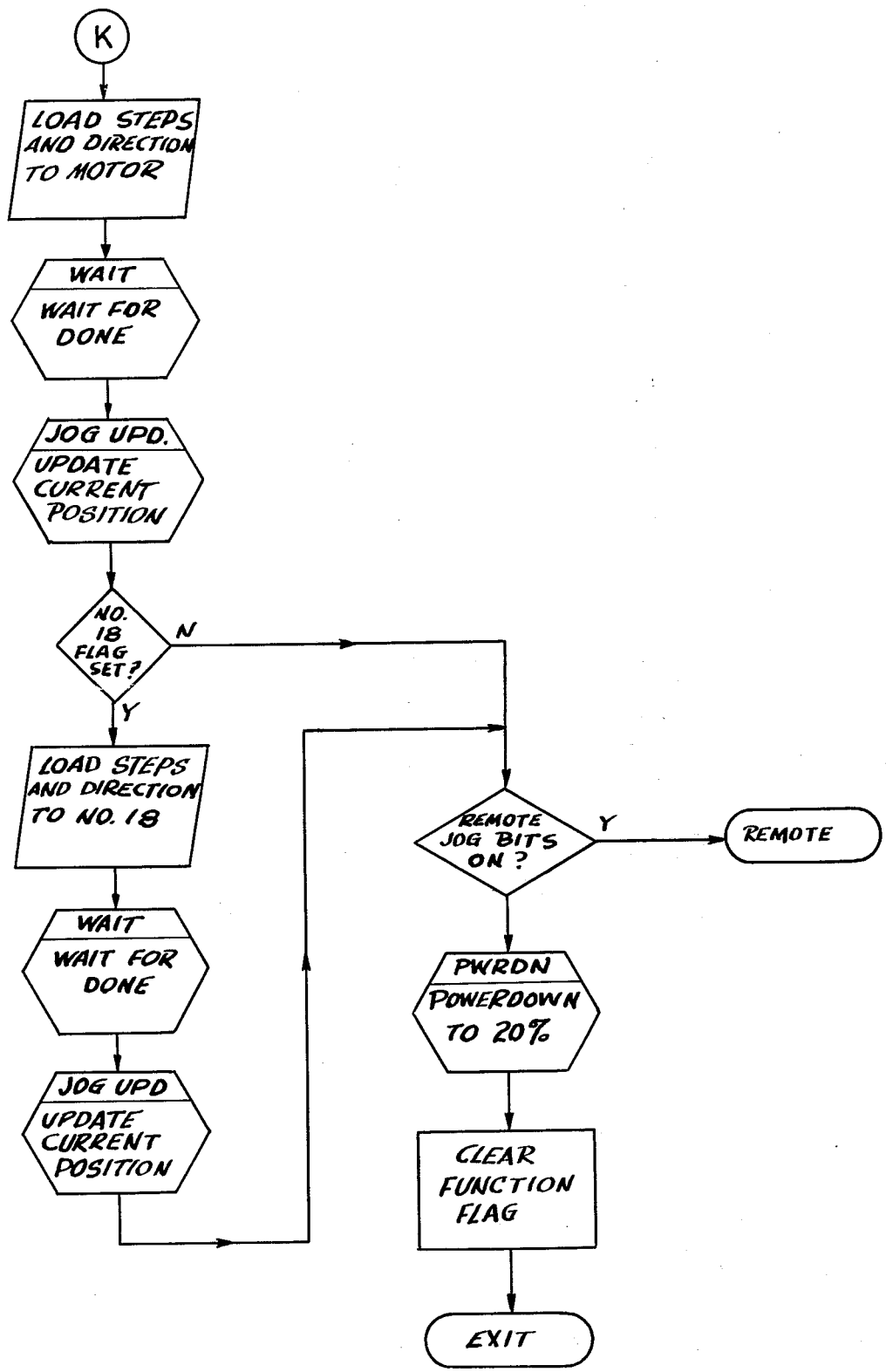

With continued reference to FIG. 9 and with reference now to FIGS. 10A-10BB, the control logic circuit 300 uses an interrupt system to transfer data or status information either to or from the computer 400. The control logic circuit 300 determines when to transfer data or status information by grounding the interrupt request line INT REQ. Data transferred from the control logic circuit is OR'ed with the contents of the computer 400 accumulator and the result is loaded into the computer accumulator. All transfers to the interface are from the computer accumulator.

When power is applied to the system, the POWER ON indicator on the operator's control panel 200 will light. The first operation performed by the system when first energized is to light the calibration required lamp CAL REQ on the operator's control panel 200. An interrupt signal is automatically generated to signal the computer 400 to set bit 03 in indicator register #2, thereby lighting the calibration required lamp. This same procedure is followed in the event of a power failure and automatic reset position, e.g., when the OPERATION switch is changed from MANUAL to AUTO.

Calibration is initiated by operator depression of the auto home push button. An interrupt, which will be identified by the skip chain routine of FIGS. 10B–10D as the auto home interrupt, will cause the system to enter the auto home subroutine of FIG. 10W. The system inhibit, 2CR, checks to verify that slotter blades "SB1" are engaged with the lower anvil before the slotter/creaser can be moved axially in POSITION START or AUTO HOME function to prevent damage to these devices. The machine close safety inhibit or interlock, 3CR, is implemented in hardware on the machine and will not allow the container finishing machine to move any motors in the automatic mode or perform an auto home sequence when the machine sections are open or separated.

The auto home sequence moves all appurtenances to the predetermined, known home positions by first applying pulses to the stepping motors to move all appurtenances in the direction of the home positions. These pulses are initially applied at a controlled rate so as not to exceed the torque limitations, then as a slewing signal (i.e., are relatively high in frequency) so that the stepping motors drive the appurtenances toward the auto home positions at a rapid slew rate.

When the auto home switch is engaged and actuated indicating that the appurtenance is approximately at the home position and most likely has been driven through the home position by the stepping motor running at slew speed, the slew signal is removed from the stepping motor and a reverse, slow rate pulse signal is applied. The reverse pulse signal (a signal much lower in frequency than the slew rate signal) drives the appurtenance slowly in the direction opposite the slew direction until the home switch is disengaged or deactivated. The reverse pulse signal is then removed immediately and the appurtenance is at the exact home position.

When the auto home sequence is completed, the system sets the bit 02 of indicator register #2 thereby lighting the IN HOME lamp on the operator's control panel 200. Thereafter, initial positioning of appurtenances can be accomplished in relation to the initial, known home position. Except in certain circumstances, e.g., after a power failure, subsequent positioning of appurtenances can be accomplished without returning to the home position since the movements of the appurtenances are recorded.

To start an automatic set up of the machine axes (appurtenances), the operator must preset the dimension thumbwheel switches on the operator's control panel to the dimensions specified in a production order or call up a previous production order from memory. After required changes, die changes, pull roll collar changes, and knife changes are made, the operator may close the machine and depress the POSITION START pushbutton to initiate the new set up. Position start will cause the system status interrupt to be generated and, when identified by the skip chain routine, will enable the system to perform the operation of setting up the machine axes.

The system operates to position the appurtenances by first determining if the repeat bit in the system status register is set. If the repeat bit is not set, the computer initiates a sequence that reads the preset data in the asix position thumbwheel switches as illustrated in FIG. 10T. If the repeat bit is set, the computer disregards the data in the axis position switches on the operator's control panel and reads the data in the production order number thumbwheel switch on the operator's control panel. With the repeat bit set, the preset axis dimensions are called from the computer memory file labeled with the production order number read by the computer.

The computer performs the required calculations using either the memory data or the data read from the axis position switches to determine the distance and direction each motor must move from its current location as indicated in FIGS. 10E and 10F. The computer also checks system and axis inhibits and lights the applicable axis limit error lamps, if for example, the required movement is outside axis limits. If an error is found, the computer will inhibit the system as determined by the existing conditions. The inhibit conditions must be corrected before position start can be reinitiated. If none of the inhibit conditions are detected, the computer sounds an alarm for 10 seconds and thereafter supplies the appropriate stepping motor control signals to move the appurtenances as required for the current production order.

During the 10 second alarm period, the computer sets the power up bit (bit 00) in the command register and issues an IOT signal to increase the motor power from 20 percent to full power as shown in FIG. 10X. At the completion of the 10 second alarm period, the computer loads the indexer direction and distance registers and issues the GO IOT signal for each axis which is to move. The axes which are to be moved will move in a predetermined sequence at a preset rate of acceleration and slew speed to assure that the torque capacity of the respective stepping motor is not exceeded. When all the axes have reached their new positions, the computer will then set bit 01 in indicator register #2 thereby lighting the cycle complete lamp.

Depressing the LEARN pushbutton on the operator's control panel will issue an interrupt signal that signals the computer to store the contents of the axes position thumbwheel switches in the computer memory for future recall or reuse. The file for this data is labeled with the contents of the production order number thumbwheel on the operator's control panel. If the production order number is not valid or already in use, the computer will set bit 04 in indicator register #2 thereby lighting the number not available lamp NO. NOT AVAILABLE. The operator must then either change the production order number or unlock and depress the OVERWRITE pushbutton. The OVERWRITE switch generates an interrupt which signals the computer to replace the data filed under prouction order number with the data currently set in the axes position thumbwheels.

When the emergency stop pushbutton EMERG. STOP is depressed, an interrupt will be issued to cause the computer to inhibit the step pulses to all motors. In addition, the computer sets the bit 02 in indicator register #2 thereby lighting the calibration required lamp CAL REQ.

The on line jog pushbuttons on the operator's control panel allow the operator to make a fine adjustment of any one of the appurtenances or axes by presetting the axis number in the JOG AXIS SELECTION thumbwheel switch. The direction of jogging is controlled by pressing either the JOG OPEN or JOG CLOSED pushbuttons. These pushbuttons generate interrupts and, under control of the computer, the required direction and distance data is loaded into the indexer register to move the selected axis a programmed dimension each time either the JOG OPEN or JOG CLOSED pushbutton is pressed. Jogging axes from the front panel are subject to the 2CR inhibit as described previously. The 3CR inhibit also prevents the axes from being jogged from the front panel while the container finishing machine is open.

Five motors (motors 4, 8, 11, 18 and 29) are capable of being jogged from remote switches located on the container finishing machine as long as the motors are not currently in motion under the control of the computer. In this remote jog mode, an interrupt will cause the computer to issue blocks of distance and direction data as long as the remote switch is actuated. When jogging circumferential axes (motors 8, 11, 18 or 29), the computer will allow travel beyond the home switches by setting bit 05 (home switch override) in the command register.

Manual control and set up of the container finishing machine can be accomplished by depressing the manual pushbutton on the front panel. Depression of this pushbutton causes an interrupt which signals the computer that the machine set up is to be implemented without intervention from the computer. Axes position data will not be maintained by the computer in this mode. All axes are moved by manipulation of switches located on the container finishing machine while the manual switch remains actuated. Since the computer does not maintain position information on the locations of the axes or appurtenances, it is necessary to perform an axes recalibration on return to the automatic mode of operation. The computer receives an interrupt from the transition from automatic to manual or on the transition from manual to automatic. The transition from manual to automatic causes the calibration required CAL. REQ. lamp to light.

All motors remain at full power level when in the manual mode of operation. With the exception of circumferential motors 8, 11, 18 and 29, all home switches will inhibit steps in the home switch direction when the home switch is actuated. Circumferential motors 8, 11, 18 and 29 are not inhibited in the home switch direction. Axes limit switches inhibit stepping motor travel in the direction the limit is designed to protect. The limit switch will allow stepping only after changing the direction at the remote switch. An emergency stop in the manual mode can only be reset by toggling the circuit breaker on the power controller of the system.

Three folder/gluer axes, referred to as the cam follower axes, are slaved to the lateral yokes of the slotter/creaser section of the machine. These motors are a.c. motors and are cued by a.c. switches in the system. Whenever stepping motor No. 16 moves in an increasing direction, a switch referred to as the IOS switch will be actuated. A switch referred to as the DOS switch will be actuated when motor No. 16 moves in a decreasing direction. The switches will be turned on when the stepping motor starts to move and turned off when the stepping motor stops. Switches IDS (increasing) and DDS (decreasing) are slaved to stepping motor No. 15 and switches IGP (increasing) and DGP (decreasing) are slaved to stepping motor No. 17. This slaving function is implemented in both the automatic and manual modes of operation.

To facilitate an understanding of the preferred embodiment of the invention, the elements of the control logic circuit of FIG. 9 are illustrated in greater detail in FIGS. 11 through 29.

Figure 11:
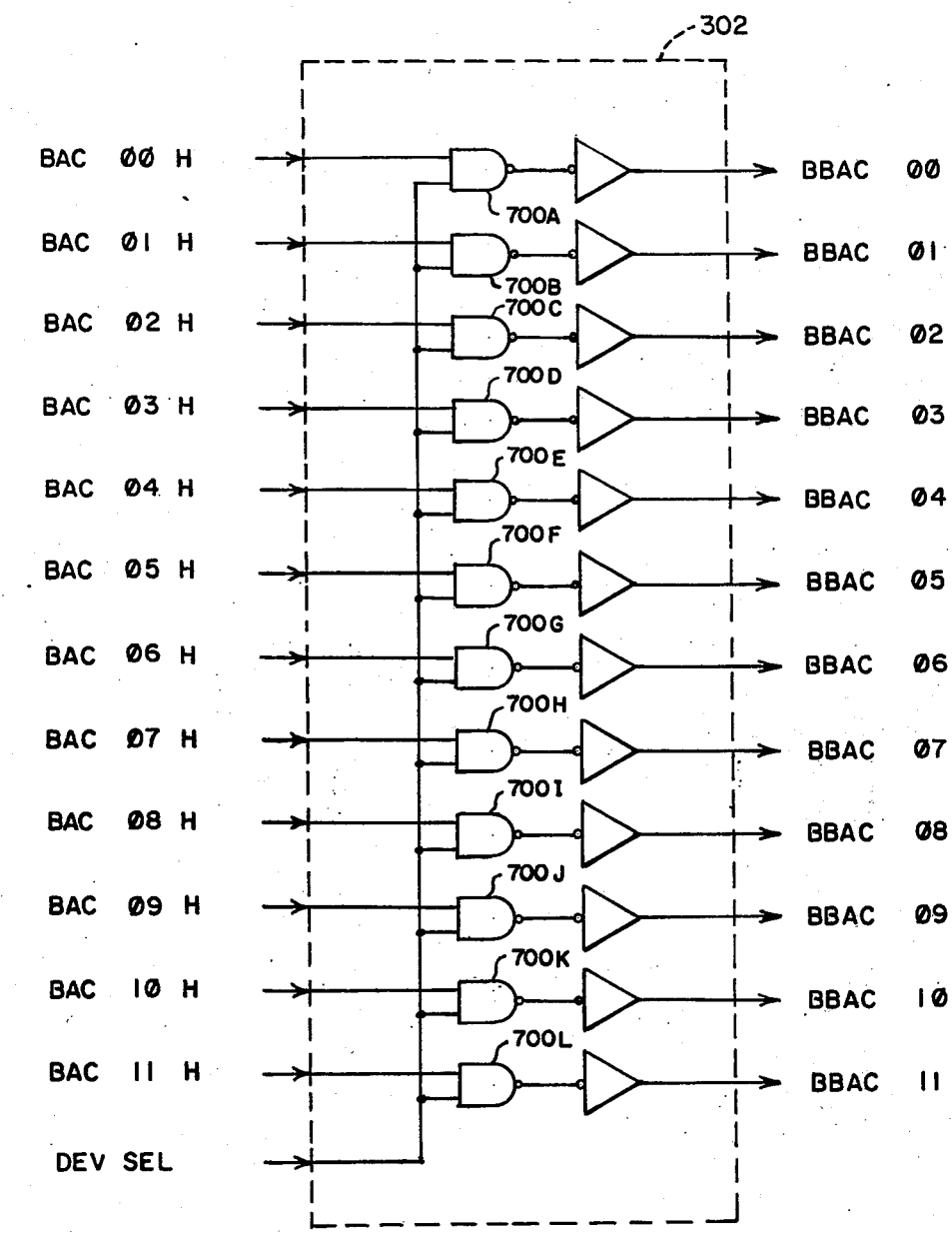
FIG. 11 is a schematic circuit diagram illustrating the BAC bus buffer of FIG. 9 in greater detail.

Referring now to FIG. 11, each BAC signal (BAC00-11) is applied to one input terminal of a two input terminal AND gate 700A-L in the BAC bus buffer 302. The device select signal DEV SEL is applied to the other input terminal of the AND gates 700A-L and, when this signal assumes a high or binary ONE signal level, the data on each BAC line will appear at the output terminals of the AND gates as the buffered BAC bits BBAC for transmission to various elements in the control logic circuit 300 as illustrated in FIG. 9.

Figure 12:
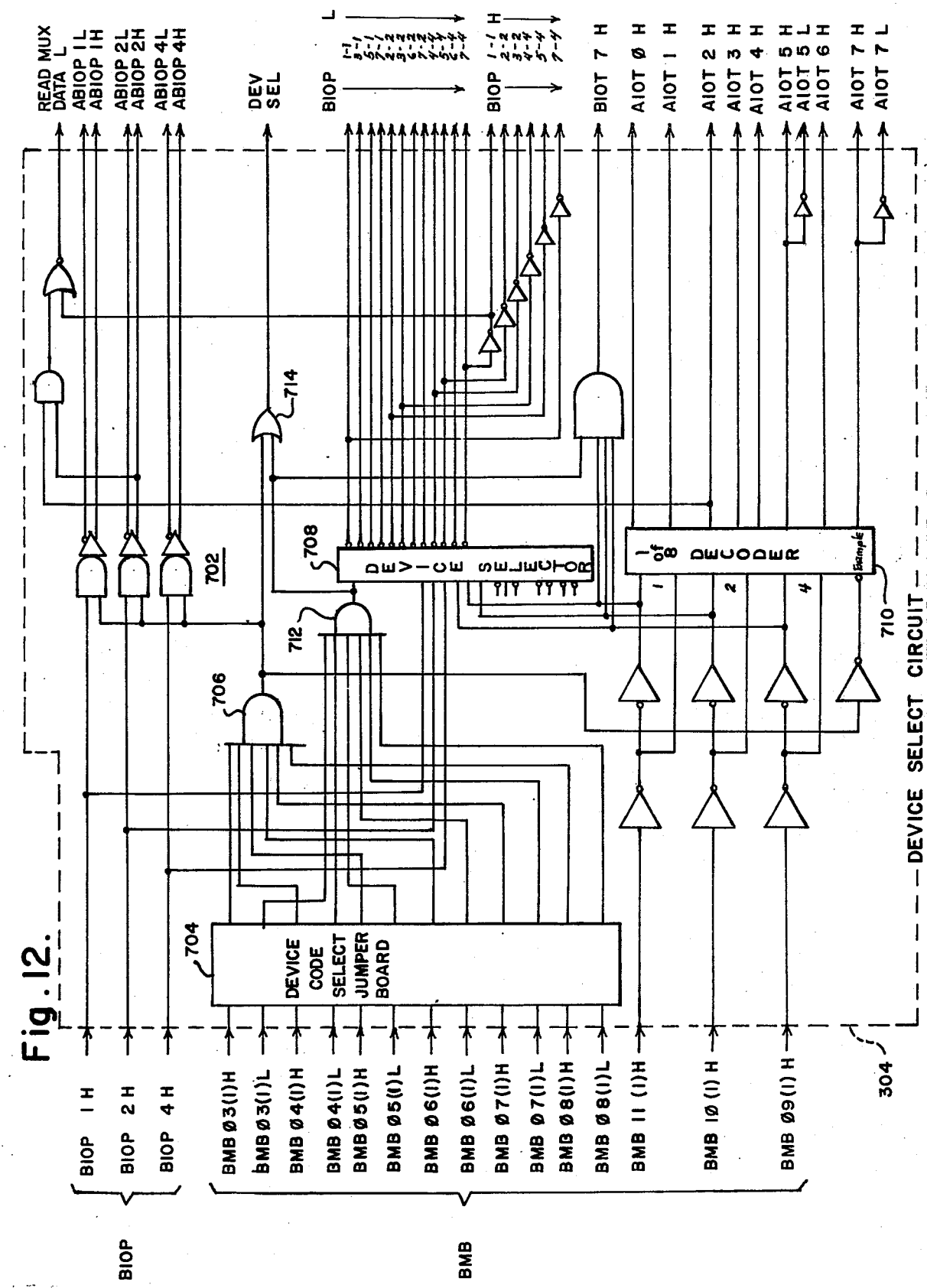
FIG. 12 is a schematic circuit diagram illustrating the device select circuit of FIG. 9 in greater detail.

The device select circuit 304 of FIG. 9 is illustrated in greater detail in FIG. 12. Basically, the device select circuit 304 receives BMB and BIOP signals from the computer and generates a plurality of control signals for instructing various elements of the control logic circuit 300 when to accept and/or transmit data. The BIOP signals (BIOP 1, BIOP 2 and BIOP 4) are each applied to an input terminal of a device selector 708 and to one input terminal of a plurality of 2 input terminal AND gates, indicated generally at 702, with a negative and positive output which create a plurality of device select control signals. The BMB signals BMB03(1)H - BMB08(1)H - and BMB03(1)L - BMB08L are applied to the input terminals of the device code select jumper board 704, a standard wired jumper board. A plurality of output signals from the jumper board 704 are applied as illustrated to AND gate 706, and the remaining output signals are applied to AND gate 712 whose output signal is applied to the enable input terminal of a device selector 708 and to one input terminal of a two input terminal OR gate 714. The output signal of AND gate 706 is applied to the other input terminal of OR gate 714 whose output signal is the device select signal DEV SEL.

The remaining BMB signals, BMB9, BMB10 and BMB11 and their inverse, are applied to the input terminals of a 1 of 8 decoder 710. The output signal of AND gate 706 is applied to the enable input terminal of the 1 of 8 decoder 710. The 1 of 8 decoder selects one of the 8 output signals as a function of the value of the binary inputs and generates a plurality of control signals. The BMB9, BMB10 and BMB11 signals are also applied to the remaining inputs of the device selector 708 which decodes the inputs and generates 12 additional control signals.

Figure 13:
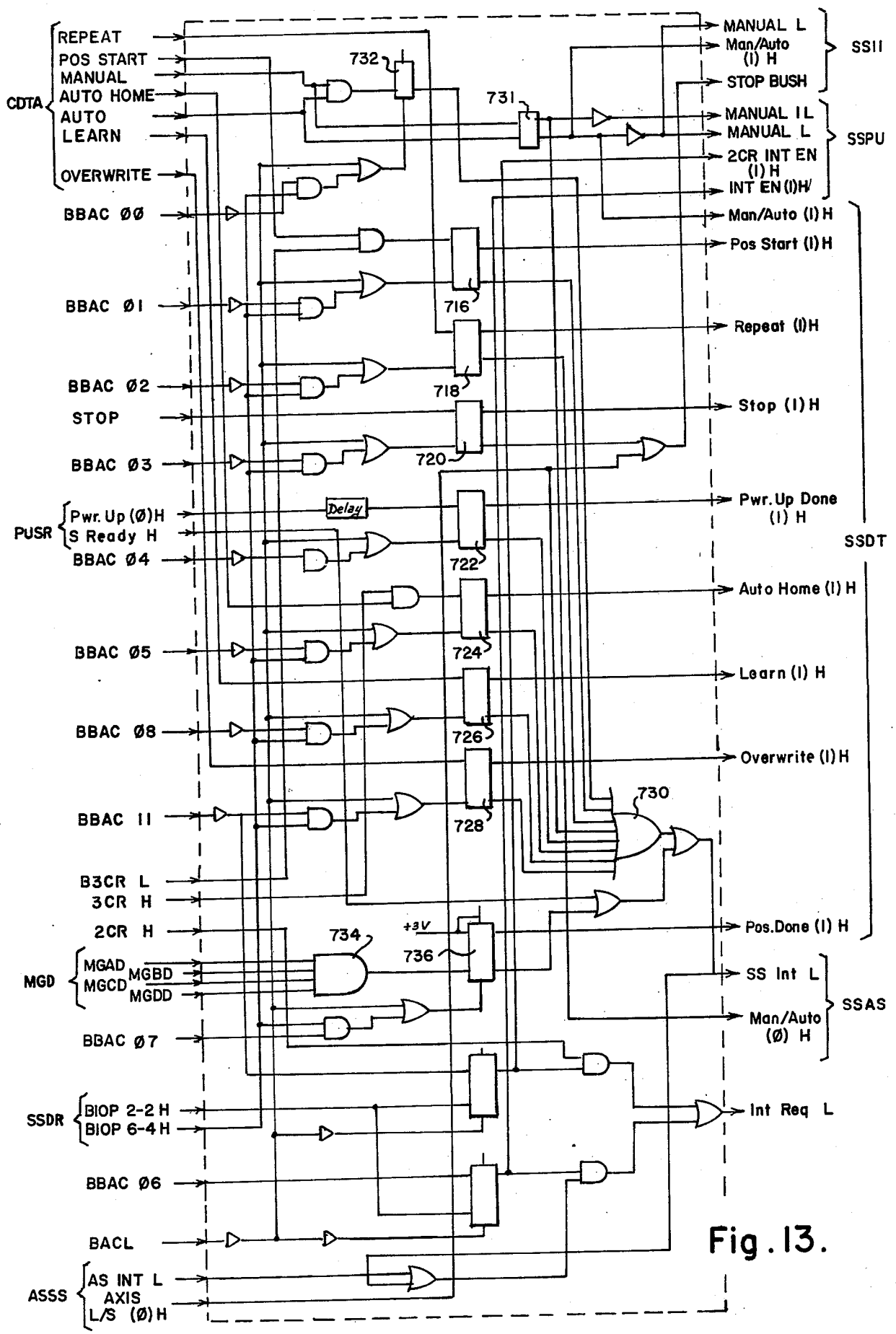
FIG. 13 is a schematic circuit diagram illustrating the system status register and interrupt logic of FIG. 9 in greater detail.

The system status register and interrupt logic 310 of FIG. 9, illustrated in greater detail in FIG. 13, is used to receive information on the status of the system from the operator control panel 200 and other sources, and to transmit this information to the computer 400 or other elements of the control logic circuit 300. The position start POS START, REPEAT, STOP, AUTO HOME, LEARN and OVERWRITE signals from the operation control panel 200 and the power up PWR UP signal from the power up command register 326 are each applied to the S input terminal of SR flip flops 716-728. Then these signals, as the Q output signals of the SR flip flops 716-728, are sent to the AC MUX control circuit #2 336 and then to the computer as part of the SSDT signal. The Q output signal of each flip flop 716-728 is applied to one input terminal of a negative logic OR gate 730. Switching the system to MANUAL or AUTO will generate a signal at the Q output terminal of flip flop 732 and this output signal will be applied to an input terminal of OR gate 730. Each MGD signal, which indicates that a certain number of motors have finished moving, is applied to one input terminal of AND gate 734 whose output assumes a high or binary ONE signal level when all the motors have finished moving. This output signal from AND gate 734 is applied to the C input terminal of flip flop 736 to generate the position done signal POS DONE at the Q output terminal. The output signal of OR gate 730 is the system status interrupt signal SS INT which indicates that the system status register has registered a requested change in status from the operation control panel 200 or elsewhere and would like to tell the computer the change in status. Similarly, an axis status register interrupt signal AS INT is generated by the axis status register 312 for the same reasons, and the SS INT and AS INT signals when instructed by the computer 400 will send an interrupt request signal INT REQ to the computer 400. Then the computer will proceed to generate the necessary signals to receive this data. The BBAC signals sent to the system status register 310 are generally used to clear the various flip flops after the computer has received the stored data.

Figure 14:
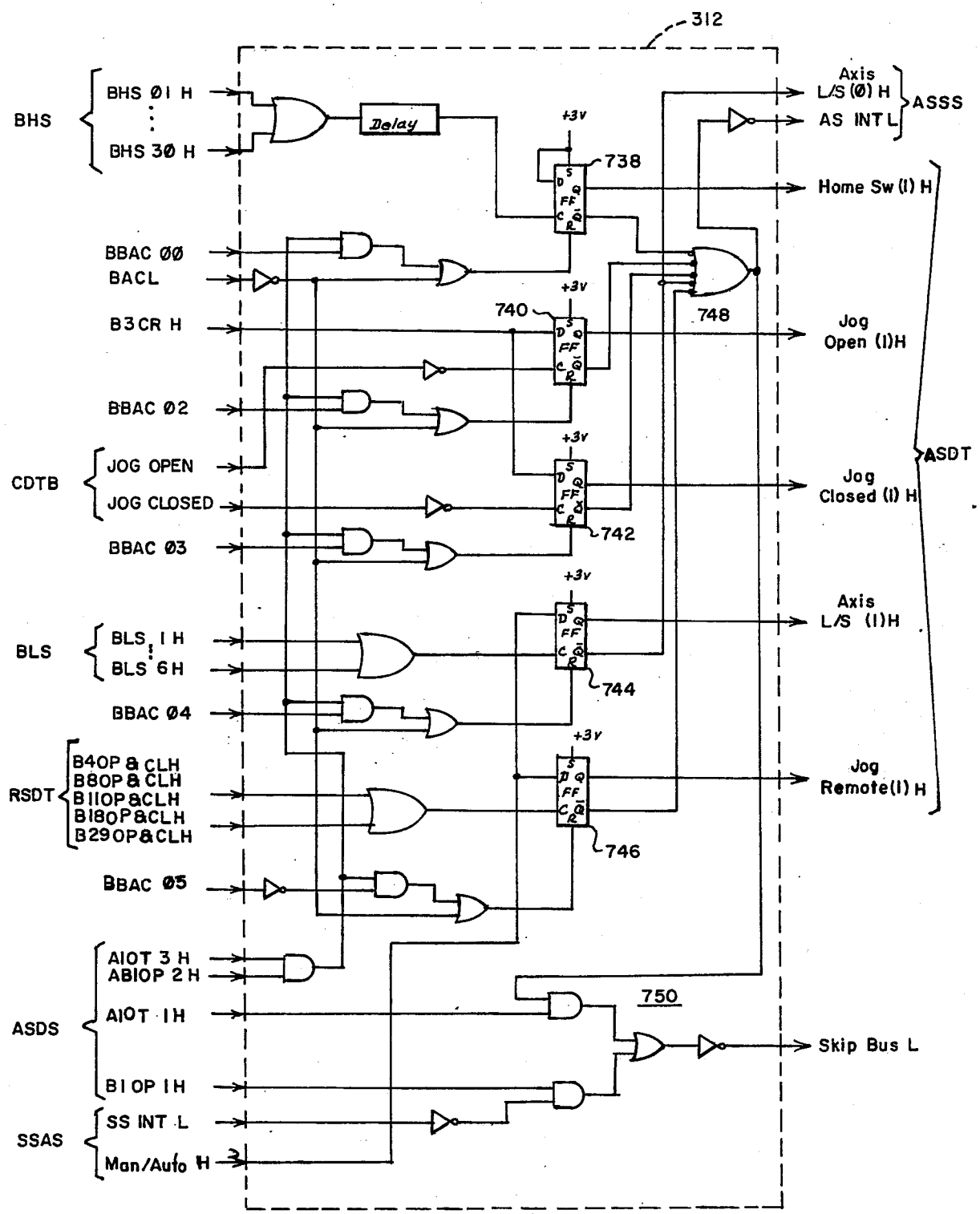
FIG. 14 is a schematic circuit diagram illustrating the axis status register and skip logic of FIG. 9 in greater detail.

The axis status register 312 of FIG. 9 is illustrated in greater detail in FIG. 14. Similar to the system status register 310, the axis status register 312 receives and stores data and sends the data to the computer 400 when the computer is ready to receive data. The home limit switch signals BHS 1-30 are OR'ed together and applied to the clock input terminal of flip flop 738 whos Q output signal is the home switch signal HOME SW. The B3CR signal, indicating that the container finishing machine is open, is applied to the D input terminal of flip flops 740 and 742. From the operator's control panel 200, the JOG OPEN signal is applied to the clock input terminal of flip flop 740 to generate the JOG OPEN signal at the Q output, and the JOB CLOSED signal is applied to the clock input terminal of flip flop 742 to generate the JOG CLOSED signal at the Q output terminal. The MAN/AUTO signal, indicating that the operator's control panel is turned on, is applied to the D input terminal of flip flop 744 and 746. The limit switch signals BLS are OR'ed together and applied to the clock input terminal of flip flop 744 to generate the AXIS L/S signal at the Q output terminal. Similarly, the remote switch data signals RSDT are OR'ed together and applied to the clock input terminal of flip flop 746 to produce the JOG REMOTE signal at the Q output terminal. The Q output terminals of flip flops 738, 740, 742, 744 and 746 are applied to the input terminals of a negative logic OR gate 748 to produce the axis status register interrupt signal AS INT. This AS INT signal is applied to the system status register 310 and its function was described in the preceding paragraph and will not be repeated here. The AS INT signal and SS INT signal together with several signals from the device select circuit 304 are combined with the logic shown generally at 750 to produce the SKIP BUS signal which is sent to the computer and causes the computer to enter the skip chain routine. The BBAC signals and the remaining signals from the device select circuit 304 are used to reset flip flops 738–746 after the computer has received their data.

Figure 15:
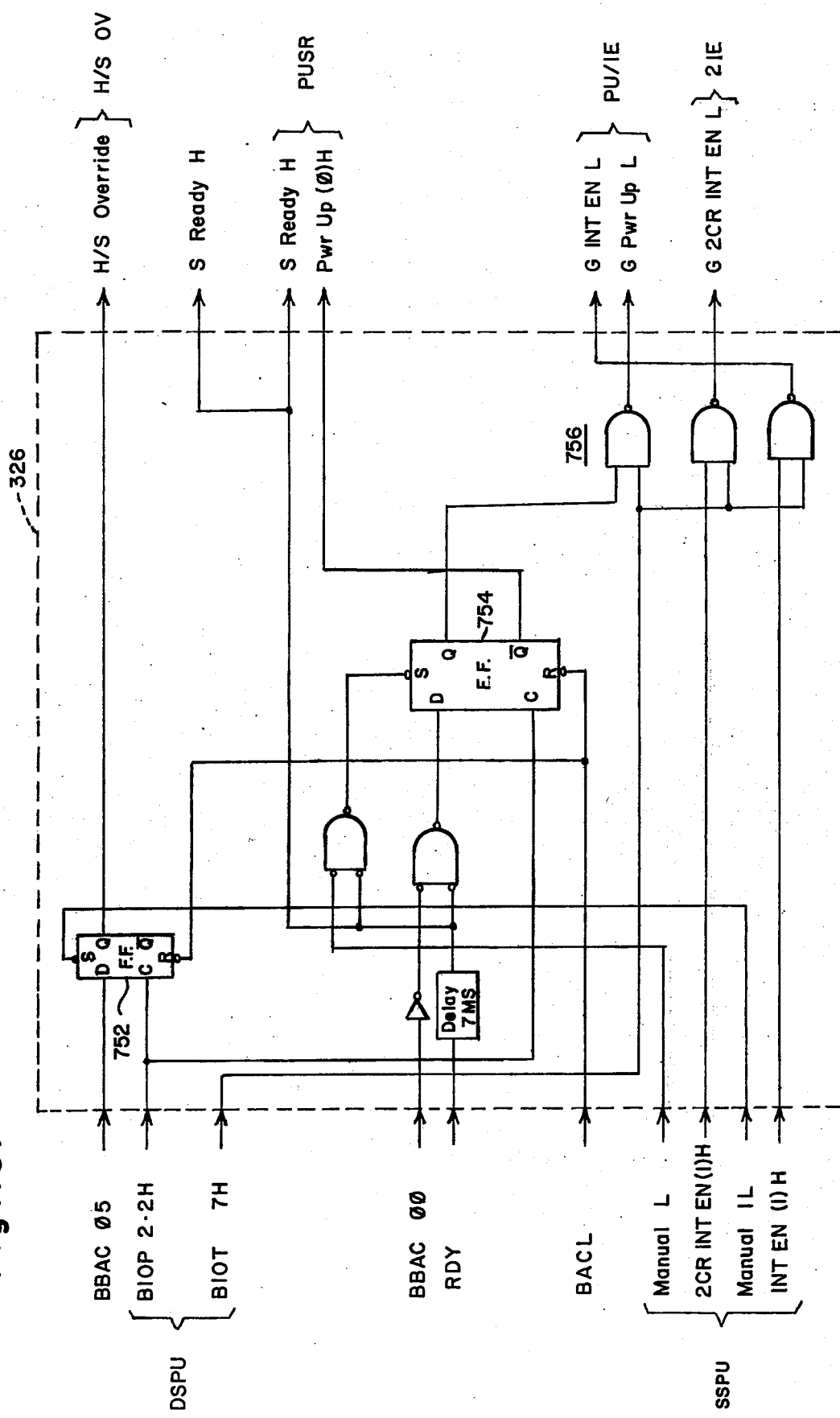
FIG. 15 is a schematic circuit diagram illustrating the power up command register of FIG. 9 in greater detail.

The power up command register 326 of FIG. 9, illustrated in greater detail in FIG. 15, receives data on the power status of the system in the form of the ready RDY signal from the translator and motor control circuit 600 and the SSPU signal from the system status register 310 and also control data DSPU from the device select circuit 304 and BBAC05 and BBAC00 signals. One DSPU signal is applied to the clock input terminal of flip flops 752 and 754. The BBAC05 signal is applied to the D input terminal of flip flop 752 to generate the home switch override signal H/S OV at the Q output terminal. The RDY signal is applied to the D input terminal of flip flop 754, and the RDY signal, along with the Q output signal of flip flop 754, is supplied to the system status register 310 as the power ready signal PUSR. Interrupt enable signals INT EN and 2CR INT EN, along with the Q output signal of flip flop 754, are applied to one input terminal of a plurality of two input terminal NAND gates indicated generally at 756. With the other DSPU signal applied to the other input terminal of the NAND gates 756, the 2IE and PU/IE signals are supplied to AC MUX DATA #1 and 2 306 and 308, respectively, to supply power up information to the computer.

Figure 16:
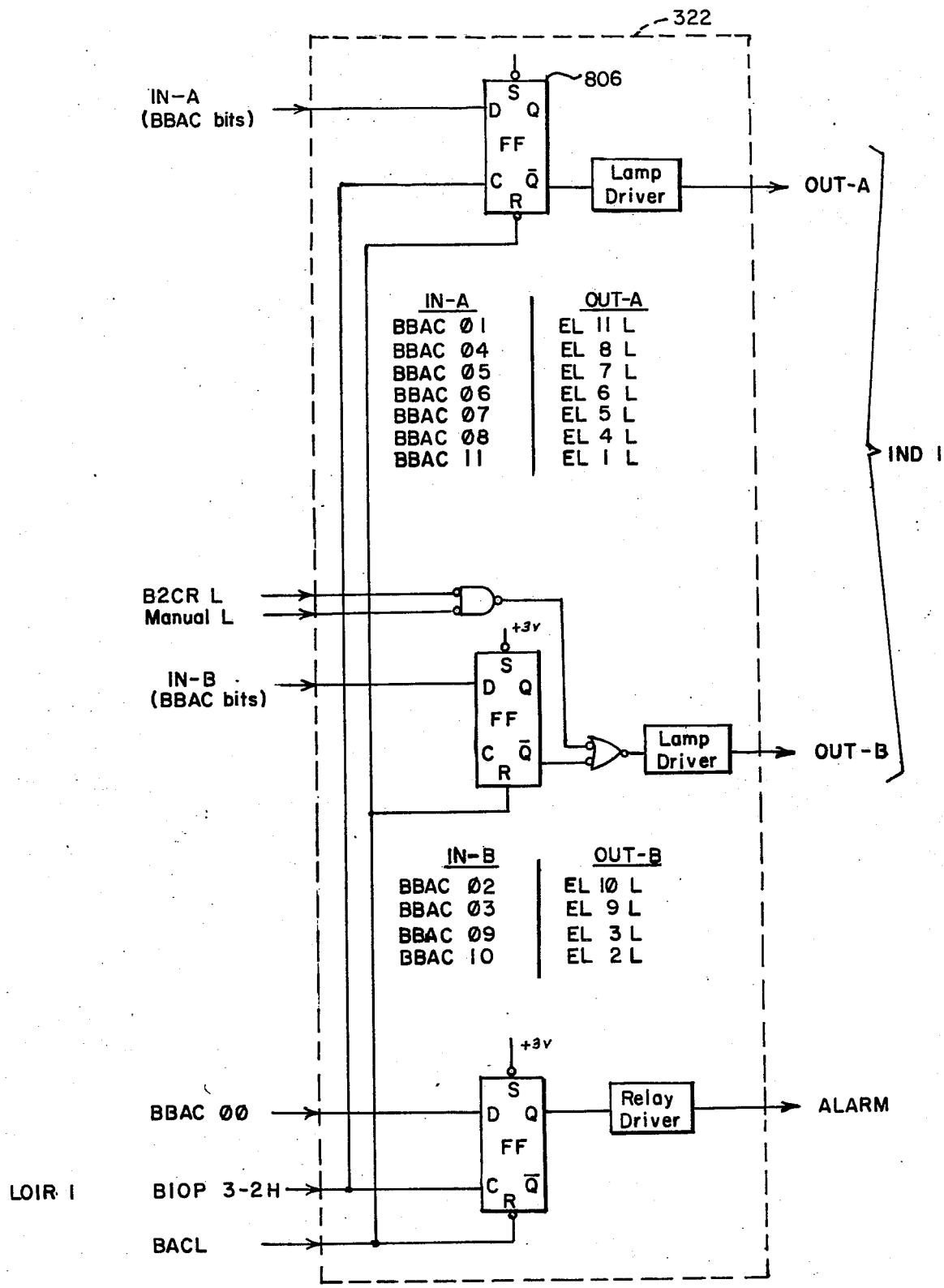
FIG. 16 is a schematic circuit diagram illustrating the indicator register #1 of FIG. 9 in greater detail.
Figure 17:
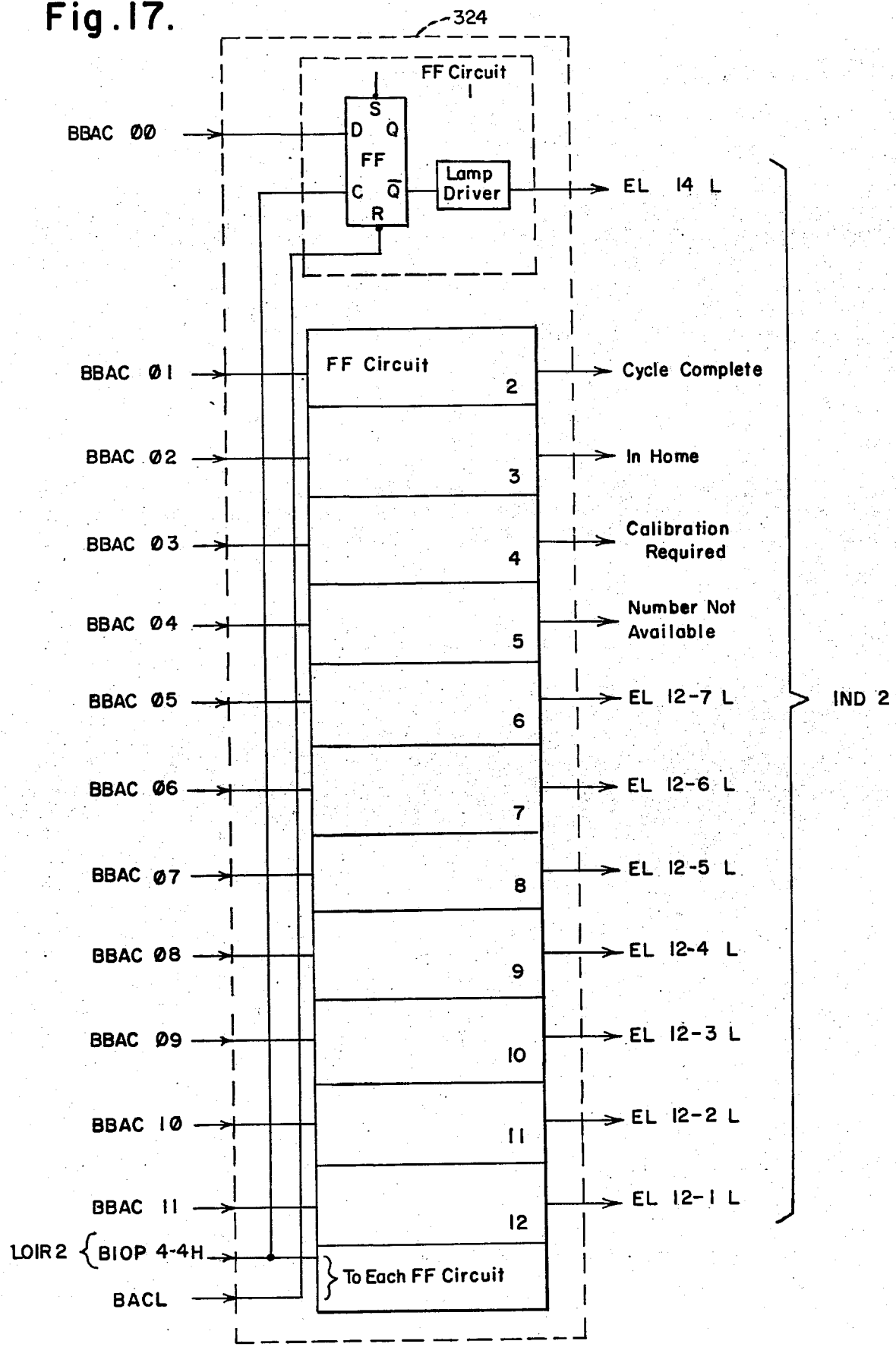
FIG. 17 is a schematic circuit diagram illustrating the indicator register #2 of FIG. 9 in greater detail.

Indicator registers #1 and #2 322 and 324 of FIG. 9, illustrated in greater detail in FIGS. 16 and 17, receive data signals from the computer and supply signals for the various indicators on the operator control panel 200 and ALARM signal to the container finishing machine. In each indicator register, the 12 BBAC signals are each applied to the D input terminal of a flip flop 806, and the load indicator register signal LOIR is applied to the clock input terminal to permit the data on the BBAC lines to be supplied to the indicators when the device select circuit issues the LOIR signal. For example, as shown in FIG. 11G, BBAC02 supplies the IN HOME indicator signal to the operator's control panel 200 upon assertion of the load indicator register #2 signal LOIR2. The remaining BBAC signals operate the same and generate the indicator signals as shown in FIGS. 16 and 17.

The AC MUX control circuits 334 and 336 and the AC MUX data circuits 306 and 308 of FIG. 9 are illustrated in greater detail in FIGS. 18, 19, 20 and 21. These circuits function to receive a plurality of data signals, multiplex the data, and supply the data to the computer, in proper sequence, 12 bits at a time over the AC00-11 signal lines.

Figure 18:
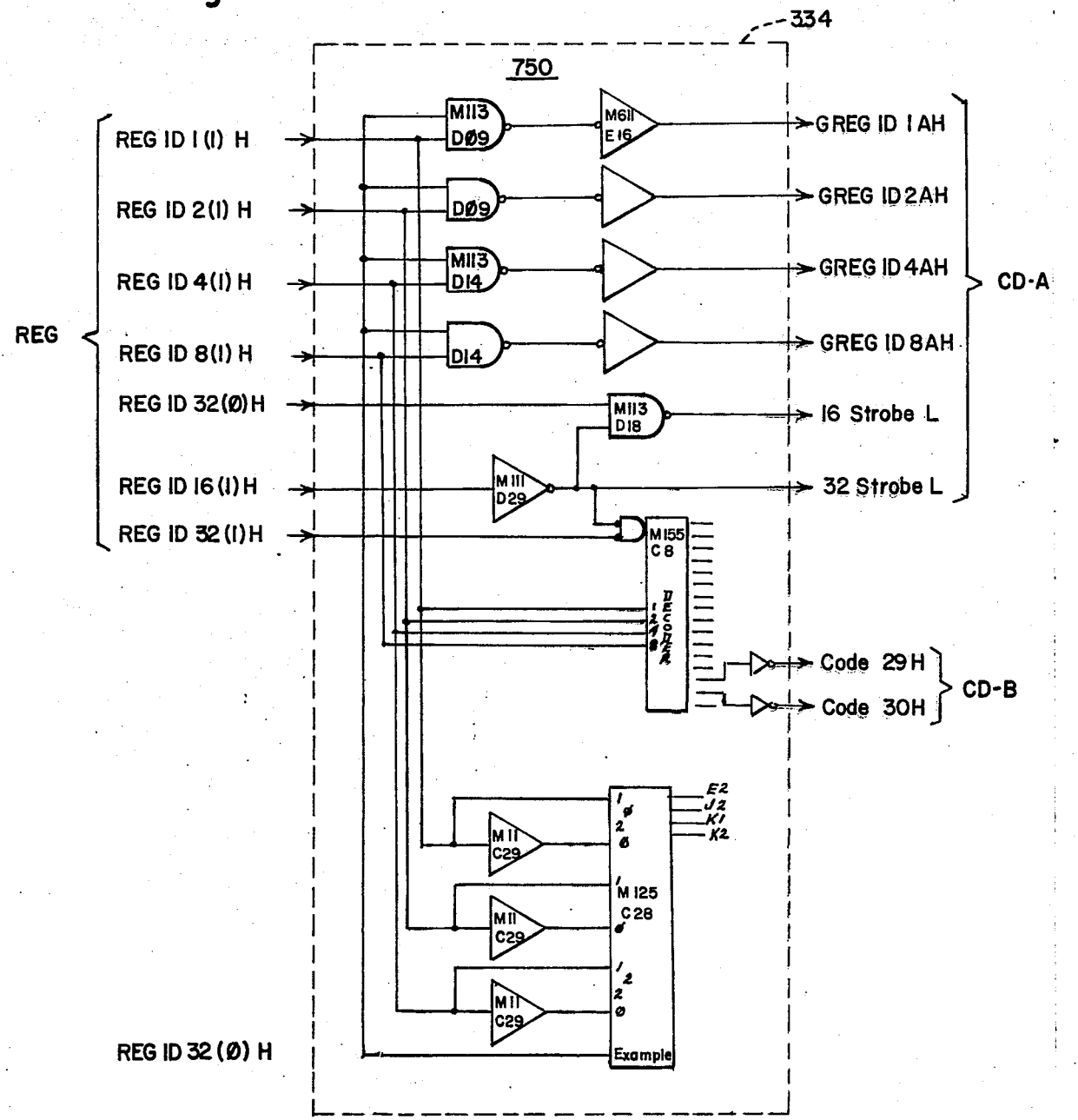
FIG. 18 is a schematic circuit diagram illustrating the AC MUX control circuit #1 of FIG. 9 in greater detail.

As shown in FIG. 18, the AC MUX control circuit #1 334 receives a plurality of control signals REG from the motor select logic 328, processes these signals through the logic shown generally at 758 and supplies the CD-A and CD-B control signals to the AC MUX data circuits.

Figure 19:
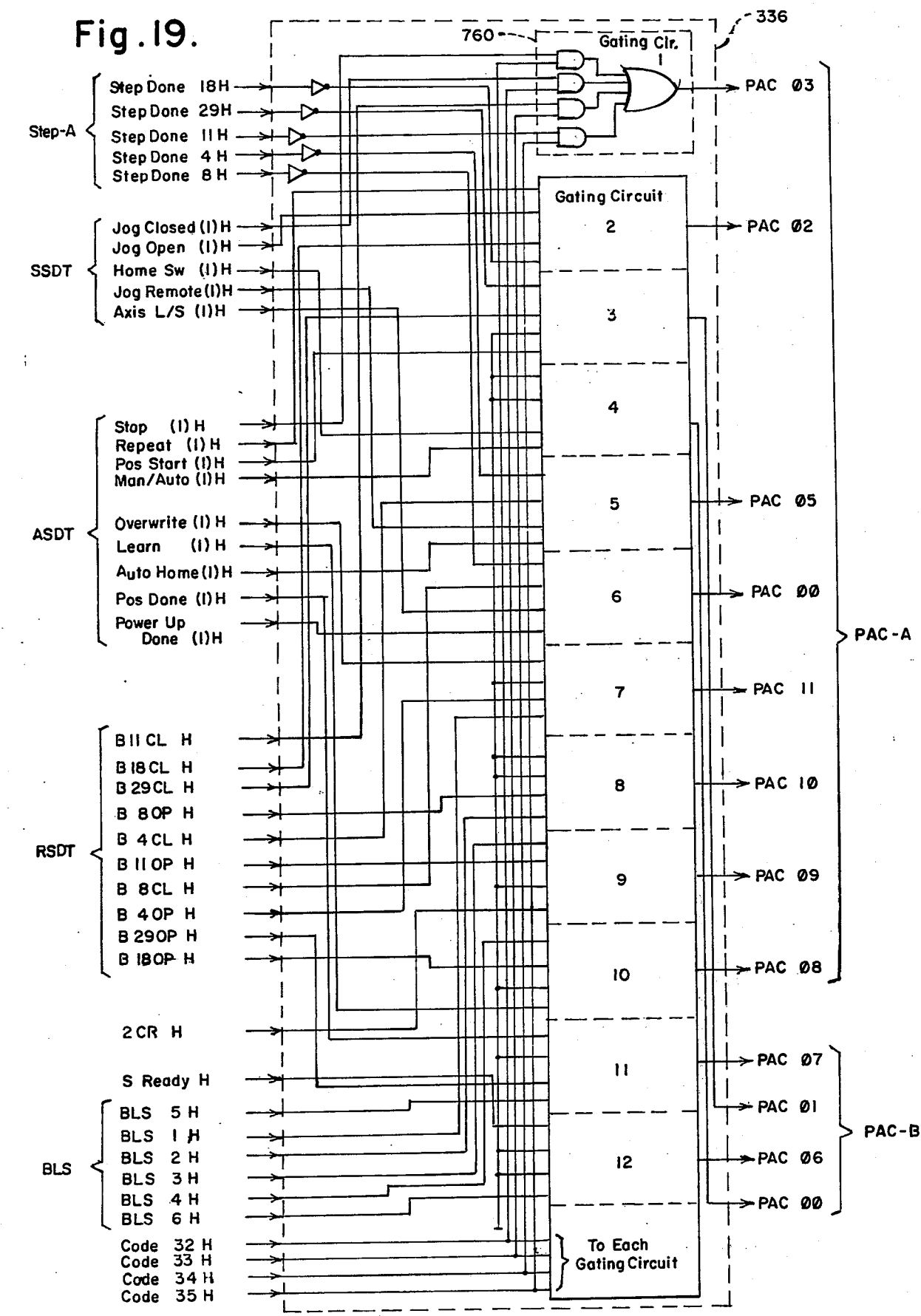
FIG. 19 is a schematic circuit diagram illustrating the AC MUX control circuit #2 of FIG. 9 in greater detail.

As illustrated in FIG. 19, the STEP-A, SSDT, ASDT, RSDT, 2CR, READY and BLS data signals are applied to the input terminals of various gating circuits 760. Within each gating circuit 760, the data signals are applied to one input terminal of a two input terminal AND gate. Applied to the other input terminal of the AND gates is one of the control signals CODE 32–35. These CODE signals determine which data signal will be transmitted through the AND gates. The output signals of the AND gates are applied to an OR gate whose output signal is the data signal PAC. These PAC signals are supplied to the AC MUX DATA circuits where they are further multiplexed with other data signals as will be described herein.

Figure 20:
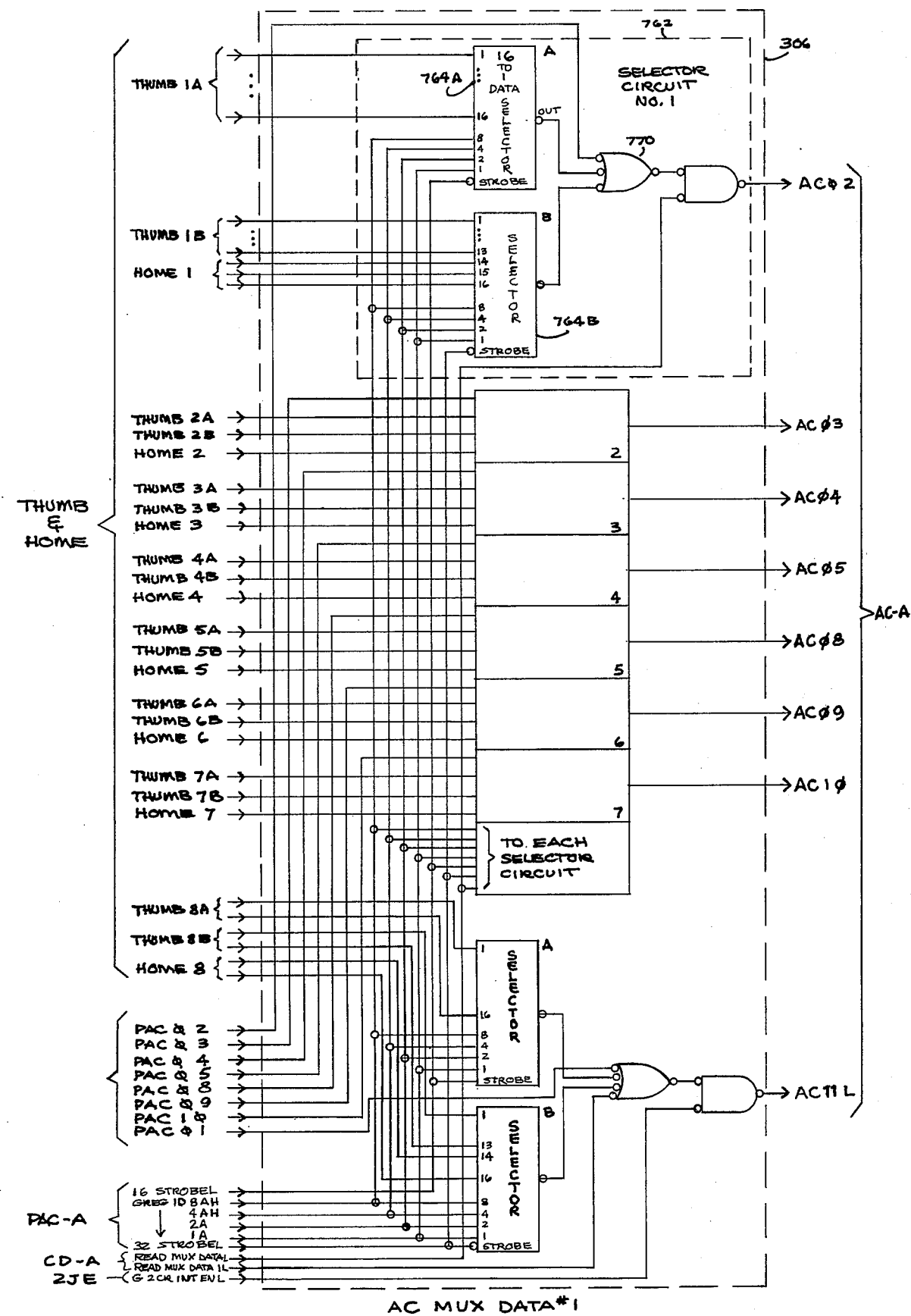
FIG. 20 is a schematic circuit diagram illustrating the AC MUX data #1 circuit of FIG. 9 in greater detail.

The AC MUX DATA #1 circuit 306, illustrated in FIG. 20, receives a plurality of data signals HOME, THUMB and PAC-A and applies these signals to the input terminals of one of a plurality of selector circuits 762. The data content of the THUMB and HOME signals is described in detail in FIG. 30.

The HOME and THUMB signals are applied to the input terminals of a 16 to 1 data selector 764A and 764B which selects one of the input data signals to be transmitted as an output signal depending on the decimal value of the binary signals on the remaining input terminals. These binary signals and the strobe signals are supplied by CD-A signals. The output signals of the 16 to 1 selectors 764A, 764B are applied to the input terminals of OR gate 770 along with one of the PAC data signals previously multiplexed. The output signal of the OR gate will then be supplied to the computer 400 as the AC signals (as shown in FIG. 20) upon initiation of the read MUX data signal RMD by the device select circuit 304.

Figure 21:
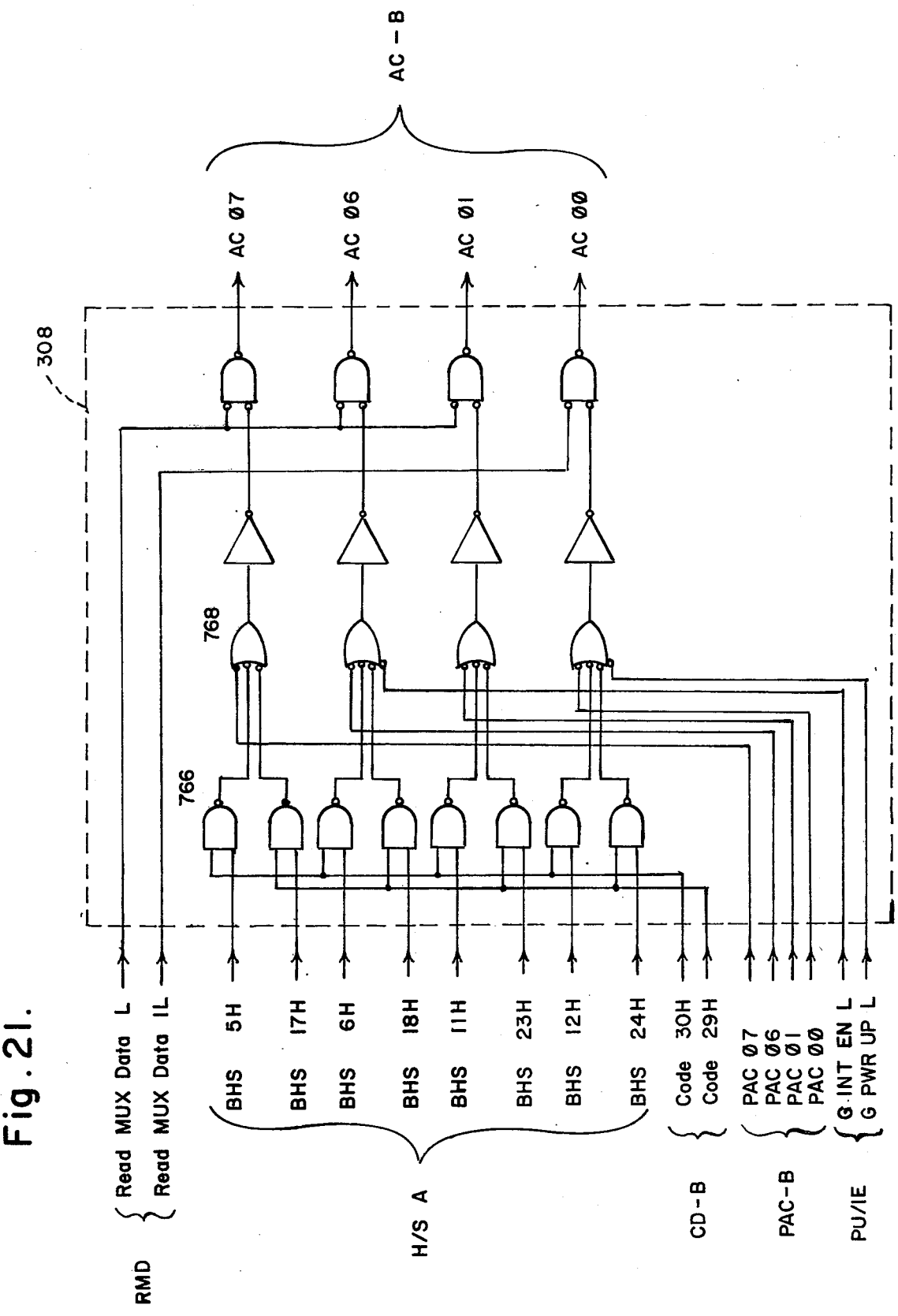
FIG. 21 is a schematic circuit diagram illustrating the AC MUX data #2 circuit of FIG. 9 in greater detail.

As shown in FIG. 21, the data signals H/S A are supplied to one input terminal of a series of two input terminal AND gates, shown generally at 766, in the AC MUX DATA circuit #2 308. The control signal CD-B controls which data signal of H/S A will be transmitted. The output signals from the AND gates 766, along with the previously multiplexed data signals PAC-B, and the PU/IE signal, are multiplexed in a series of OR gates 768 and then supplied to the computer upon initiation of the RMD signal as the remaining AC signals as shown in FIG. 21.

Figure 22:
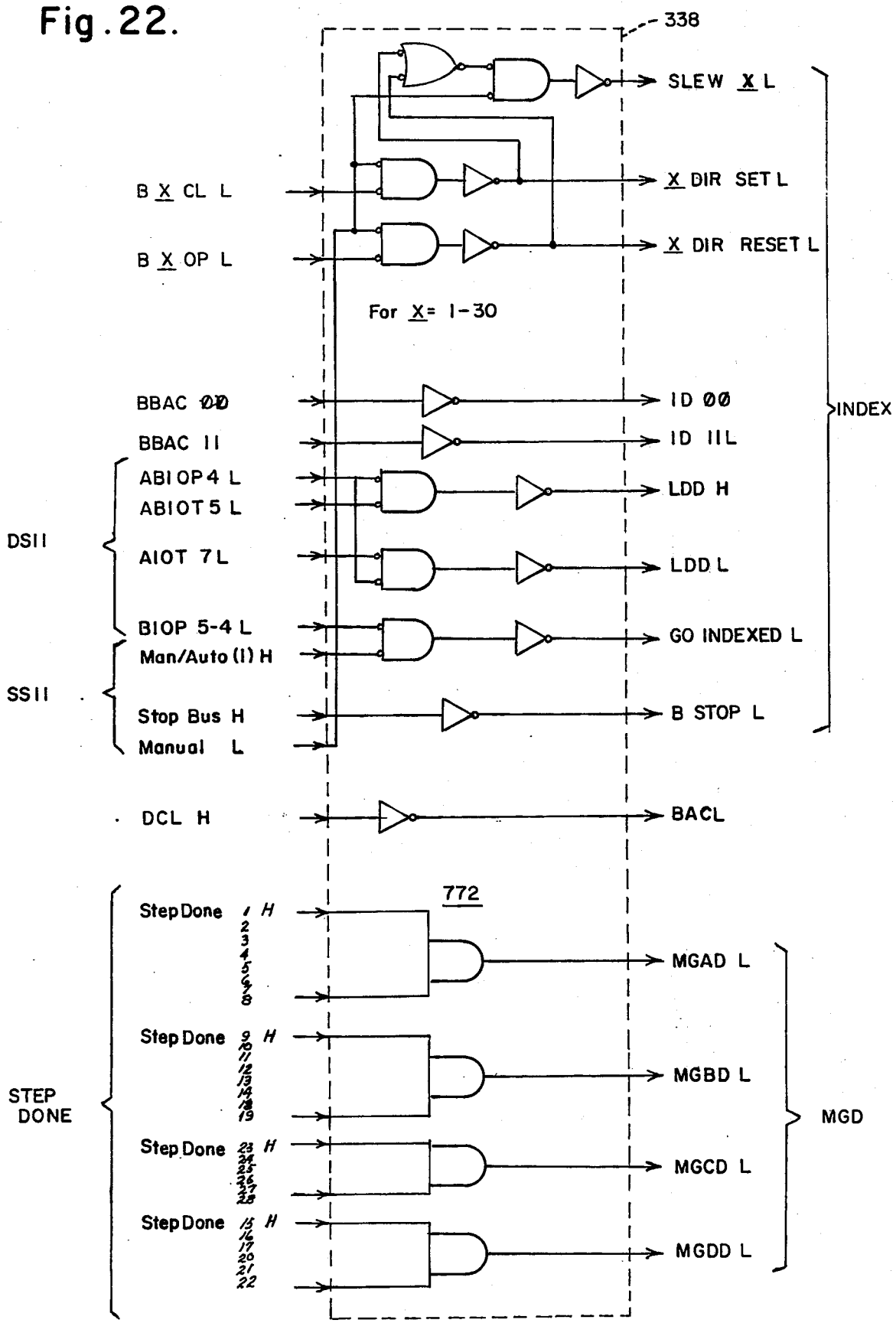
FIG. 22 is a schematic circuit diagram illustrating the indexer interface circuit of FIG. 9 in greater detail.

The indexer interface circuit 338 of FIG. 9 is shown in greater detail in FIG. 22. Bascially, this circuit receives control data DSII, system status data SSII, remote switch data 1–30 OP and 1030CL, and BBAC data, stores this data and generates several new signals as shown in FIG. 22 and transmits this data when instructed by the computer as the INDEX signal. The INDEX signal, supplied to the stepper motor index circuit 500, contains all the information necessary to control the duration and direction of movement of the stepping motor selected by the motor select signal SEL supplied by the motor select logic circuit 328. The indexer module 500 of FIG. 9 in response to this INDEX signal generates the required quantity of triggering pulses for transmittal to the stepping motor power units 600 of FIG. 9. Preset logic of the indexer modules produce the triggering pulses at predetermined rates such that the start rate, acceleration rate, deceleration rate and slew speed of the respective stepping motors are accomplished so that the torque limits are not exceeded and the motors step in response to each pulse applied. The indexer interface 338 also receives a plurality of STEP DONE signals applied to the input terminals of the AND gates as shown at 772, the output terminals of which supply the MGD signal, indicating no movement of the stepping motors, to the system status register.

Figure 23:
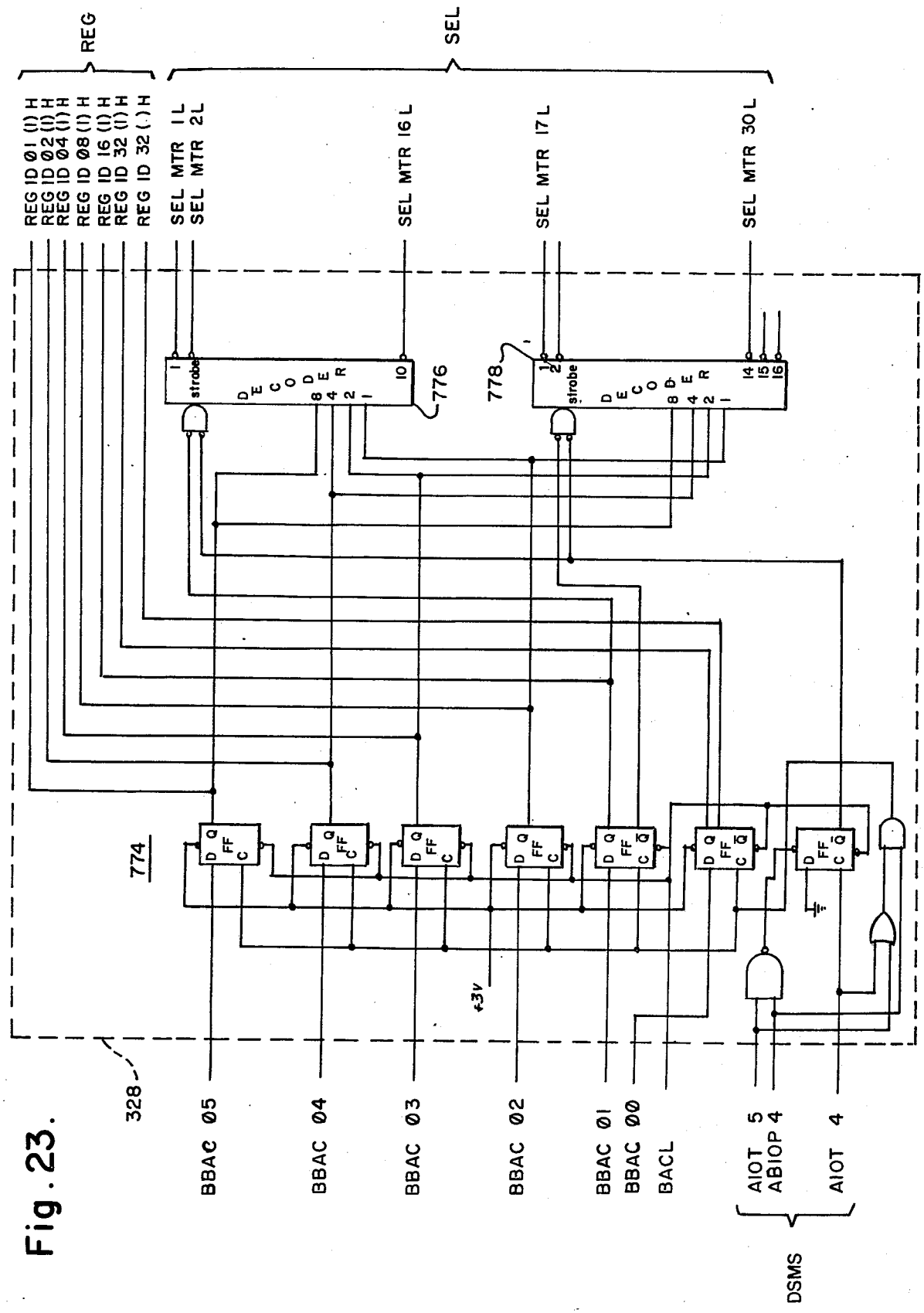

The motor select logic circuit 328 of FIG. 9 is shown in greater detail in FIG. 23. This circuit generates the motor select signal SEL, used as described above, and the REG signal. Data signals BBAC00-BBAC05 are each applied to the D input terminal of a plurality of flip flops indicated generally at 774. The Q output signals of the flip flops 774 are applied to the input terminals of decoders 776 and 778. When the strobe input is asserted, the decoder selects one of 16 output signals as a function of the value of the binary coded decimal input signal. The clock input signal on flip flops 774 and the strobe input signal are supplied by data signals DSMS from the device select circuit 304 so ultimately the computer controls the generation of the motor select signals SEL. Also, the Q output signals of flip flops 774 supply the REG signal to AC MUX control circuit #1 334.

Figure 24:
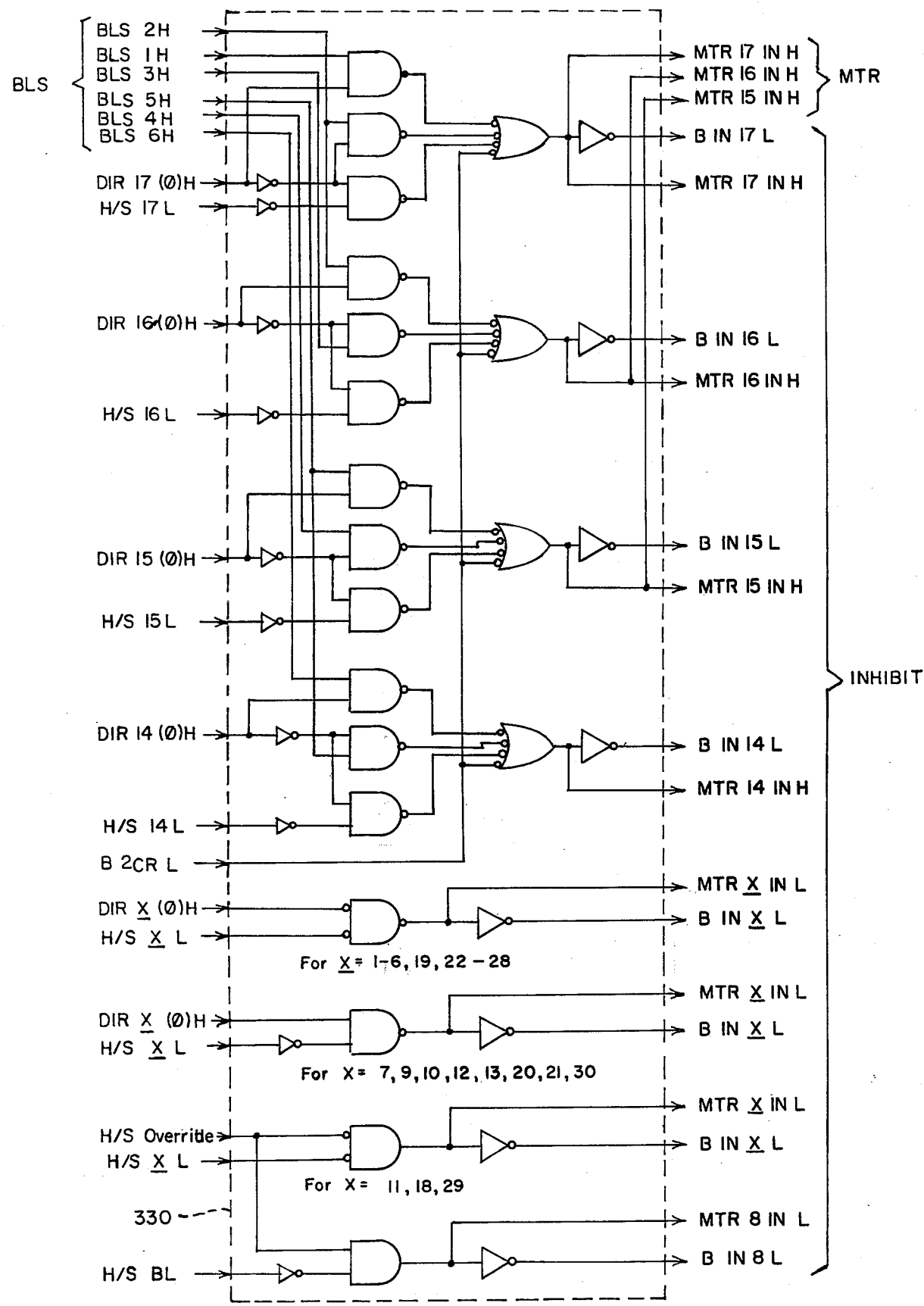
FIG. 24 is a schematic circuit diagram illustrating the motor inhibit circuit of FIG. 9 in greater detail.

The motor inhibit circuit 330 of FIG. 9 is illustrated in greater detail in FIG. 24. This circuit generates signals to inhibit movement of the motors in response to direction, home and limit switch as directed by the computer upon detection of an inhibit condition.

Figure 25:
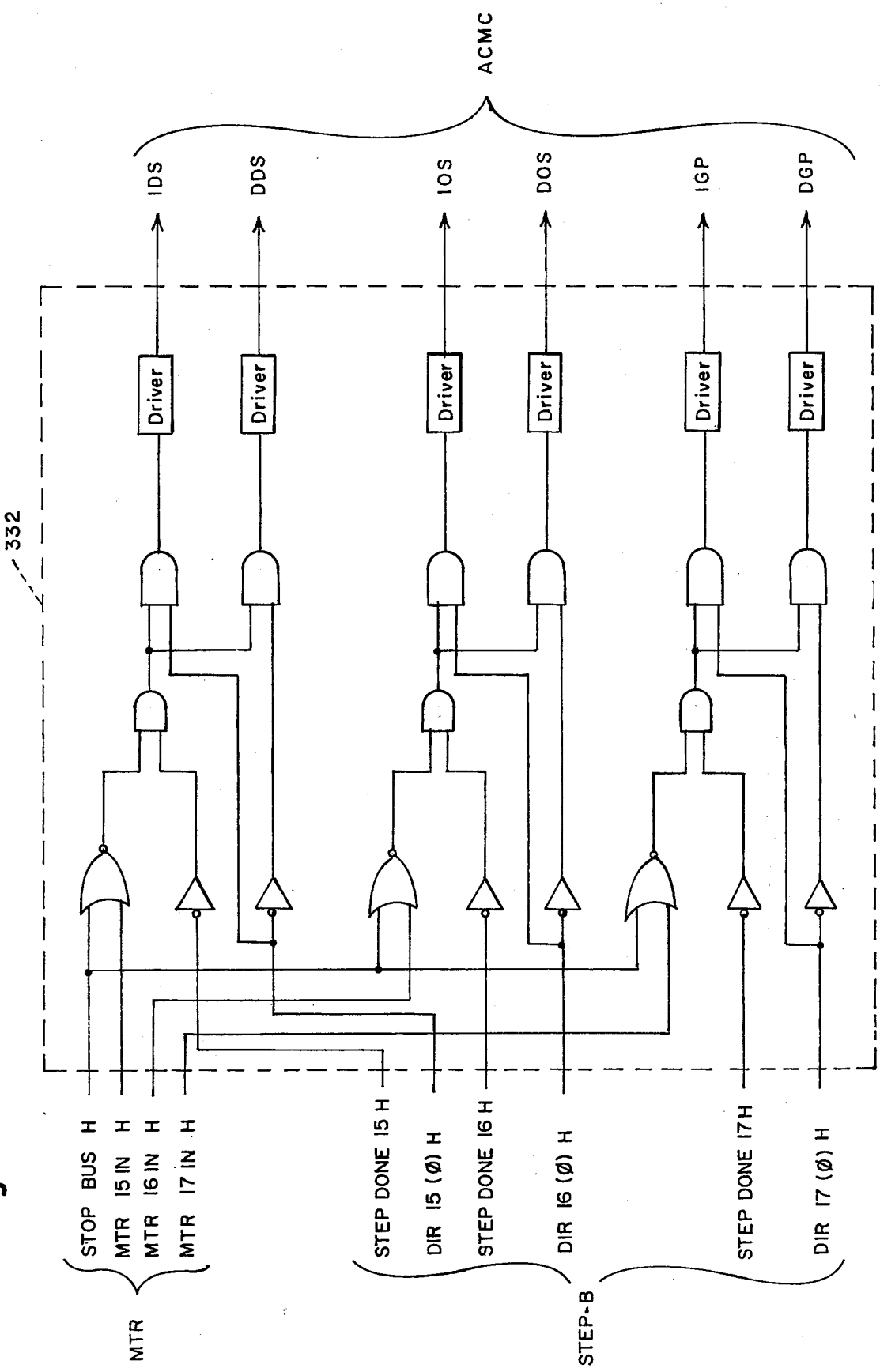
FIG. 25 is a schematic circuit diagram illustrating the cam follower circuit of FIG. 9 in greater detail.

The cam follower circuit 332 of FIG. 9 is illustrated in greater detail in FIG. 25. The cam follower circuit operates in conjunction with the computer to position the a.c. motors of the folder/gluer section of the machine as described previously.

Figure 26:
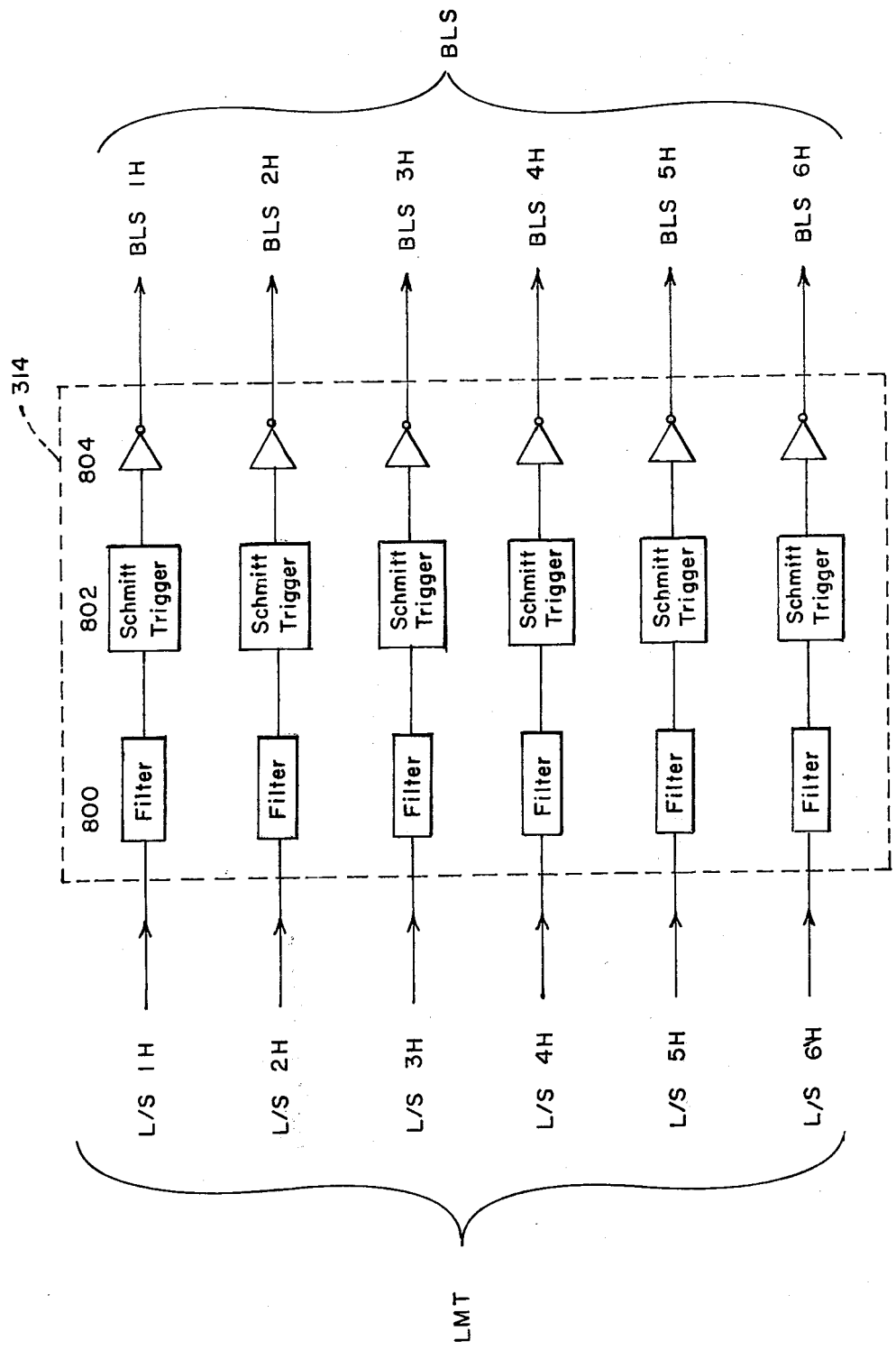
FIG. 26 is a schematic circuit diagram illustrating the limit switch register of FIG. 9 in greater detail.

The limit switch register 314 of FIG. 9, shown in greater detail in FIG. 26, receives limit switch signals LMT from the container finishing machine. Each LMT signal is applied to a filter 800 and Schmitt trigger 802 to remove noise and produce a clean, square pulse. Then these signals are applied to the input terminals of a series of inverting amplifiers 804 to produce the buffer limit switch signals BLS which are supplied to various elements in the control logic circuit 300.

Figure 27:
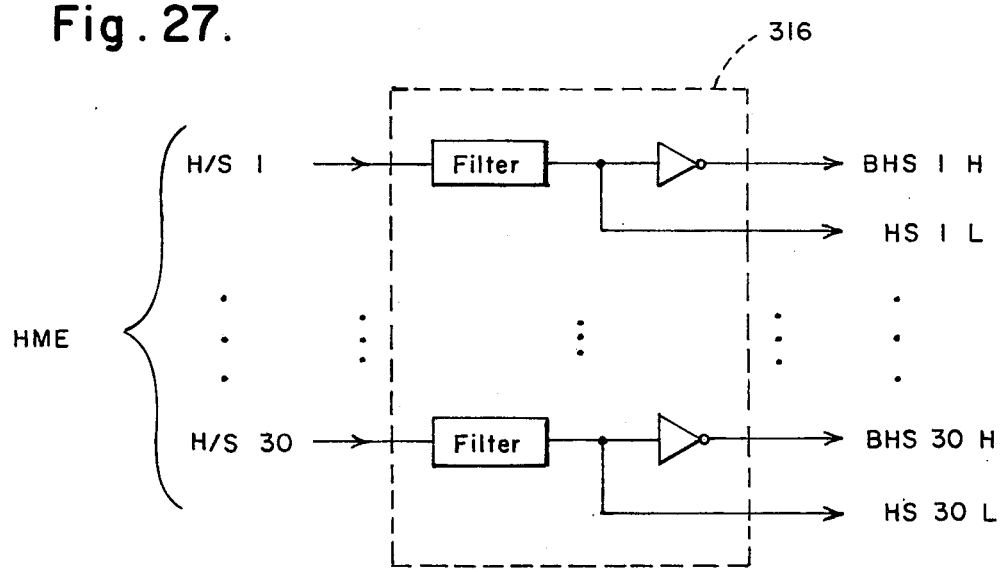
FIG. 27 is a schematic circuit diagram illustrating the home switch register of FIG. 9 in greater detail.
Figure 28:
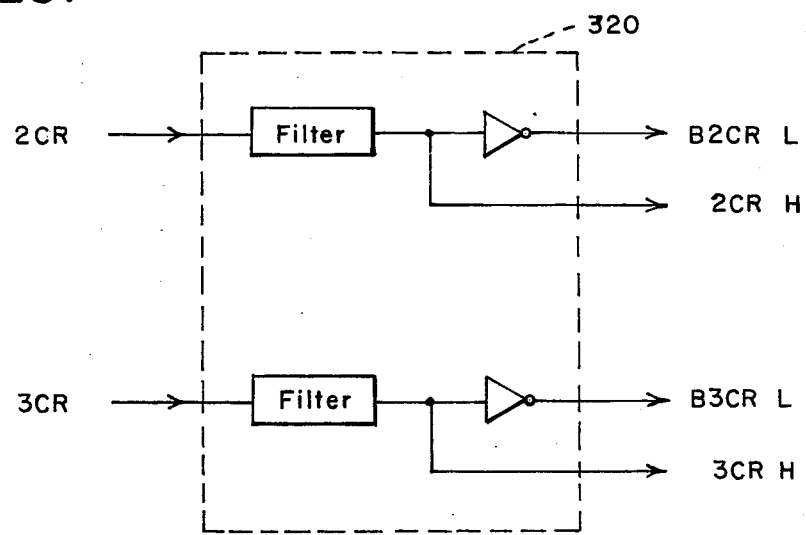
FIG. 28 is a schematic circuit diagram illustrating the 2CR and 3CR switch register of FIG. 9 in greater detail.
Figure 29:
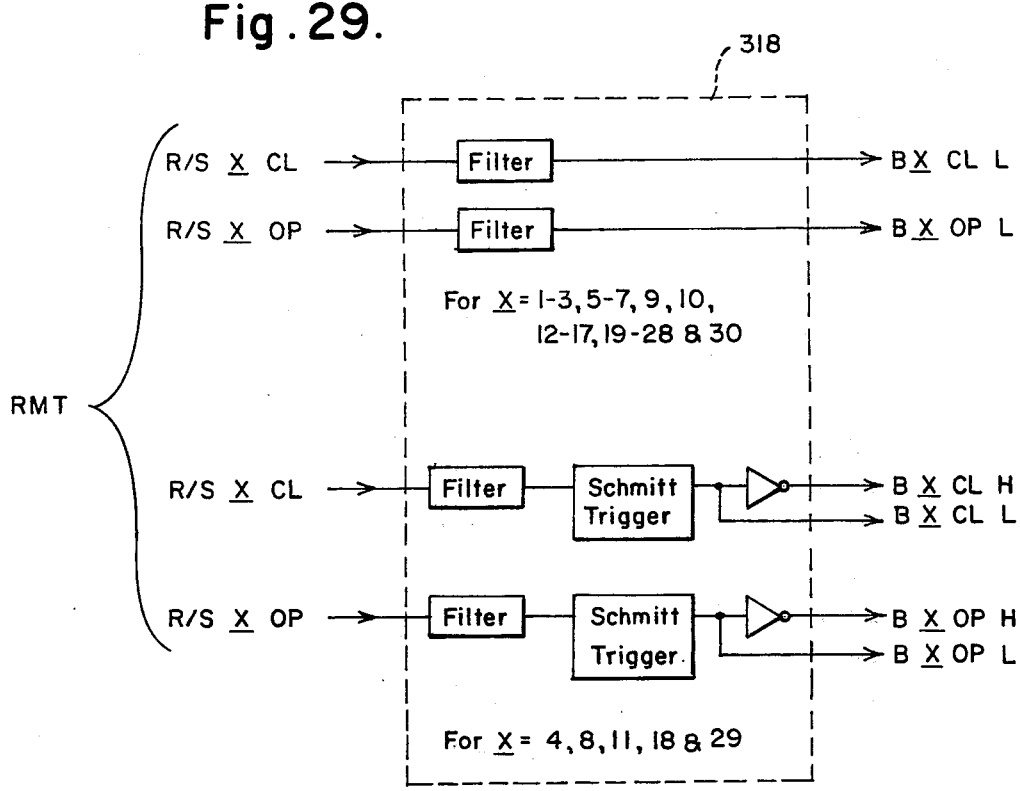
FIG. 29 is a schematic circuit diagram illustrating the remote switch register of FIG. 9 in greater detail.

The home switch register 316, the 2CR and 3CR switch register 320 and the remote switch register 318 receive the home switch signals HME, 2CR and 3CR switch signals, and remote switch signals RMT, respectively, and filter and amplify the received signals similar to the limit switch register 314, as shown in greater detail in FIGS. 27, 28 and 29. And, similarly, these HME, 2CR, 3CR and RMT signals are supplied as data signals to various elements of the control logic circuit 300.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for producing corrugated paperboard containers of a desired size wherein the container blanks are processed by a container finishing machine having appurtenances which perform feeding, cutting, crushing, printing, folding and joining operations on the container blank, each of the appurtenances having an electrical drive motor connected thereto for individually positioning the appurtenances, the machine having multiple sections relatively movable into closed and open positions, the method comprising the steps of:
   a. initially positioning the appurtenances at known positions with the drive motors;
   b. supplying to a digital computing means, digital signals specifying dimensions of the container blank and locations on the container blank of operation to be performed on the container blank by each appurtenance for a container of the desired size and shape;
   c. generating in response to the digital signals, electrical signals each representing a distance and direction of movement required to position an appurtenance relative to the known position of that appurtanance so as to perform a desired operation on the container blank at the location specified by the digital signals;
   d. sensing an operational condition of the container finishing machine including the open and closed conditions of the sections of the container finishing machine;
   e. applying the generated electrical signals to the drive motors of the appurtenances in accordance with a predetermined application sequence in response to a sensed closed operational condition of the container finishing machine;

f. indicating successful completion of the application sequence; and g. subsequent to the indicating step, feeding the container blanks having the dimensions specified by the digital signals through the container finishing machine to produce containers of the desired size and shape.

2. The method of claim 1 wherein the electrical signals generated in response to said digital signals are applied to said drive motors in accordance with a predetermined rate to achieve acceleration and deceleration of said motors without exceeding the torque capabilities of said motors.

3. The method of claim 2 wherein the appurtenances are initially positioned at known home positions by:

applying a slewing signal to the drive motor of each appurtenance to drive the appurtenance in a predetermined direction at a slew rate;

removing the slew signal from the drive motor of each appurtenance in response to the engagement of a home switch by the appurtenance;

applying a reverse signal to the drive motor of each appurtenance to drive the appurtenance in a direction opposite the predetermined direction at a rate lower than the slew rate;

removing the reverse signal from the drive motor of each appurtenance in response to the disengagement of the appurtenance from the home switch.

4. The method of claim 2 wherein the digital signals specifying dimensions and locations are supplied to the computing means from a plurality of thumbwheel switch assemblies by:

setting the thumbwheel assemblies at desired dimensional values;

generating binary encoded signals representing the values set on the thumbwheel switch assemblies; and enabling the computer to read the generated binary encoded digital signals.

5. The method of claim 3 including the further step of storing the generated binary encoded digital signals in association with a production order code for subsequent recall of the binary encoded digital signals.

6. The method of claim 3 wherein the appurtenances are initially positioned at known home positions by:

applying a slewing signal to the drive motor of each appurtenance to drive the appurtenance in a predetermined direction at a slew rate;

removing the slew signal from the drive motor of each appurtenance in response to the engagement of a home switch by the appurtenance;

applying a reverse signal to the drive motor of each appurtenance to drive the appurtenance in a direction opposite the predetermined direction at a rate lower than the slew rate;

removing the reverse signal from the drive motor of each appurtenance in response to the disengagement of the appurtenance from the home switch.

7. The method of claim 2 wherein the digital signals specifying dimensions and locations are supplied to the computing means by:

storing sets of digital signals each in association with a production order code and each specifying dimensions and locations for a container of a desired size and shape, each set of digital signals specifying a container of different size and shape than each other set; and supplying a desired one of the sets of digital signals to the computing means in response to the designation of the production order code associated with the desired one of the sets and in response to generation of a recall command signal.

8. Apparatus for positioning the appurtenances of a corrugated paperboard container finishing machine having appurtenances which perform feeding, cutting, crushing, printing, folding and joining operations on a container blank, the machine having multiple sections relatively movable into closed and open positions, the apparatus comprising:

means including a plurality of stepper motors for initially positioning the appurtenances at known positions;

control means for generating digital signals specifying dimensions of the container blank and locations on the container blank of an operation to be performed on the container blank by each appurtenance for a container of the desired size and shape;

computing means for generating, in response to the digital signals, a plurality of electrical signals each representing a distance and direction of movement required to position an appurtenance relative to the known position of that appurtenance so as to perform a desired operation on the container blank at the location specified by the digital signals;

means for sensing an operational condition of the container finishing machine including the open and closed conditions of the sections of the container finishing machine;

means for applying the electrical signals to the drive motors of the appurtenances in accordance with a predetermined application sequence in response to a sensed operational condition of the container finishing machine; and means for indication successful completion of the application sequence.

9. The apparatus of claim 8 wherein the means for applying the generated electrical signals to the drive motors of the appurtenances include means for applying the signals in a predetermined rate to achieve acceleration and deceleration of said motors without exceeding the torque capabilities of said motors when responding to said signals.

10. The apparatus of claim 9 wherein the means for initially positioning the appurtenances at known home positions comprises:

means for applying a slewing signal to the drive motor of each appurtenance to drive the appurtenance in a predetermined direction at a slew rate;

means for removing the slew signal from the drive motor of each appurtenance in response to the engagement of a home switch by the appurtenance;

means for applying a reverse signal to the drive motor of each appurtenance to drive the appurtenance in a direction opposite the predetermined direction at a rate lower than the slew rate; and means for removing the reverse signal from the drive motor of each appurtenance in response to the disengagement of the appurtenance from the home switch.

11. The apparatus of claim 9 wherein the digital signals specifying dimensions and locations are supplied to the computing means from a plurality of thumbwheel switch assemblies each having a decimal display of a value set on the switch assembly and providing a coded digital signal related to the decimal value set, the control means further comprising means for enabling the computing means to read the encoded digital signals from the thumbwheel.

12. The apparatus of claim 11 wherein the computing means includes means for storing the generated coded digital signals in association with a production order code for subsequent recall of the coded digital signals.

13. The apparatus of claim 12 wherein the means for initially positioning the appurtenances at known home positions comprises:
means for applying a slewing signal to the drive motor of each appurtenance to drive the appurtenance in a predetermined direction at a slew rate;
means for removing the slew signal from the drive motor of each appurtenance in response to the engagement of a home switch by the appurtenance;
means for applying a reverse signal to the drive motor of each appurtenance to drive the appurtenance in a direction opposite the predetermined direction at a rate lower than the slew rate; and
means for removing the reverse signal from the drive motor of each appurtenance in response to the disengagement of the appurtenance from the home switch.

14. The method of claim 9 wherein the computing means includes:
means for storing sets of digital signals each in association with a production order code and each specifying dimensions and locations for a container of a desired size and shape, each set of digital signals specifying a container of different size and shape than each other set; and
means for selecting a desired one of the sets of digital signals in response to the control means, the control means including means for designating a production order code associated with the desired one of the sets and means for generating a recall command signal enabling the recall of the set associated with the designated production order code.

15. Apparatus for positioning the appurtenances of a corrugated paperboard container finishing machine having appurtenances which perform feeding, cutting, crushing, printing, folding and joining operations on a container blank, the apparatus comprising:
means including a plurality of stepper motors connected to position the appurtenances;
control means for generating digital signals specifying dimensions of the container blank and locations on the container blank of an operation to be performed on the container blank by each appurtenance for a container of the desired size and shape;
computing means for generating, in response to the digital signals, a plurality of electrical signals each representing a distance and direction of movement required to position an appurtenance relative to a known position of that appurtenance stored in memory so as to position the appurtenances to perform a desired operation on the container blank at the location specified by the digital signals;
means for applying electrical pulses to the stepper motors of the appurtenances in accordance with a predetermined application sequence, the number of electrical pulses being determined by the electrical signals generated by said computing means; and
means for indicating successful completion of the application sequence.

16. The apparatus of claim 15 wherein the computing means comprises:
means for applying a slewing signal to the drive motor of each appurtenance to drive the appurtenance in a predetermined direction at a slew rate;
means for removing the slew signal from the drive motor of each appurtenance in response to the engagement of a home switch by the appurtenance;
means for applying a reverse signal to the drive motor of each appurtenance to drive the appurtenance in a direction opposite the predetermined direction at a rate lower than the slew rate; and
means for removing the reverse signal from the drive motor of each appurtenance in response to the disengagement of the appurtenance from the home switch.

17. The apparatus of claim 15 wherein the digital signals specifying dimensions and locations are supplied to the computing means from a plurality of thumbwheel switch assemblies each having a decimal display of a value set on the switch assembly and providing a coded digital signal related to the decimal value set, the control means further comprising means for enabling the computing means to read the encoded digital signals from the thumbwheel.

18. The apparatus of claim 17 wherein the computing means includes means for storing the generated coded digital signals in association with a production order code for subsequent recall of the coded digital signals.

19. A control console of the type comprising:
means for generating digital signals to specify the dimensions of container blanks and the locations on the container blank that an operation was to be performed on it;
computer means for generating electrical signals in response to said digital signals;
order means for generating said digital signals in response to a predetermined order number;
display means for visually depicting the operationable condition provided by the generated digital signals; and
warning means to indicate an incomprehensible digital signal.

* * * * *